US010063567B2

(12) United States Patent
Fiorentino et al.

(10) Patent No.: US 10,063,567 B2
(45) Date of Patent: Aug. 28, 2018

(54) SYSTEM FOR CROSS-HOST, MULTI-THREAD SESSION ALIGNMENT

(71) Applicant: VIRTUAL SOFTWARE SYSTEMS, INC., Waltham, MA (US)

(72) Inventors: Richard D. Fiorentino, Carlisle, MA (US); Charles H. Kaman, Lincoln, MA (US); Mario Troiani, Newton, MA (US); Erik Muench, Groveland, MA (US)

(73) Assignee: Virtual Software Systems, Inc., Burlington, MA (US)

(*) Notice: Subject to any disclaimer, the term of this patent is extended or adjusted under 35 U.S.C. 154(b) by 302 days.

(21) Appl. No.: 14/939,467

(22) Filed: Nov. 12, 2015

(65) Prior Publication Data
US 2016/0142422 A1 May 19, 2016

Related U.S. Application Data

(60) Provisional application No. 62/079,300, filed on Nov. 13, 2014.

(51) Int. Cl.
*H04L 29/06* (2006.01)
*G06F 9/54* (2006.01)

(52) U.S. Cl.
CPC .......... *H04L 63/14* (2013.01); *G06F 9/54* (2013.01); *H04L 63/123* (2013.01); *H04L 63/1408* (2013.01)

(58) Field of Classification Search
CPC ....... G06F 9/54; H04L 63/14; H04L 63/1408; H04L 63/123
See application file for complete search history.

(56) References Cited

U.S. PATENT DOCUMENTS 4,453,215 A 6/1984 Reid
4,486,826 A 12/1984 Wolff et al.
(Continued)

FOREIGN PATENT DOCUMENTS

WO 03/084116 A1 10/2003

OTHER PUBLICATIONS

Albrecht et al., "Cooperative Software Multithreading to Enhance Utilization of Embedded Processors for Network Applications," Proceedings of the 12th Euromicro Conference on Parallel, Distributed and Network-Based Processing, 2004.
(Continued)

*Primary Examiner* — Linglan E Edwards
(74) *Attorney, Agent, or Firm* — Preti Flanerty Beliveau & Pachios LLP

(57) ABSTRACT

A method of detecting aberrant behavior in a software application is described. The method includes instantiating replicated applications on computing devices using identical initial setting. Each replicated application is a replicated instance of the software application. Information associated with a first API call from the first replicated application, and information associated with a second API call from the second replicated application is received. The information includes a call identifier of the API call and a digest. The call identifier is unique during the lifetime of the replicated application issuing it and is identical across the replicated applications. If the first and second call identifiers are identical, the method determines whether the first and second digests match. The method also includes, in response to the first and second digests not matching, signaling that aberrant behavior has occurred. Apparatus and computer readable media are also described.

23 Claims, 32 Drawing Sheets

(56) References Cited

U.S. PATENT DOCUMENTS

| | | | |
|---|---|---|---|
| 4,597,084 A | 6/1986 | Dynneson et al. | |
| 4,691,666 A | 9/1987 | Scherer | |
| 4,750,177 A | 6/1988 | Hendrie et al. | |
| 4,816,990 A | 3/1989 | Williams | |
| 4,866,604 A | 9/1989 | Reid | |
| 4,920,540 A | 4/1990 | Baty | |
| 4,926,315 A | 5/1990 | Long et al. | |
| 4,931,922 A | 6/1990 | Baty et al. | |
| 4,939,643 A | 7/1990 | Long et al. | |
| 4,974,144 A | 11/1990 | Long et al. | |
| 4,974,150 A | 11/1990 | Long et al. | |
| 5,020,024 A | 5/1991 | Williams | |
| 5,049,701 A | 9/1991 | Vowles et al. | |
| 5,220,668 A | 6/1993 | Bullis | |
| 5,243,704 A | 9/1993 | Baty | |
| 5,257,383 A | 10/1993 | Lamb | |
| 5,367,668 A | 11/1994 | Pandolfo | |
| 5,379,381 A | 1/1995 | Lamb | |
| 5,390,081 A | 2/1995 | St Pierre | |
| 5,423,024 A | 6/1995 | Cheung | |
| 5,475,860 A | 12/1995 | Ellison et al. | |
| 5,479,648 A | 12/1995 | Barbera et al. | |
| 5,555,372 A | 9/1996 | Tetreault et al. | |
| 5,559,459 A | 9/1996 | Back et al. | |
| 5,574,922 A * | 11/1996 | James | G06F 9/526 710/200 |
| 5,574,939 A * | 11/1996 | Keckler | G06F 9/30032 712/200 |
| 5,586,253 A | 12/1996 | Green et al. | |
| 5,600,784 A | 2/1997 | Bissett et al. | |
| 5,615,403 A | 3/1997 | Bissett et al. | |
| 5,625,681 A | 4/1997 | Butler, II | |
| 5,630,056 A | 5/1997 | Horvath et al. | |
| 5,694,541 A | 12/1997 | Service et al. | |
| 5,781,910 A | 7/1998 | Gostanian et al. | |
| 5,787,485 A | 7/1998 | Fitzgerald et al. | |
| 5,790,397 A | 8/1998 | Bissett et al. | |
| 5,802,265 A | 9/1998 | Bressoud et al. | |
| 5,815,649 A | 9/1998 | Utter et al. | |
| 5,838,899 A | 11/1998 | Leavitt et al. | |
| 5,838,900 A | 11/1998 | Horvath et al. | |
| 5,857,246 A | 1/1999 | Becnel | |
| 5,896,523 A | 4/1999 | Bissett et al. | |
| 5,940,490 A | 8/1999 | Foster et al. | |
| 5,956,474 A | 9/1999 | Bissett et al. | |
| 5,968,185 A | 10/1999 | Bressoud et al. | |
| 5,983,371 A | 11/1999 | Christopher et al. | |
| 6,038,685 A | 3/2000 | Bissett et al. | |
| 6,099,136 A | 8/2000 | Becnel | |
| 6,128,196 A | 10/2000 | Hoyle, Jr. et al. | |
| 6,205,565 B1 | 3/2001 | Bissett et al. | |
| 6,279,119 B1 | 8/2001 | Bissett et al. | |
| 6,286,025 B1 * | 9/2001 | Chang | G06F 9/4843 714/E11.019 |
| 6,355,991 B1 | 3/2002 | Goff et al. | |
| 6,473,869 B2 | 10/2002 | Bissett et al. | |
| 6,633,996 B1 | 11/2003 | Suffin et al. | |
| 6,687,851 B1 | 2/2004 | Somers et al. | |
| 6,691,225 B1 | 2/2004 | Suffin | |
| 6,691,257 B1 | 2/2004 | Suffin | |
| 6,694,450 B1 * | 2/2004 | Kidder | G06F 11/1438 707/999.202 |
| 6,708,283 B1 | 3/2004 | Nelvin et al. | |
| 6,718,474 B1 | 4/2004 | Somers et al. | |
| 6,728,898 B2 | 4/2004 | Tremblay et al. | |
| 6,735,715 B1 | 5/2004 | Graham | |
| 6,766,413 B2 | 7/2004 | Newman | |
| 6,766,479 B2 | 7/2004 | Edwards, Jr. | |
| 6,802,022 B1 | 10/2004 | Olson | |
| 6,813,721 B1 | 11/2004 | Tetreault et al. | |
| 6,820,213 B1 | 11/2004 | Somers et al. | |
| 6,842,823 B1 | 1/2005 | Olson | |
| 6,862,689 B2 | 3/2005 | Bergsten et al. | |
| 6,874,102 B2 | 3/2005 | Doody et al. | |
| 6,886,171 B2 | 4/2005 | Macleod | |
| 6,901,481 B2 | 5/2005 | Olson | |
| 6,928,583 B2 | 8/2005 | Griffin et al. | |
| 6,948,010 B2 | 9/2005 | Somers et al. | |
| 6,970,892 B2 | 11/2005 | Green, Jr. et al. | |
| 6,971,043 B2 | 11/2005 | McLoughlin et al. | |
| 6,996,750 B2 | 2/2006 | Tetreault | |
| 7,065,672 B2 | 6/2006 | Long et al. | |
| 7,373,545 B2 | 5/2008 | Leveille et al. | |
| 7,385,687 B2 | 6/2008 | Stenger | |
| 7,496,786 B2 | 2/2009 | Graham et al. | |
| 7,496,787 B2 | 2/2009 | Edwards et al. | |
| 7,669,073 B2 | 2/2010 | Graham et al. | |
| 7,877,552 B2 | 1/2011 | Leveille et al. | |
| 7,904,906 B2 | 3/2011 | Puthukattukaran et al. | |
| 7,958,076 B2 | 6/2011 | Bergstein et al. | |
| 8,117,495 B2 | 2/2012 | Graham et al. | |
| 8,151,800 B2 | 4/2012 | Butler | |
| 8,161,311 B2 | 4/2012 | Wiebe | |
| 8,234,521 B2 | 7/2012 | Graham et al. | |
| 8,239,836 B1 | 8/2012 | Franz et al. | |
| 8,271,416 B2 | 9/2012 | Al-beik et al. | |
| 8,312,318 B2 | 11/2012 | Graham et al. | |
| 8,359,112 B2 * | 1/2013 | Kephart | G05B 9/03 700/25 |
| 8,381,012 B2 | 2/2013 | Wiebe | |
| 8,584,145 B1 * | 11/2013 | Havemose | G06F 11/1482 707/610 |
| 8,621,275 B1 | 12/2013 | Havemose | |
| 9,030,962 B2 * | 5/2015 | Saleh | H04L 12/66 370/254 |
| 2002/0026604 A1 | 2/2002 | Bissette et al. | |
| 2004/0064596 A1 * | 4/2004 | Erickson | G06F 13/387 710/5 |
| 2006/0143528 A1 | 6/2006 | Edwards et al. | |
| 2006/0149792 A1 * | 7/2006 | Yamagami | G06F 11/1471 |
| 2006/0222126 A1 | 10/2006 | Edwards, Jr. et al. | |
| 2006/0253727 A1 | 11/2006 | Leveille et al. | |
| 2006/0259815 A1 | 11/2006 | Graham et al. | |
| 2006/0274508 A1 | 12/2006 | Lariviere | |
| 2007/0011499 A1 | 1/2007 | Bergstein et al. | |
| 2007/0028144 A1 | 2/2007 | Graham et al. | |
| 2007/0038891 A1 | 2/2007 | Graham | |
| 2007/0043972 A1 | 2/2007 | Graham et al. | |
| 2007/0106873 A1 | 5/2007 | Lally et al. | |
| 2007/0174484 A1 | 7/2007 | Lussier et al. | |
| 2007/0174687 A1 | 7/2007 | Graham et al. | |
| 2007/0214340 A1 | 9/2007 | Leveille et al. | |
| 2008/0162589 A1 * | 7/2008 | Rodeheffer | G06F 11/1469 |
| 2009/0037765 A1 | 2/2009 | Graham et al. | |
| 2009/0055676 A1 | 2/2009 | Wiebe et al. | |
| 2009/0138752 A1 | 5/2009 | Graham et al. | |
| 2009/0144217 A1 | 6/2009 | Bergsten et al. | |
| 2009/0240916 A1 | 9/2009 | Tremblay et al. | |
| 2014/0082344 A1 | 3/2014 | Case, Sr. | |
| 2014/0244586 A1 | 8/2014 | Ngo | |
| 2014/0283068 A1 | 9/2014 | Call et al. | |

OTHER PUBLICATIONS

Basile et al., "Active Replication of Multithreaded Applications," IEEE, 2006.

Brito et al., "Multithreading-Enabled Active Replication for Event Stream Processing Operators," 28th IEEE International Symposium on Reliable Distributed Systems, (2009).

Chaumette et al., "Parallelizing multithreaded Java* programs: a criterion and its π-calculus foundation," Proceedings of the International Parellel and Distributed Processing Symposium, (2002).

Derk et al., "Reconfiguration for Fault Tolerance Using Graph Grammars," ACM Tranactions on Computer Systems, 16(1):41-54 (1998).

McDirmid et al., "Programming with Managed Time," Onward, (2014).

Domaschka et al., "Revisiting Deterministic Multithreading Strategies," IEEE, (2007).

Jimenez-Peris et al., "Deterministic Scheduling for Transactional Multithreaded Replicas," IEEE, 2000.

(56) References Cited

OTHER PUBLICATIONS

Kuper et al., "Freeze After Writing," POPL, 2014.
Kuper et al., "LVars: Lattice-based Data Structures for Deterministic Parallelism," FHPC, 2013.
Kuper et al., "Taming the Parallel Effect Zoo," PLDI, (2014).
Lu et al., "*CARP*: Handling silent data errors and site failures in an integrated program and storage replication mechanism," IEEE, 2009.
Madriles et al., "Mitosis: A Speculative Multithreaded Processor Based on Precomputation Slices," IEEE, 2008.
Martin et al., "Active replication at (almost) no cost," $30^{th}$ IEEE International Symposium on Reliable Distributed Systems, 2011.
Narasimhan et al., "State Synchronization and Recovery for Strongly Consistent Replicated CORBA Objects," IEEE, (2001).
Palmieri et al., "ASAP: an Aggressive SpeculAtive Protocol for Actively Replicated Transactional Systems," IEEE, 2012.
Poledna, "Fault-Tolerant Real-Time Systems, The Problem of Replica Determinsim," (1996).
Reiser et al., "Consistent Replication of Multithreaded Distributed Objects," $25^{th}$ IEEE International Symposium on Reliable Distributed Systems, 2006.
Vijaykumar et al., "Transient-Fault Recovery Using Simultaneous Multithreading," Proceedings of the $29^{th}$ Annual International Symposium on Computer Architecture, (2002).
Yalcin et al., "Fault Tolerance for Multi-Threaded Applications by Leveraging Hardware Transactional Memory," CF, 2013.
Zhao et al., "Deterministric Scheduling for Multithreaded Replicas," Proceedings of the $10^{th}$ IEEE International Workshop on Object-Oriented Real-Time Dependable Systems, 2005.
Zhao et al., "Increasing the Reliability of Three-Tier Applications," IEEE, 2001.
Kopetz, Real-Time Systems, Design Principles for Distributed Embedded Applications, 2002.
European Search Report for Application No. EP 15859757 dated Feb. 27, 2018.
Narasimhan et al., "Enforcing Determination for the Consistent Replication of Multithreaded CORBA Applications," (Dec. 2003).
Reddy et al., "Understanding Prediction-Based Partial Redundant Threading for Low-Overhead, High-Coverage Fault Tolerance," (2006).
Reinhardt et al., "Transient Fault Detection via Simultaneous Multithreading," (2000).
Riener et al., "Improving Fault Tolerance Utilizing Hardware-Software-Co-Synthesis." (2013).

* cited by examiner

SYSTEM FOR CROSS-HOST, MULTI-THREAD SESSION ALIGNMENT

STATEMENT REGARDING FEDERALLY SPONSORED RESEARCH OR DEVELOPMENT

Not Applicable

INTRODUCTION

Various embodiments relate generally to multi-threaded application systems, methods, devices and computer programs and, more specifically, relate to detecting aberrant behavior in a multi-threaded application. Additionally, the techniques described may also be used to detect aberrant behavior in single-threaded applications as well.

This section is intended to provide a background or context. The description may include concepts that may be pursued, but have not necessarily been previously conceived or pursued. Unless indicated otherwise, what is described in this section is not deemed prior art to the description and claims and is not admitted to be prior art by inclusion in this section.

Conventional, replicated applications do not necessarily behave consistently in different environments, because, in general, they are not inherently deterministic. Determinism is a property of a computation that makes it possible to predict the future result of a computation, given that the initial state and all inputs are known.

Environmental variations in timing affect thread scheduler decisions in most mainstream operating systems, such as Windows and Linux. These decisions cause non-determinism in the thread execution order, which in turn causes divergence, e.g., loss of alignment, among replicated application instances.

Application threads run under the auspices of an operating system and execute in an environment of many threads that are not part of that particular application. The operating system provides many services that run in their own threads. Since the operating system controls resources, including execution time for each thread, two sessions with the same process definition and data (initial and dynamically entered) may not appear to be performing the same computation if examined closely.

Two types of differences exemplify the complexity of trying to cause two sessions to evolve identically.

1. Since the operating system allocates execution quanta (thread scheduling) dynamically while considering all other demands on it, different threads will receive the opportunity to run without any guarantee of fairness or relative speed compared to other threads that are ready to run. In light of this lack of guarantee of relative performance, competition between threads in concurrency control scenarios may resolve one way in one session and a different way in another session, all other factors being identical.

2. Since input/output (I/O) may involve mechanical devices whose performance is not guaranteed to be the same for each use, and since networking performance varies with network load conditions, there is no existing method to control the environment within which a session runs so that all thread scheduling resolves the same in each session.

What is needed is a technique to run replicated processes in a deterministic manner so as to avoid inconsistencies which may occur due to their respective computing environments.

BRIEF SUMMARY

The below summary is merely representative and non-limiting.

The above problems are overcome, and other advantages may be realized, by the use of the embodiments. By running multiple replicated processes in an aligned manner, various embodiments can detect a divergence in the expected flow of the application threads. Such divergence may be indicative of abnormal system behavior, such as a physical failure or a security breach.

In a first aspect, an embodiment provides a method of detecting aberrant behavior in a software application. The method includes instantiating a plurality of replicated applications on at least one computing device using identical initial setting. Each replicated application in the plurality of replicated applications is a replicated instance of the software application, and the plurality of replicated applications includes a first replicated application and a second replicated application. Deterministic behavior is enforced so that each replicated application thread executes VSS calls in the same sequence and generating call identifiers which are unique for the duration of the replicated application and identical across the plurality of replicated applications. Receiving first information associated with a first VSS call from the first replicated application is included in the method. The first information includes a first call identifier of the first VSS call and a first digest. The digest is used to validate the identity of the call, so it may be computed on the basis of one or more of these items: the callID, the static call identifier, any call-related data, any user credentials, etc. Second information associated with a second VSS call from the second replicated application is received, the second information including a second call identifier of the second VSS call and a second digest. In response to determining the first call identifier and the second call identifier are identical, the method performs determining whether the first digest matches the second digest. The method also includes, in response to the first digest not matching the second digest, signaling that aberrant behavior has occurred.

In a further aspect, an embodiment provides an apparatus for detecting aberrant behavior in a software application. The apparatus includes at least one processor and at least one memory storing computer program code. The at least one memory and the computer program code are configured to, with the at least one processor, cause the apparatus to perform actions. The actions include instantiating a plurality of replicated applications on at least one computing device using identical initial setting. Each replicated application in the plurality of replicated applications is a replicated instance of the software application, and the plurality of replicated applications includes a first replicated application and a second replicated application. Deterministic behavior is enforced so that each replicated application thread executes VSS calls in the same sequence and generating call identifiers which are unique for the duration of the replicated application and identical across the plurality of replicated applications. Receiving first information associated with a first VSS call from the first replicated application is included in the actions. The first information includes a first call identifier of the first VSS call and a first digest. Second information associated with a second VSS call from the second replicated application is received, the second information including a second call identifier of the second VSS call and a second digest. In response to determining that the first call identifier and the second call identifier are identical, the actions include determining whether the first digest matches the second digest. The actions also includes, in response to the first digest not matching the second digest, signaling that aberrant behavior has occurred.

In another aspect, an embodiment provides a computer readable medium for detecting aberrant behavior in a software application. The computer readable medium is tangibly encoded with a computer program executable by a processor to perform actions. The actions include instantiating a plurality of replicated applications on at least one computing device using identical initial setting. Each replicated application in the plurality of replicated applications is a replicated instance of the software application, and the plurality of replicated applications includes a first replicated application and a second replicated application. Deterministic behavior is enforced so that each replicated application thread executes VSS calls in the same sequence and generating call identifiers which are unique for the duration of the replicated application and identical across the plurality of replicated applications. Receiving first information associated with a first VSS call from the first replicated application is included in the actions. The first information includes a first call identifier of the first VSS call and a first digest. Second information associated with a second VSS call from the second replicated application is received, the second information including a second call identifier of the second VSS call and a second digest. In response to determining the first call identifier and the second call identifier are identical, the actions include determining whether the first digest matches the second digest. The actions also includes, in response to the first digest not matching the second digest, signaling that aberrant behavior has occurred.

In a further aspect, an embodiment provides another apparatus for detecting aberrant behavior in a software application. The apparatus includes a means for instantiating a plurality of replicated applications on at least one computing device using identical initial setting. Each replicated application in the plurality of replicated applications is a replicated instance of the software application, and the plurality of replicated applications includes a first replicated application and a second replicated application. Deterministic behavior is enforced so that each replicated application thread executes VSS calls in the same sequence and generating call identifiers which are unique for the duration of the replicated application and identical across the plurality of replicated applications. Means for receiving first information associated with a first VSS call from the first replicated application is included in the apparatus. The first information includes a first call identifier of the first VSS call and a first digest. Means for receiving second information associated with a second VSS call from the second replicated application is included, the second information including a second call identifier of the second VSS call and a second digest. The apparatus includes means for determining whether the first digest matches the second digest in response to determining the first call identifier and the second call identifier are identical. The apparatus also includes means for signaling that aberrant behavior has occurred in response to the first digest not matching the second digest.

In another aspect, an embodiment provides a system for detecting aberrant behavior in a software application. The system includes a plurality of computing devices each computing device having at least one processor and at least one memory storing computer program code. The at least one memory and the computer program code are configured to, with the at least one processor, cause the system to perform actions. The actions include instantiating a plurality of replicated applications on the plurality of computing devices using identical initial setting. Each replicated application in the plurality of replicated applications is a replicated instance of the software application, and the plurality of replicated applications includes a first replicated application and a second replicated application. Deterministic behavior is enforced so that each replicated application thread executes VSS calls in the same sequence and generating call identifiers which are unique for the duration of the replicated application and identical across the plurality of replicated applications. Receiving first information associated with a first VSS call from the first replicated application is included in the actions. The first information includes a first call identifier of the first VSS call and a first digest. Second information associated with a second VSS call from the second replicated application is received, the second information including a second call identifier of the second VSS call and a second digest. In response to determining the first call identifier and the second call identifier are identical, the actions include determining whether the first digest matches the second digest. The actions also includes, in response to the first digest not matching the second digest, signaling that aberrant behavior has occurred.

BRIEF DESCRIPTION OF THE SEVERAL VIEWS OF THE DRAWINGS

Aspects of the described embodiments are more evident in the following description, when read in conjunction with the attached Figures.

DETAILED DESCRIPTION

Figure 1:
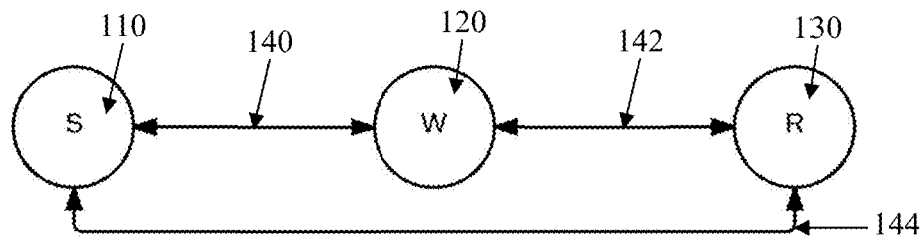
FIG. 1 shows a prototypical configuration of three elements in accordance with a first embodiment.

This patent application claims priority from US Provisional Patent Application No. 62/079,300, filed Nov. 13, 2014, the disclosure of which is incorporated by reference herein in its entirety.

A goal of various embodiments is to detect aberrant behavior, e.g., behavior that is not following the correct or expected course or is not typical or normal, in virtual software system (VSS)-aware applications, e.g., applications written using the VSS application program interface (API) library (however, other APIs are possible) and adhering to the protocols described later. Aberrant behavior is detected by comparing certain properties of the replicated instances of the application.

In one embodiment, a VSS-aware application is run on a configuration of several standard, connected virtual or physical hosts or even bare metal computers. In this embodiment, an application, replicated on each element, is configured to execute in an "aligned" fashion that permits the immediate, runtime detection of aberrant behavior. Together, the elements operate symbiotically to ensure proper functioning with each element as one symbiont. One additional advantage of this embodiment is that the underlying operating system (OS) need not be modified to facilitate the VSS-aware application.

As used herein, a "host" includes a bare metal system (e.g., having a processor, memory, storage, network, etc.), a computer (e.g., a bare metal system with an OS), a virtual machine (e.g., the OS), and/or a process (e.g., computing resources and resource management). An "element" includes the set of the VSS library, an application, a thread scheduling service, and the resources required by the application (such as services, computing and communication). In contrast to conventional applications, these replicated applications are controlled so as to be deterministic. Determinism is enforced in each application thread instance and methods may be used to compare, pair wise, certain properties of the replicated threads, to determine with practical certainty whether aberrant behavior is occurring.

A multiplicity of hosts can run replicated instances of an application in a cross-host, thread session logical aligned manner. Two instances of a multi-threaded application are said to be cross-host logically aligned if the sequences of states that each of their threads go through are identical.

Some embodiments influence the operating system thread scheduler, eliminating non-determinism under normal conditions. Normal conditions describe an environment free from unexpected events, such as hardware failures, security breaches, or "Heisenbugs" (computer programming jargon for software bugs that seem to disappear or alter their behavior when one attempts to study them). In such an environment, abnormal conditions produce aberrant behavior, which is detected, with high probability, as divergence.

In addition, various embodiments can control the input of data for each replicated application instance. By eliminating thread scheduler non-determinism and by enforcing identical input data, continued thread alignment across all elements is provided. By monitoring both input and output data, an embodiment can detect a divergence between two or more instances of an application.

This detection of divergence enables the detection of numerous, possible faults with a simple check. Thus, hardware failures and security breaches (as well as other fault sources) can be detected without analytics designed specifically to identify the distinct causes of the faults. Once the existence of a fault has been detected it may be processed in a fault handler, for example, to determine whether the fault was caused by a hardware failure and to determine appropriate corrective actions. If the fault handler determines the fault is not caused by a hardware failure, the handler may determine that an attack has occurred. Additionally, once an element determines a co-element to be divergent, the element may cease communicating with the divergent co-element and future communications from that divergent co-element may be ignored.

Various embodiments are described from two perspectives: a "User Interface" perspective based on the programmer's view and what the programmer could do to obtain such benefits; and a "Theory of Operation" perspective based on the internals of various embodiments and how they accomplish the stated benefits.

In this document, Virtual Software System, VSS, and VSS machine are used interchangeably. Also, the word "computer" or "host" is used to mean either a physical computer or a virtual computer. The VSS Engine may be viewed as the software layer that implements the technology. This layer includes a set of cooperating command processing interpreters which enable the thread alignment technology. Furthermore, reference to various components as VSS components (such as a VSS engine, VSS API, etc.) is for illustration purposes only, and features of the described VSS components may be present in components not so labeled (such as an engine, API, etc.). A process is the embodiment of the execution of a program or application. A process is composed of a multiplicity of threads. Each thread, or locus of control, is associated with a sequence of instructions and calls. An instruction is a low level computational step that is similar to what the hardware provides. A call is an invocation of the VSS API library. A call is a higher level action typically requiring several instructions and often involving interactions with the environment (for example, the operating system) or the external world (for example, disk, printers, or networks).

An application action, or action, is a procedure requested by the application via a VSS API call. Examples of actions are I/O data reads or writes, creation and management of threads and locks, etc.

An instruction stream is an ordered sequence of instructions generated by a processor in the act of interpreting a program.

A VSS call stream is an instruction stream sub-sequence containing the calls to the VSS engine, made over the period of time over which a process runs and interacts with the world, whether by controlling an entity or by modifying persistent data. A VSS call stream begins when an "initial thread" is started with given input data and it continues as additional data is input and output and additional threads are created and terminated. Various embodiments take advantage of the benefits of having multiple sessions of a given program that run on different computing elements or on the same computing element but at different times. Such embodiments overcome the problem of two identical sessions not evolving identically as seen in a traditional computing environment and verify the consistency of the sessions to detect unexpected events.

A thread session is the set of all time-ordered activities that are carried out during the execution of a thread instance from its creation until its termination.

A token is a data structure that maintains the state of an API call. It is maintained by the CM and is not accessible by the application.

A private network is the set of unidirectional communication channels to and from each co-element. These channels are private, i.e., carry only communication between co-elements.

In one, non-limiting embodiment, the VSS Engine includes a control mechanism (CM) component which when incorporated in a VSS-aware application causes multiple thread sessions on one or more computing elements to be logically aligned, e.g., to evolve identically. A deviation from logical alignment among session threads is called divergence. The system may check for alignment when processing output commands and/or when requested by the applications (for example, when responding to a synchronization check (Sync_Check) command). The CM may also be implemented as a plurality of threads. Functions of the CM may be distributed over multiple machines (both virtual and physical).

An application-set is the set of VSS-aware application instances replicated on a set of elements.

A digest is a representation of a given datum so that if two digests are equal, then the corresponding data are equal, with high probability, and if the digests are not equal, then the corresponding data are not equal, with absolute certainty.

In some embodiments, each host contains an operating system (OS)-like thread scheduler. The scheduler allocates a processor to a ready-to-run thread according to the scheduling algorithm. The result of each allocation is expected to be non-deterministic.

In one embodiment, each element provides unidirectional communication channels or private network, to and from each co-element. These channels are private, e.g., carry only communication between co-elements. In other non-limiting embodiments, bidirectional, unshielded twisted pair (UTP), encrypted, and/or proprietary channels may be used.

Some of the embodiments may be considered in the context of a set of computing elements, each of which executes the same VSS-aware application together with a respective local VSS Engine, one for every element. Although in one embodiment three elements are used to implement the VSS technology, from an external perspective they appear as a single computer. In further, non-limiting embodiments, the number of elements used may be more than three or may be only two elements.

In the three element embodiments, each computing element plays a specific role, Scout (S), Wing (W), or Rear (R). The details of a particular VSS Engine's action are dependent on its corresponding element's particular role.

FIG. 1 shows a configuration used to present the VSS Engine, together with its private communication channels in accordance with an embodiment. The three elements are ordered from S 110 to W 120 to R 130 and that direction is called "downstream". The reverse direction is called "upstream". The directed ordering contributes to the implementation of delay-controlled execution, wherein the S element 110 leads, W 120 follows with a specified delay, and the R 130 follows with an additional delay from W. The S 110, W 120 and R 130 elements are connected via private communication channels 140, 142, 144. The channels 140, 142, 144 may, optionally, be encrypted.

The picturesque names "scout", "wing", and "rear" are adopted from common usage where scout (S) is assigned the role of leader. The S element 110 is intended to not be delayed by the alignment algorithm, thus moving ahead of the other two. The W element 120 is intended to be the check on S. It is used as a source for dynamic consistency checking, that is, checking continuously while the sessions are active. In one embodiment, the R element 130 may be delayed a certain amount, and, therefore, holds a picture of the session in the past. It provides a glimpse of what was occurring before divergence. A third element may be also used to break a tie if the other two are not consistent, in order to better pinpoint the source of divergence. Whenever the scout 110 has to make a choice, that choice is communicated to the other elements via the private communication channels 140, 142, 144 between pairs of elements. These channels carry a variety of other messages as well.

Each non-scout element 120, 130 may enforce a configurable execution delay dx from its adjacent upstream element. Such delay may be expressed in the number of API calls and may be different for each element. This delay may also be zero. In the time domain, delays will range from microseconds under an uninhibited performance regimen to several seconds, according to the delay policy.

Any entity associated with a role (e.g. element, processor, VSS engine, CM, thread, application, instruction stream, call stream, VSS services, etc. of the S 110, W 120 or R 130) has a corresponding entity associated with each of the other roles. As used herein, that association is denoted by the "co-" prefix, so that an entity in a role corresponds to its co-entity in each of the other roles. For example, the co-CMs of the scout are the CM in the wing and the CM in the rear. Similarly, an entity suffixed by the "-set" suffix denotes the set of corresponding entities in all roles. For example, a threadA-set denotes scout threadA, wing threadA, and rear threadA.

Figure 2:
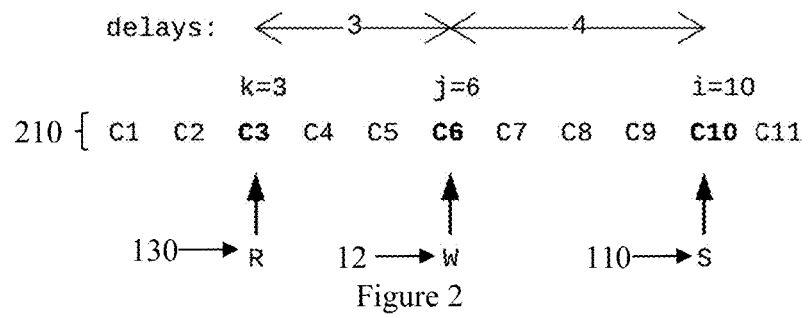
FIG. 2 illustrates a time-shifted call stream common to all sessions in the first embodiment.

FIG. 2 illustrates the lag between executions on the three elements 110, 120, 130 in the prototypical configuration. Each element 110, 120, 130 sees the same instruction stream but not at the same wall-clock time.

During a session a thread encounters calls 210 labeled Ci for i=1 to 11, as shown in FIG. 2. In FIG. 2, S 110 is executing call i W 120 is executing call j, and R 130 is executing call k, where i>=j>=k. FIG. 2 is a snapshot across the three elements 110, 120, 130 showing where the various sessions are currently executing with the delays clearly represented. In the snapshot shown, W 120 is operating at a delay of 4 calls behind S 110 and R 130 is operating at a delay of 3 calls behind W 120.

Additionally, while S 110 operates in advance of the W 120 and R 130, S 110 may pause its operation and wait for W 120 and/or R 130 to catch up in order to check consistency between the various elements 110, 120, 130. When waiting for co-elements 110, 120, 130, various clocks internal to the co-element 110, 120, 130 may also be paused, such as time-out clocks. Once alignment has been confirmed (for example, by ensuring consistency of various values among the co-elements 110, 120, 130) and operation resumed, these internal clocks are also resumed.

One aspect in maintaining alignment among the session instances is maintaining control of I/O inputs and outputs especially in the case of single-ended devices. These are devices that, by their nature, produce information that cannot always be replicated, such as file timestamps or transient network data. On the contrary, multi-headed devices are replicated, so that redundant elements can read inputs independently of each other, such as mirrored storage volumes.

Figure 3:
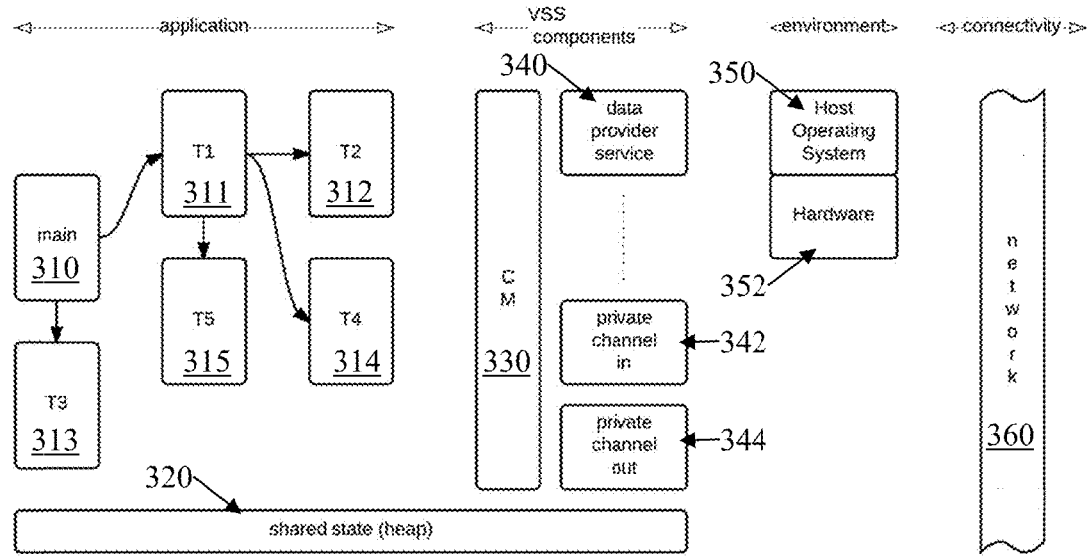
FIG. 3 demonstrates a software environment of an application in accordance with the first embodiment.

The environment available to the application, and to all its instances, is shown in FIG. 3. It is shown as a tree of threads T1 through T5 311, 312, 313, 314, 315, rooted by the initial thread "main" 310. In addition to shared state (heap memory) 320, a VSS-aware application interacts with the CM 330, introduced above, which mediates interactions of the application threads with each other and with the rest of the external world. The CM 330, in turn, interacts with the VSS services, such as a number of data provider services 340, and private input and output channels 342, 344 to all co-elements.

OS services that manage shared resources have a corresponding VSS service. The VSS services add information which allows the CM 330 to distinguish between a true divergence and an "apparent" divergence. A true divergence is caused by an event external to the application that causes an application thread to take a different execution path. An apparent divergence would have some of the symptoms of a true divergence, but ultimately would not change the path. An example of an apparent divergence is a successful retry of a disk read. VSS software masks these symptoms in these cases so that only true divergences are detected.

The applications and VSS components may also interact with the computing environment such as with the host operating system 350 and hardware 352. Such interaction by VSS components may be performed through the CM 330. Connectivity may also be provided via a network 360.

Figure 4:
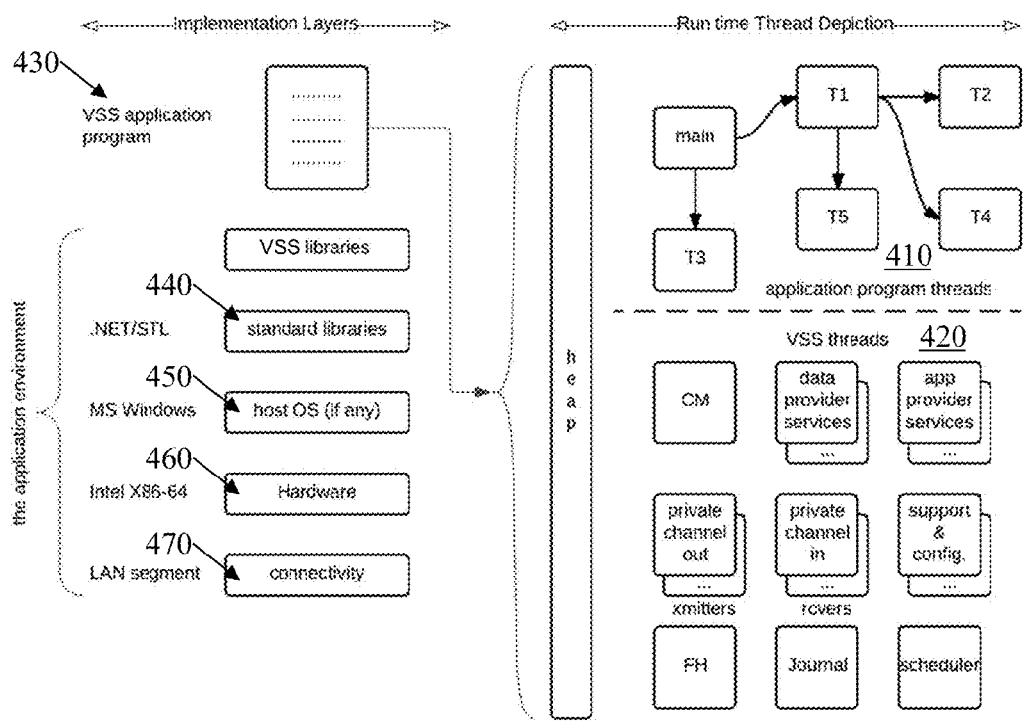
FIG. 4 demonstrates an alternative view of the application environment in accordance with the first embodiment.

FIG. 4 is an alternative view of the application environment. It shows a representation of the run-time thread environment, where both the application program threads 410 and the VSS threads 420 are shown in the "VSS application program" layer 430. Underneath this layer 430 is the application environment represented by the standard lower level layers (for example, of a Windows system): libraries 440, OS 450, hardware 460 and connectivity 470.

A reference application is the application code as it would be written for a standard, non-VSS host. In one, non-limiting embodiment, in order to be VSS-aware, an application should meet the following requirements:

1. The VSS protocols, described below, are followed.
2. Standard platform calls, e.g., .NET calls, for which a corresponding VSS API call is defined below, are replaced by their corresponding VSS API calls. VSS API calls are not to be circumvented or worked around.
3. Every VSS API call in the application is given a static call identifier, which is a session-unique name in the modified application source code. The static call identifier operates as a disambiguator.

The VSS Engine is started by the application via a call to the VSS software. It shuts down when all VSS application threads terminate. VSS Software includes the VSS API plus the VSS Engine, and may also include miscellaneous modules used to manage a VSS system. Application threads are managed via VSS API calls. A thread is terminated when all of its calls are completed. A call runs from the time its callID is first encountered, until its co-digests have all been processed.

In one embodiment, the application first calls the VSS_Engine_Start routine inside the VSS software, and passes the private channels, the element role, the initial application thread name, a reference to the initial thread, and the VSS Engine completion object with the call. As a result, the VSS Engine and the application initial thread are both instantiated and started.

In one embodiment, the application first connects to the VSS Engine, and passes the initial application thread name, a reference to the initial thread, and the VSS Engine completion object. The application is configured to work in the VSS environment during application installation.

In this, non-limiting embodiment, the initial thread is passed into the engine with the Register_Initial_Thread call. All other threads are instantiated as follows: create the thread, register it with a VSS API Register_Thread call, and then start it with a Start_Thread call. The thread lives independently thenceforth. The first action in all threads is a VSS API Begin_Thread call and the last action is a VSS API End_Thread call.

VSS API calls can fall into one of three broad categories: flow control, consistency checking, and host generated data (for example, from an OS call). Flow control includes thread lifetime control and concurrency control. Consistency checking includes all I/O and explicitly requested co-thread data comparisons. Host generated data includes without limitation such information as GUIDs (globally unique identifiers), random numbers, timestamps and file related data, and the current time of day. Since there are multiple elements, each capable of generating such data, and since the CMs on the several elements expect the state of the various sessions to be consistent, there should be a single source of the information and the data is distributed to the sessions, each on its own element. This phenomenon is called "single-ended input" since there is but a single source of the information. Reading or generating such data in separate co-threads can result in inconsistent values (e.g., non-determinism).

Tables 1-4 group the VSS API calls into Flow Control, Determinism Control, Consistency Checking, and Host Generated Data. The API calls shown in these tables are part of one non-limiting example. Additional calls may also be included and/or the calls may differ in syntax and function in further embodiments.

TABLE 1

Flow Control Calls

| Call Syntax | Semantics |
| --- | --- |
| Register_Thread (Static Call Identifier, Reference To The Thread To Register, ThreadID or null) | If the ThreadID (argument 3) is not provided then use the Session Independent, Thread Naming Algorithm to generate an ID for the thread referenced by argument 2. |
| Begin_Thread (Static Call Identifier) | W and R, not being enabled, wait for the S to reach a call that is equal to the delay (in calls) between S and W (similarly S and R) whereupon W and R can begin to execute. Begin_Thread is where W and R wait for S to make sufficient progress. Calls issued before Begin_Thread throw an exception. |
| End_Thread (Static Call Identifier) | Messages are sent to downstream co-elements as a blanket enable for all outstanding calls. Then the application thread is released. End_Thread also retires the thread when the number of issued calls equals the number of completed calls. Calls issued after End_Thread throw an exception. |

TABLE 1-continued

Flow Control Calls

| Call Syntax | Semantics |
| --- | --- |
|  | retires the thread when the number of issued calls equals the number of completed calls. Calls issued after End_Thread throw an exception. |

As shown in Table 1, various calls can be made to control thread lifetime. Threads are registered using Register_Thread, started with Begin_Thread and ended with End_Thread.

TABLE 2

Determinism Control Calls

| Call Syntax | Semantics |
| --- | --- |
| Acquire_Lock (Static Call Identifier, Lock Name) | Lock is representative of a large number of concurrency control primitives. If the lock is granted to the thread of the call then that thread is released by the CM. Otherwise, the callID is put on a queue associated with the lock and the calling thread is blocked until it is given the lock. |
| Release_Lock (Static Call Identifier, Lock Name) | When the current holder of the lock releases it, the first thread on the lock sequence queue (LSQ) that follows the order of grants established by the lock leader (for example the Scout) is granted the lock, if the specified thread is ready to run, and the thread is removed from the queue. If the lock's queue is empty then the lock and all associated scheduling structures are no longer needed. Both threads, that of the releasing call and that of the acquiring call, are released by the CM. |

The calls described in Table 2 establish and release locks for threads. Locks may be used to ensure threads do not interfere with each other when accessing data such as when reading or writing.

TABLE 3

Application Data Calls

| Call Syntax | Semantics |
| --- | --- |
| Input_Data (Static Call Identifier, Source Address[a file path or URI], Reference to Data Object) | The CM inputs data by sending a Data Provider Command to the data provider. Once the data is obtained it is passed to the CM to form a digest and record information about the call in the call's token. The digest is passed to the co-engines so that each co-call can test for consistency. Each engine tests locally and, from that information alone, determines how it will act in the future. Each engine determines only its own behavior, not the behavior of any other engine. If the data is consistent then it is passed to the application program. Otherwise, a fault condition exists and the fault handling policy is invoked. This is a Read-like call. |
| Single_Ended_Input_Data (Static Call Identifier, Source Address[a file path or URI], Reference to Data Object) | S inputs data as in the Input_Data call, returns it to the application, and forwards the data to W and R. The callID is included with the data forwarded and is used to determine the corresponding call to be executed by W and R. This is a Read-like call. |
| Output_Data (Static Call Identifier, Destination [a file path or URI], Reference to Data Object) | The CM forms a digest and sends it to the co-engines. When it receives the digests of other elements, it outputs the data if, and only if, the digests are consistent. Otherwise, no output occurs, a fault condition exists, and the fault handling policy is invoked. This is a Write-like call. |

TABLE 3-continued

Application Data Calls

| Call Syntax | Semantics |
|---|---|
| Sync_Check (Static Call Identifier, Reference to Data Object) | Form a data object that includes whatever the application wishes to have checked across elements. A digest of that object is used as the basis for comparison between each pair of co-elements. Any inequality is evidence of divergence. For example, it may be used in an execution path where other VSS API calls are not appropriate. |

Using tokens when the first VSS component, such as the S 110, reaches a particular point in its progression (e.g., an I/O action) the VSS engine uses the results of the call to ensure the co-components are either presented with the same data or produce the same data.

TABLE 4

Host Generated Data Calls

| Call Syntax | Semantics |
|---|---|
| Create_GUID (Static Call Identifier, Reference to Data Object) | S obtains a GUID and returns it to the user program. It also forwards the datum to the other elements. The callID is included with the data forwarded and is used to determine the corresponding call to be executed by W and R. This is a Read-like call. |
| Get_Time_Of_Day (Static Call Identifier, Reference to Data Object) | S obtains the TOD (time of day) from the OS, returns it to the application, and forwards the data to W and R. The callID is included with the data forwarded and is used to determine the corresponding call to be executed by W and R. This is a Read-like call. |

Using the calls shown in Table 4 the VSS components can replace the same host generated data. Thus, the W/R 120, 130 are provided the same information as the S 110 so that all components 110, 120, 130 can proceed identically regardless of the order of element activity.

The definition of a generic call (shown below Table 10) provides values for the common fields. Some of these are filled automatically from the environment. Others are provided by the user in the VSS API call as shown in the example in Table 5, where a read from a disk is used as the requested action. The semantics of the example follow the C# language; in particular, "DataRead" is fully constructed when the data is returned.

TABLE 5

Example of Application Invoking a VSS API Call

| User's Code | Discussion |
|---|---|
| X = 1; | Typical statement |
| byte[ ] DataRead; | Declare the variable "DataRead" to point to an array of bytes |
| Input_Data("our first call", "C:\\ input\test.txt", DataRead); | The call, in this line of code, is labeled "our first call". No other "Input_Data" call is labeled the same way. The path to the input file is provided as a string, "C:\\ input\test.txt". The bytes read are put in the array "DataRead". |

TABLE 5-continued

Example of Application Invoking a VSS API Call

| User's Code | Discussion |
|---|---|
| Y = 2; | Typical statement, not executed until the call is allowed to continue by action of the CM. |

The VSS Engine uses various interpreters to provide the CM, the Private Network, and several Data Provider services. An instruction set is the set of all instructions that a given interpreter is capable of processing. A command is an instance of an instruction from an interpreter's instruction set. There are several groups of VSS commands, such as CM (VSS API call generated or internally generated), Private Network, and Data Provider.

A data provider service is any of a number of services that service I/O devices.

An application-provider service is any of a number of services that interface to other applications, whether VSS enabled or not.

An action is a device request, such as for data retrieval or data storage, that is serviced by a Data Provider Service.

A token or dossier is a data structure that maintains the state of a VSS API call. It is maintained by the CM and is not accessible to the application.

A map is a data structure that maintains a correspondence between a name and an associated value, e.g., between a callID and its Token_Structure.

VSS API calls are converted into CM commands using a VSS API Call to Command Conversion. The internal operation of the VSS Engine is based on processing commands, some of which are generated internally by the VSS Engine, and some of which are generated from the corresponding VSS API call. The execution of each VSS API call expands in the same way into its associated command, namely, it creates the command structure, sends it to the CM, causes the VSS API call's thread to wait until the CM has completely processed the command, and then continues executing the application thread. The call is not considered completed until all digests have been matched. The specifics are shown in Table 6.

Table 6 shows the steps to create a VSS API Call. Steps shown in the table may be executed intermittently over time as information becomes available.

TABLE 6

Creating a VSS API Call Command

| Step | Action | Discussion |
|---|---|---|
| 1 | Create a wait object. | A wait object is an entity that the host can schedule using the OS "wait" queue. |
| 2 | Set the wait object to block execution. | If the wait object were a gate this would close it. |
| 3 | Put a reference to the object in the command data structure so that the CM can access it. | The CM accesses only passed data. This restricts the CM's access to data that is not its own. |
| 4 | Queue the command on the CM's input queue. | The CM interprets the commands in its input queue as actions it should perform. |
| 5 | Ask the host OS to wait on the wait object. | The OS will pause the current application thread until the specified object is "signaled". That occurs when the CM tells the wait object to change its state. Then the thread holding the original call is put in the ready-to-run queue for action by the operating system. If this were a gate it would now be open. |

The VSS Architecture includes functional operations at a high level. While the general approach employed in the VSS Architecture can be applied to a variety of configurations of elements, it is presented with respect to three elements (the S 110, the W 120, and the R 130 as previously discussed). Using three or more elements allows the system to both identify divergent activity and potentially recover. In other non-limiting embodiments, two elements may be used to identify divergent activity alone.

Figure 5:
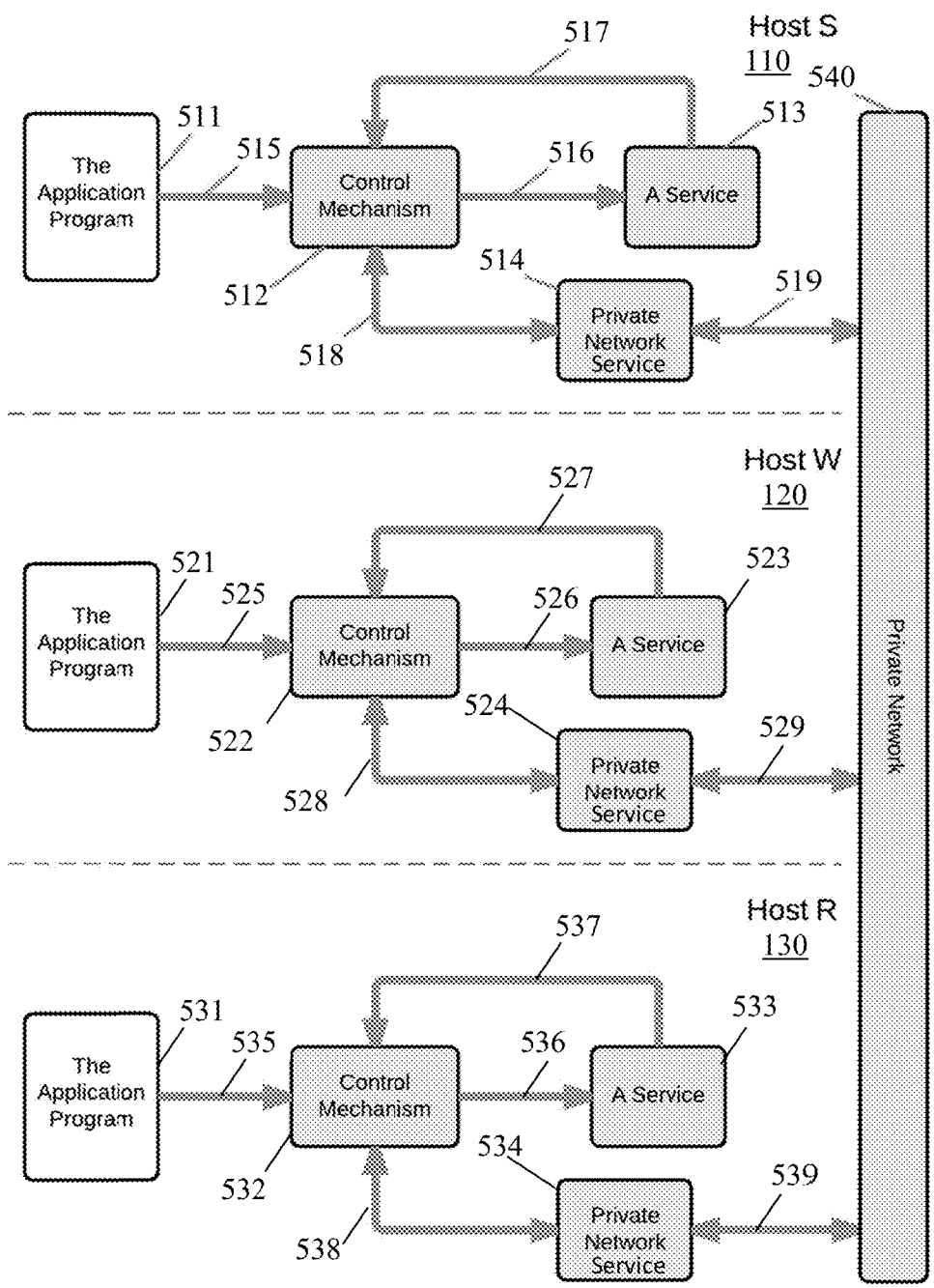
FIG. 5 presents an architectural view of a three element configuration in accordance with an embodiment.

FIG. 5 presents an organizational view of the three elements 110, 120, 130 connected by a private network 540 used for inter-element communication.

Operation of the VSS architecture is described in terms of using three elements for illustration of operation, recognizing that two elements or more than three elements may be employed. Note that in a two-element embodiment alignment can still be achieved and divergence can still be detected, but the aberrant behaving element cannot be identified. Three elements 110, 120, 130 are shown to better demonstrate how the VSS Architecture coordinates processing among multiple elements.

As shown in FIG. 5, the VSS Architecture includes, in one embodiment, three components: (1) the Control Mechanism (CM) 512, 522, 532, (2) services that perform actions (represented by a single exemplar, "A Service" 513, 523, 533), and private network services 514, 524, 534 that communicates with the CM 512, 522, 532 on the associated element 110, 120, 130 using a communication channel 518, 528, 538 and connects to the private network 540 via a communication channel 519, 529, 539.

The CM 512, 522, 532 are the information aggregators and control action within the element 110, 120, 130. What is a single act in a reference system becomes a sequence of actions that occur when the information to carry them out becomes available. Even after the functional effect of an act is available, the CM 512, 522, 532 evaluate additional information that arrives later but should be considered when imposing the consistency and determinism constraints. This function is accomplished by, for example, keeping the tokens of VSS API calls after the calling thread has been released and by comparing the digests as they are received from the co-elements 110, 120, 130.

Service 513, 523, 533 represents any service(s) that may be used by the application 511, 521, 531. Information provided (such as by the operating system or other software control) is processed by the VSS software to meet the goals of determinism and consistency. Examples include persistent storage (e.g., disk access), and other common operating system services such as the time of day, details about files, and the generation of globally unique identifiers. The specific details of a service's operation are modeled in this description by a generic service that is sent a command 516, 526, 536 to perform an action and, eventually, return a result to the CM 512, 522, 532 as shown by arrow 517, 527, 537. Further detail is not needed for the presentation of the alignment algorithm. However, different processing may be applied to input data, as contrasted with output data, and that is shown below.

Communication among the elements 110, 120, 130 is carried out using a private network 540 that may be an encrypted channel such as secure socket layer (SSL) and/or, if sufficient hardware is provided, a separate, physical cable with separate network adapters, or any combination of the two.

Each element 110, 120, 130 contains computational units, e.g., 512, 513, 514 of S 110, and shows the flow of information between them as arrows e.g., 515-519 of S 110. The private network, 540, is common to all elements 110, 120, 130.

The application 511, 521, 531 is the same in each element 110, 120, 130. Application actions that require the intervention of the VSS software are named "calls". A call is an invocation of a routine in the VSS API library. Each routine populates an instance of a data structure called the Command_Parameters_Structure, see Table 10, wherein information 515, 525, 535 is passed to and received from the VSS software by passing the structure to the CM 512, 522, 532.

The CM 512, 522, 532 and the services, 513, 523, 533 and 514, 524, 534, also pass commands to the CM as shown by message 517, 527, 537 and message 518, 528, 538. Additionally, the CM 512, 522, 532 passes information to itself through the formal channel of the CM's queue. Focusing on a single element, e.g., S 110, information received from co-elements flows through the private network 540 by channel 519 to the private network service 514 thence by channel 518 to the CM 512. Information sent to co-elements 120, 130 flows via channel 518 from the CM 512 to the private network service 514 and thence via 519 to the private network 540 and on to the destination.

Acting as an interpreter, the CM 512, 522, 532 removes a command at the front of its input queue, determines whether it is a call from the application or a command generated by itself or a co-CM 512, 522, 532 in another element 110, 120, 130. If the command is a call, a unique ID is generated for it which is unique across all threads and for the duration of the session. The ID will be the same wherever it is generated (S 110, W 120 or R 130). Once identified, the command is associated with a token that will track the command's actions while it is executed by the CM 512, 522, 532. That token is persisted in the TokenMap that associates its callID with the token.

If the command at the front of its input queue does not derive from a VSS call then it is associated with the activity of a local service or a (remote) co-CM 512, 522, 532. If the command originated from outside the element, a token is still created for it, but no call action is taken yet. In either case, a command, as shown in Table 13 and Table 16, is processed using the token derived from the TokenMap.

Information that contributes to the formation of each digest may vary from embodiment to embodiment, and is not limited to I/O data and/or OS generated data. Such information may also include VSS Engine generated data, for example the CallID Additionally, data may be included in more than one form in the digest.

Figure 6:
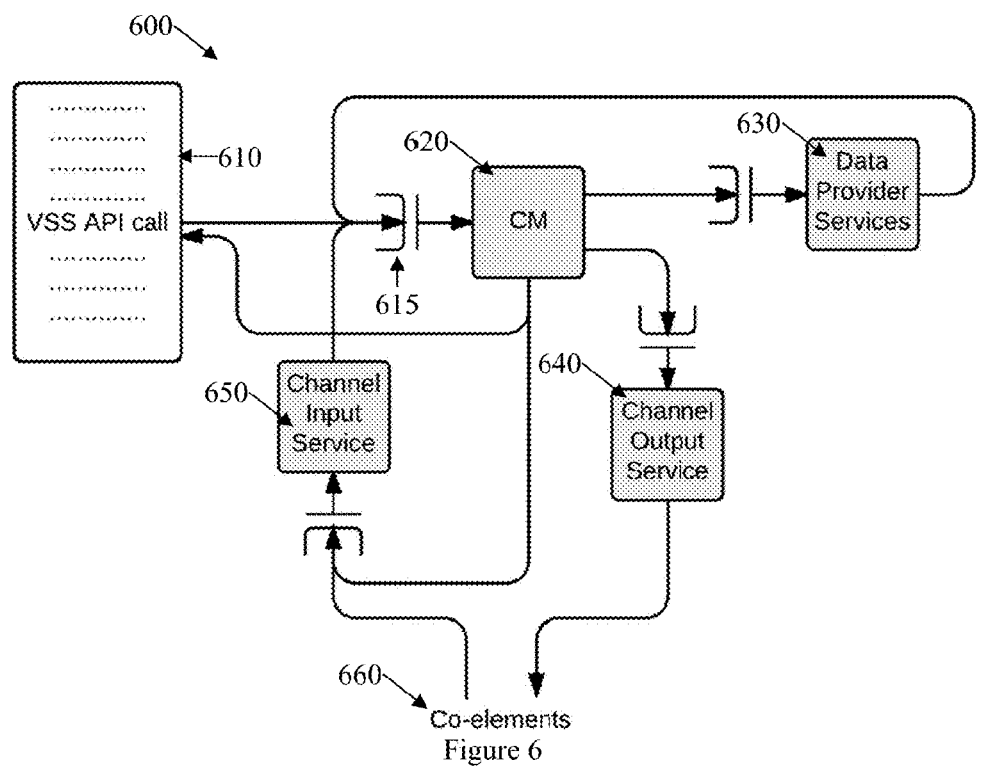
FIG. 6 shows an Engine Block Diagram in accordance with an embodiment.

FIG. 6 illustrates a subset of the VSS Engine block diagram at the command level. In this non-limiting embodiment, the only cross-session information transfer (e.g., a cross-host or cross-element information transfer) is the transfer of: digests, hints, and data for single ended I/O. In this non-limiting embodiment, the VSS Engine 600 is a set of independent producer/consumer non-blocking interpreters, each with its own queue. Each queue contains a sequence of commands encoded in a particular instruction set tailored to its purpose, such as I/O or journaling. The commands may invoke services 630, 640, 650 which may be data provider service 630, channel output service 640 or channel input service 650. The channel output service 640 and channel input service 650 allow the CM 620 to communicate with other co-elements 660.

Each action, such as an I/O request, which in a reference system might be performed by an OS call by application 610, is provided from the VSS API call queue 615 to the CM 620. The call is then passed by the CM 620 to a service 630, 640, 650 that performs the desired action and returns a completion command to the CM 620. The invocation is accomplished by queuing a command to the service's input queue.

In this embodiment, queues run under a lock. A fundamental operation of an interpreter consists of the following loop:
1. Lock its queue.
2. Retrieve an item from its queue.
3. Unlock its queue.
4. Interpret, e.g., process the item.

The intermediate effects of processing an item are stored in the CM data structures.

In one, non-limiting embodiment, the CM is single-threaded and its processing of every command is atomic with respect to every other command. In other words, once a command is drained from the CM input queue, it will be processed to completion and the CM data structures will be modified by the processing of that command.

The VSS Engine is a set of cooperating command processing interpreters. Algorithms using thread alignment technology are executed by issuing and processing these commands.

The control mechanism (CM) consists of a number of data structures to implement two algorithms that depend on one another and that will be described below in more detail. The CMs collectively but independently guide all sessions executing the same VSS-aware application to be identical. The CM implements mechanisms to:

1. uniquely name threads (assign them a unique ID) instantiated dynamically during a session;
2. create each name in a deterministic manner so that different sessions generate the same name;
3. ensure that, under normal conditions, all sessions in the configuration have the same initial states (data values), and inputs (data values); and
4. ensure that, when those unique names, initial states, and inputs are used, then all sessions will generate the same output and any divergence during a session can, and will, be detected.

In one, non-limiting embodiment, a configuration is used to describe where the application environment consists of hosts and local storage for each element. Other configurations are also possible, for example, environments where application data reside on a 3rd party database in the cloud.

The private network is used to move information between elements of the configuration. The Channel Output Service provides messages to each co-element in order. This is one of the mechanisms that enable the correct handling of locks. There are many public domain methods that provide in-order message delivery, e.g., Friedemann Mattern, Stefan Fünfrocken, "A Non-Blocking Lightweight Implementation of Causal Order Message Delivery." In: Ken Birman, Friedemann Mattern, Andre Schiper (Eds.): Theory and Practice in Distributed Systems, Springer-Verlag LNCS 938. pp. 197-213, 1995. Nothing in the design of the system prevents use of encryption over the private network.

In one embodiment, a command may be sent to a receiving element from the sending element by serializing it and transporting it in a simple envelope. At the receiving element the command is removed from the envelope and de-serialized. Thereupon, it is queued into the receiving engine's CM input queue for eventual processing. The commands passed over the private network are used for information passed between elements. Inter-element commands are not used locally within a CM.

The Data Provider services include devices used by the application, such as disk storage. Since the order of read and write commands to persistent storage should be respected, in order to avoid races, both operations are performed by the Data Provider service. To write data the CM queues a write command to the Data Provider service input queue. When the write is complete the service informs the CM with a completion command.

To read data the CM queues a read command to the Data Provider service input queue. When the read is complete the service informs the CM with a completion command that includes a reference to the data just read. After checking for cross element consistency, that data is passed to the application through a reference in the VSS API call.

If disk activity involves different files then parallel action is possible without the threat of a race. Optimizations such as this do not affect the algorithm being presented in this embodiment.

Figure 7:
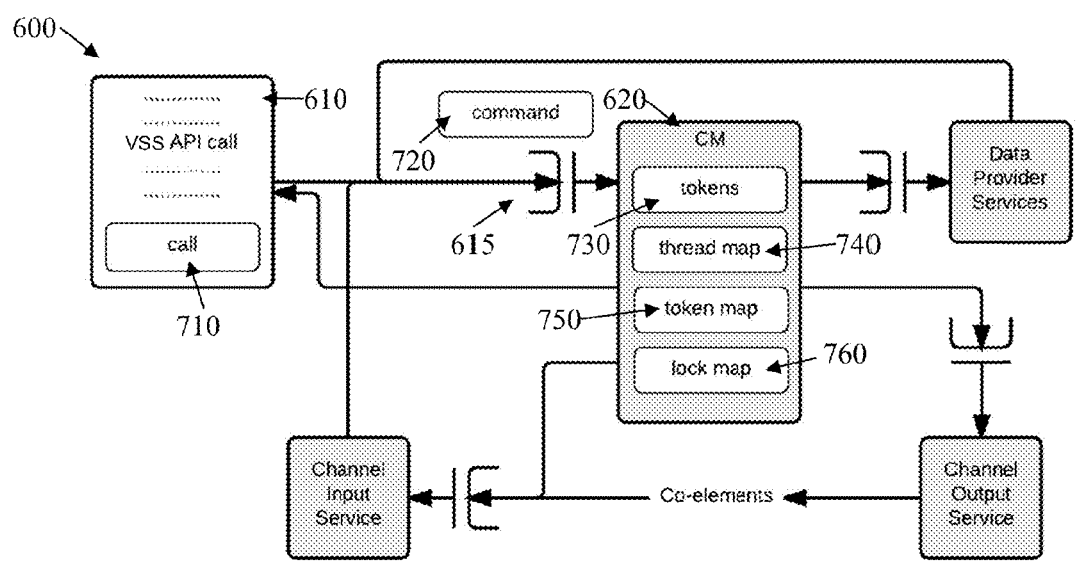
FIG. 7 shows data structures of the Engine in accordance with an embodiment.

VSS Engine Data Structures includes various data structures used by the VSS Engine. FIG. 7 shows data structures of the VSS Engine. They are described in detail in Tables 7-15.

As shown in FIG. 7, the application 610 issues various calls 710. The command structure 720 is passed to the VSS API call queue 615 then to the CM 620. The CM 620 in turn contains tokens 730, a thread map 740, a token map 750 and a lock map 760.

Example engine state variables are described in Table 7. These variables identify the role of the engine and provide an indication of any delay among engines.

TABLE 7

Engine State Variables

| State Variable | Description of Content |
| --- | --- |
| Engine_Role | Which role of S, W, or R is played by this VSS engine. |
| Engine_Delay | The number of calls that this element should lag the next element upstream. |

The thread state structures may include various fields, as shown in Table 8. These fields may be used to provide a call counter for the thread, a counter for the number of completed call, and a flag to indicate that the thread is terminated.

TABLE 8

Thread_State_Structure

| Field Name | Use |
| --- | --- |
| Thread_Call_Counter | Initially zero, the counter is incremented each time the CM processes a call, a command that comes from the application. Thus, the counter tells the number of calls processed including the current one. |
| Thread_Completed_Calls_Counter | Initially zero, the counter is incremented each time a call completes. |
| Begin_Thread_Flag | Initially reset, it is set once when the thread executes the Begin _Thread call. |
| End_Thread_Flag | Initially reset, it is set once when the thread executes the End_Thread call. Note: VSS Engine activity on a call lags behind the call |

TABLE 8-continued

Thread_State_Structure

| Field Name | Use |
| --- | --- |
| | completion from the application perspective, depending on the host delay. |

Table 9 shows various fields for a lock state structure. These fields track the current holder of the lock, which threads are waiting to acquire the lock and a list of blocked threads.

TABLE 9

Lock_State_Structure

| Field Name | Use |
| --- | --- |
| Lock_Grantee | The callID of the current holder of the lock. |
| Lock_Sequence_Queue | A queue of callIDs of threads waiting to acquire the lock. This queue records from the scout the established grant order for each co-host. |
| Lock_Ready_List | The collection of unordered local threads that are currently blocked waiting to be at the head of the Lock_Sequence_Queue, e.g., when all previous lock requests have been satisfied. |

As shown in Table 10, the command parameters structure includes various fields. The action to be performed and various operands are assigned to individual fields. Additional fields provide means to track call identifiers, the issuing thread, and various flags. The format of table 10 may be common to both call-derived commands and internal commands. Therefore, some fields may not make sense in all cases.

TABLE 10

Command_Parameters_Structure

| Field Name | Use |
| --- | --- |
| Opcode | Action to be performed (ex., read or write) |
| Operand_1 | Application supplied parameter, see Table 11 |
| Operand_2 | Application supplied parameter, see Table 11 |
| Operand_3 | Parameter of non-call command, see Table 13 |
| Static_Call_Identifier | Unique identifier for the instance of the call in the text of the program |
| Calling_Thread | Name of the thread from which this VSS API call is executed |
| Application_Thread_Release | Signal this entity to allow the waiting application thread to continue |
| Flags | "VSS API call" |

The operands described in Table 10 may include call parameters operands. These operands are described in Table 11. In this non-limiting embodiment, specific calls have associated operands. For example, the second operand for the 'Sync_Check' call is an internal location where data to be processed into a digest is located. In this example, the third operand is reserved. All calls pass a first argument that is the static call identifier and it is placed in the Command_Parameters_Structure as shown in Table 10, therefore the static call identifier, Operand 1, is not shown in Table 11.

TABLE 11

Call Parameters - Operand Specifics

| Call | Operand 2 | Operand 3 |
|---|---|---|
| Register_Thread | Reference To The Thread To Register | ThreadID (if provided by the call) |
| Begin_Thread | reserved | reserved |
| End_Thread | reserved | reserved |
| Sync_Check | Application internal location where data to be processed into a digest is located | reserved |
| Input_Data | External location where data is located | Reference to data object |
| Single_Ended_Input_Data | External location where data is located | Reference to data object |
| Output_Data | Reference to data object | External location where data is to be placed |
| Acquire_Lock | Lock name | reserved |
| Release_Lock | Lock name | reserved |
| Get_GUID | Reference to data object | reserved |
| Get_Time_of_Day | Reference to data object | reserved |

The fields of the token data structure are shown in Table 12. When a command is removed from the CM input queue, a CM token is created the first time a callID is encountered to hold the call-related state and it is modified by subsequent command actions until the state is no longer needed, whereupon it is dismissed from the CM.

TABLE 12

Token_Structure

| Field Name | Use |
|---|---|
| Command_Parameters_Structure | A reference to the call instance's Command_Parameters_Structure |
| Released | Set if the invoking thread has been released to continue processing. |
| Enabled | Always set if in S, otherwise set by an ENABLE command sent by the upstream element. |
| Initiated | A flag that is set when the action requested by the VSS API call is passed to a Data Provider Service. |
| Completed | A flag that is set when the CM processes the COMPLETION command associated with this call. |
| S_Digest | Contains a copy of the S digest. |
| W_Digest | Contains a copy of the W digest. |
| R_Digest | Contains a copy of the R digest. |
| Data | A reference to the data input from an external source or an internal environment (ex., from the OS) |
| Digest_Available | Each of the S_Flag, W_Flag, or R_Flag is set if the associated digest is available. Otherwise, it is reset. |
| Digest_Comparisons | Each of the S_W_Flag, S_R_Flag, or W_R_Flag is set if the associated digests were compared. If reset, the comparison has not yet been performed. |
| Error_Pattern | Each of the S_W_Flag, S_R_Flag, or W_R_Flag is set if the associated digests are not equal. Otherwise, the flag is reset. |

Table 13 shows a list of internal command parameters. For each internal command, various operands are detailed. Similarly to the calls described above, the first argument is a static call identifier.

As shown, the first operand is the callID. However, the callID may be encrypted without detriment to the system. In such embodiments, the encrypted callIDs are still internally unique to the hosts and, thus, serve to identify the individual calls.

TABLE 13

Internal Command Parameters

| Command | Operand 1 | Operand 2 | Operand 3 |
|---|---|---|---|
| UPDATE | callID | Digest | Role of source element |
| HINT | callID | Role of source element | lock name |
| DATA | callID | Data (itself) | reserved |
| ENABLE | callID | ThreadID | Thread_Call_Counter |
| ENABLEALL | callID | ThreadID | Thread_Call_Counter |
| COMPLETION | callID | Name of service identifier | Reference to Data Object |

Table 14 shows error patterns based on the flag value for the various token comparisons. If the tokens match, the flag value will be 'Reset' otherwise the flag is 'Set'. For example, if all tokens match, there are no inconsistent units. On the other hand, if two units match (e.g., the W and R) and the flag for the other comparisons is 'Set', then the S is the inconsistent unit. Determining which unit is inconsistent may not always be feasible, for example, if the comparisons between all sets of units are inconsistent.

TABLE 14

Error Pattern Interpretation

| S_W_Flag | S_R_Flag | W_R_Flag | Inconsistent Unit |
|---|---|---|---|
| Reset | Reset | Reset | none |
| Set | Set | Reset | S |
| Set | Reset | Set | W |
| Reset | Set | Set | R |
| Reset | Reset | Set | ambiguous |
| Reset | Set | Reset | ambiguous |
| Set | Reset | Reset | ambiguous |
| Set | Set | Set | ambiguous |

The CM contains three maps: a thread map, 'ThreadMap', a token map, 'TokenMap', and a lock map, 'LockMap'.

The ThreadMap associates a thread identifier with a thread state structure, see Table 8. The TokenMap associates a callID with a CM_Token, see Table 12. The LockMap associates a lock's name with an instance of a lock state structure, see Table 9.

The maps may be used in two ways: (1) to determine if a particular name is present in a name-value pair or (2) to associate a name with a value and return the value.

TABLE 15

Maps

| Map Name | Description of Content |
|---|---|
| Thread_Map | ThreadID → Thread_State_Structure |
| Token_Map | CallID → Token_Structure |
| Lock_Map | Lock_Name → Lock_State_Structure |

CM commands are processed by the CM and include both those derived by VSS API calls and those generated internally. Each action performed is a command. Some are generated by the app, some are generated by the local VSS Engine (local internal), and some are generated by a remote VSS Engine (remote internal). The commands processed by the CM fall into three categories. CALL is used when invoking the VSS API by the application. COMPLETION is used internally between a service and the CM. UPDATE, DATA, and HINT are used between co-sessions. The commands processed by the other interpreters are discussed below. Table 16 includes a list of various the CM commands.

TABLE 16

CM Commands

| Command Name | Use | Command Arguments |
|---|---|---|
| Register_Thread | Executed by the application to invoke the VSS API. | See Table 10 |
| Begin_Thread | Executed by the application to invoke the VSS API. | See Table 10 |
| End_Thread | Executed by the application to invoke the VSS API. | See Table 10 |
| Sync_Check | Executed by the application to invoke the VSS API | See Table 10 |
| Input_Data | Executed by the application to invoke the VSS API. | See Table 10 |
| Single_Ended_Input_Data | Executed by the application to invoke the VSS API. | See Table 10 |
| Output_Data | Executed by the application to invoke the VSS API. | See Table 10 |
| Acquire_Lock | Executed by the application to invoke the VSS API. | See Table 10 |
| Release_Lock | Executed by the application to invoke the VSS API. | See Table 10 |
| Create_GUID | Executed by the application to invoke the VSS API. | See Table 10 |
| Get_File_Timestamp | Executed by the application to invoke the VSS API. | See Table 10 |
| Get_Time_of_Day | Executed by the application to invoke the VSS API. | See Table 10 |
| COMPLETION | Informs the CM that a service operation associated with a call has completed. | call_ID, service completing, reference to data object |
| UPDATE | Command containing a digest of a co-call's information. | call_ID, digest, source's role |
| DATA | When data is input to the system from a source that might change the data if input a second time, it is necessary for the sake of consistency to input the data once and send it to co-sessions. S inputs such data and sends it downstream to W and R. | call_ID, data |
| ENABLE | Inform a downstream co-thread of the release of the calling thread. Until the co-CM receives the ENABLE for a call, it will only create its callID and token, if not already present. When the ENABLE arrives, the CM will advance processing of that call. ENABLE is sent at the same time as the release of the calling thread. | call_ID, Thread_ID, thread_Call_Counter |

TABLE 16-continued

CM Commands

| Command Name | Use | Command Arguments |
|---|---|---|
| ENABLEALL | Enable all calls in the immediate downstream co-thread. | call_ID, Thread_ID, thread_Call_Counter |
| HINT | Used to pass the choice made by an upstream thread when a lock is granted so that downstream threads make the same choice. [The semantics of a hint are role sensitive.] | call_ID, lock name |

Table 17 includes Non-CM commands such as those commands processed by the Private Network and the Data Provider services. The "channel in" commands shown in Table 17 describe commands used to receive messages and control listening functions. Similarly, Table 18 describes "channel out" commands used to send messages and control sending functions. Table 19 provides a list of commands for data provider services.

TABLE 17

ChannelIn Commands

| Command Name | Use | Command Arguments |
|---|---|---|
| Receive | When the message arrives on the input channel the message is sent as an aggregate to the Channel Input Service where the payload is deserialized into a well-formed command and queued to the CM. | message |
| Control | Used by the CM to control the behavior of the channel, for example to suspend listening. | channelID, control function |

TABLE 18

ChannelOut Commands

| Command Name | Use | Command Arguments |
|---|---|---|
| Send | The payload is first constructed by serializing a command to be processed by a co-CM. When the SEND command is executed by the Channel Output Service it transmits the payload to the destination CM specified by the destination's role. | payload, co-host role |
| Control | Used by the CM to control the behavior of the channel, for example to suspend sending. | channelID, control function |

TABLE 19

Data Provider Commands

| Command Name | Use | Command Arguments |
|---|---|---|
| Input_Data | Obtains input data from the specified location and returns it through the CM to the application after validating it with a co-digest | Reference to the internal location in which to put the data, the callID of the application request for input |
| Output_Data | Sends output data to the specified destination from the CM after the CM tests for equality between the local digest and a co-digest | Internal location in which to find the data, the callID of the application request for output |

Each command evolves over time through a succession of states wherein sufficient information has been collected to allow advancing to the next major state. Although this sequence of states appears to be serial and synchronous that is an illusion created by the CM. The information needed to allow advancement does not arrive in the same order as the succession of states would suggest. In fact, given a configuration of multiple copies of the same program running on time-shifted compute elements, even if events occur serially on one element they may not do so when information from all elements is aggregated. Note that, ultimately, each of the elements reacts to the same messages, even though, due to time shifting, messages from co-elements do not arrive in the same order with respect to local processing in each of the three cases, S, W, and R.

As a specific example, S might have completed a disk write call, REQ A, and allowed the invoking thread to continue. In that case, digest messages of REQ A's data have been sent to W and R. They may arrive before either W or R has even started processing the co-calls of REQ A. Even if time-shifting were not employed, the system processing delays could cause similar behavior.

The first steps in processing a call-generated command are:
1. Create a callID via the Session Independent Call Naming Mechanism.
2. If the callID is not contained in the TokenMap then add it together with a new CM_Token initialized with data from the call structure.
3. Wait until the enabled flag is set in the token.
4. Build a local digest based on the call and send an UPDATE.
5. Wait for at least one digest besides the local one.

Each call and thread instance has an identity within the CM that is unique during the session and is the same as its co-call and co-thread instance in each element. In short, corresponding entities have identical IDs—by construction.

In the detailed description of the individual command processing, the following steps are taken, even if they may not be called out explicitly. These particularly include:

1. Consistency Checking is performed.
2. The Initiated flag is set every time a command to a Data Provider Service is executed.
3. The Completed flag is set every time a COMPLETION command is processed.
4. The Released flag is set every time the calling thread is released.
5. The Enabled flag is set every time an ENABLE command is processed.
6. The calling thread release and the ENABLE, HINT, and UPDATE commands are all sent only once for a given callID.
7. The Digest_Available and the Digest_Comparisons fields are updated every time a local digest is generated or an UPDATE command is processed.
8. ENABLE commands are sent to the downstream co-session by scout and wing. Rear does not send ENABLE nor ENABLEALL commands, since it has no downstream co-sessions.

Also, the process of releasing the calling thread includes passing any input data back to the calling thread.

The order of actions to create a new thread under control of the CM is: (1) create the thread, (2) register the thread with the CM, and (3) start the thread. If the thread is started before registering then a call might be encountered before the thread is named, a violation of the naming algorithm. A thread cannot be named before it exists.

In the description to follow, there will be reference to a "Table" that is a "flowchart" in that the table is presented as a representation of the flowchart, with action sequences and "if" decision points described in the "actions" column of the table.

A call flowchart runs until either it completes or information is missing, typically indicated by a flag. When that happens, the flowchart waits: in other words, it becomes "blocked" or "non-executable", much like in a standard thread. After another flowchart makes that resource available, it also changes the flowchart state to "ready to run", so the original flowchart resumes executing from where it was blocked. Examples of such triggering flowcharts are UPDATE, COMPLETION, and DATA.

Note that in the flowcharts the phrase "release the calling thread" is meant to signify "if the released flag is not set, then release the calling thread and set the released flag".

Table 20 provides details of a thread registration.

TABLE 20

Register Thread Flowchart
Arguments:
reference to the thread to register
the thread's name (or null for "no argument"),
an application specified threadID

| actions | comments |
|---|---|
| Increment the Call_Counter in the Thread_State_Structure associated with the calling thread | |
| Name the call, i.e. set the callID | Use the call naming mechanism or the name passed as the second argument, if present. A passed name should be unique for the duration of the session. |
| If the callID does not exist in the TokenMap then create an empty token and add the pair (callID, new instance of the Token_Structure) to the TokenMap retrieve the token using the callID | |
| Set the thread's name to be the callID of the current call (the ID just generated) | Set the thread's name using the API call provided by the host OS |
| Construct an instance of the Thread_State_Structure with initial value (0, 0, reset) | These are the call's counters for this thread: one for the number of calls made, one for the number of calls completed, and a flag to indicate that the thread has terminated except for the thread's after-effects, its uncompleted calls |
| Add the entry "callID, Thread_State_Structure" to the ThreadMap | This is the state of this thread and is maintained until the thread is terminated by the CM after all outstanding calls have completed. Note that the threadID is the callID of the call that is registering the thread. Child thread IDs are unique since callIDs are unique. |
| Form a digest from the callID, "Register Thread", and the ID of the thread being registered or the name provided explicitly by the call | |
| Complete the call by the standard sequence of UPDATES of co-CMs with copies of the digest, perform digest comparisons, release the application thread, send an enable downstream, remove all call-related data from internal tables (TokenMap), and increment the "completed calls" counter in the ThreadMap process the next command | Since the call does not return until the digests are checked and the CM internal data structures are stable, there can be no races. Once the application continues the newly created thread can be started where it will immediately encounter a Begin_Thread call. |

TABLE 21

Begin Thread Flowchart
Arguments: no arguments

| actions | comments |
|---|---|
| Increment the Call_Counter in the Thread_State_Structure associated with the calling thread | |
| Name the call and set the callID | Use the call naming mechanism |
| If the callID does not exist in the TokenMap then create an empty token and add the entry (callID, new instance of the Token_Structure) to the TokenMap | Make and fill in a token using the parameters in the call. "Enabled" is reset in the token so that the thread will block before starting. This is the initial step for each thread in supporting time-shifted execution among engines. |
| retrieve the token using the callID | |
| Form a digest from the callID and "Begin Thread" | |
| Complete the call by the standard sequence of UPDATES of co-CMs with copies of the digest, perform digest comparisons, release the application thread, send an enable downstream, remove all call-related data from internal tables (TokenMap), and increment the "completed calls" counter in the ThreadMap | Begin_Thread is where W and R wait (e.g., block) while S moves ahead by the specified number of calls, and similarly R waits while W moves ahead. |
| process the next command | |

TABLE 22

End Thread Flowchart
Arguments: no arguments

| actions | comments |
|---|---|
| Increment the Call_Counter in the Thread_State_Structure associated with the calling thread | |
| Name the call and set the callID | Use the call naming mechanism |
| If the callID does not exist in the TokenMap then create an empty token and add the entry (callID, new instance of the Token_Structure) to the TokenMap | |
| retrieve the token using the callID | |
| Form a digest from the callID and "End Thread" | |
| Complete the call by the standard sequence of UPDATES of co-CMs with copies of the digest, perform digest comparisons, release the application thread, send an ENABLEALL downstream, remove all call-related data from internal tables (TokenMap), and increment the "completed calls" counter in the ThreadMap | End_Thread causes time-shifting to be suspended for downstream threads by enabling all outstanding calls. When the application is released it reaches the end of the code for the thread. Exiting the thread causes it to be removed from the OS and its scheduling mechanisms. |
| process the next command | |

Table 23 describes a process for executing an Input_Data command. During this process, once digests are sent to and received from co-hosts they are compared. When two digests are present, the data is passed to the calling thread and the thread is released. When there are three digests, the call is removed from the token map. The digests are also compared against each other, any disagreement between the digests is considered a divergence.

TABLE 23

Input Data Flowchart
Arguments: location of data (filepath or URI), where to put data obtained

| actions | comments |
|---|---|
| Name the call and set the callID | Use the call naming mechanism |
| If the callID does not exist in the TokenMap then create an empty token and add the pair (callID, new instance of the Token_Structure) to the TokenMap | |
| retrieve the token using the callID | |
| Perform the data input | |
| When input arrives, form a digest from address and data | |
| Send digest to co-hosts | |
| If 3 digests present, if digests match, then: | |
| Pass data to calling thread | |

TABLE 23-continued

Input Data Flowchart
Arguments: location of data (filepath or URI), where to put data obtained

| actions | comments |
|---|---|
| Release the calling thread | |
| Send ENABLE to downstream co-session | |
| Remove call's entry from the TokenMap | |
| Increment the Thread_Completed_Calls_Counter in the thread's Thread_State_Structure | |
| If 2 digests present, if digests match, then: | |
| Pass data to calling thread | |
| Release the calling thread | |
| Send ENABLE to the downstream co-session | |
| If any digests mismatch, divergence is detected | |
| process the next command | |

TABLE 24

Single Ended Data Input Flowchart
Argument: location of data (filepath or URI), where to put data obtained

| actions | comments |
|---|---|
| Name the call and set the callID | Use the call naming mechanism |
| If the callID does not exist in the TokenMap then create an empty token and add the pair (callID, new instance of the Token_Structure) to the TokenMap | |
| retrieve the token using the callID | |
| Perform the data input | (scout only) |
| When input arrives, form a digest from address and data | (scout only) |
| Send digest and DATA message to co-hosts | (scout only) |
| If 3 digests present, if digests match, then: | |
| Pass data to calling thread | |
| Release the calling thread | |
| Send ENABLE to downstream co-session | |
| Remove call's entry from the TokenMap | |
| Increment the Thread_Completed_Calls_Counter in the thread's Thread_State_Structure | |
| If 2 digests present, if digests match, then: | |
| Pass data to calling thread | |
| Release the calling thread | |
| Send ENABLE to the downstream co-session | |
| If any digests mismatch, divergence is detected | |
| process the next command | |

A process for outputting data is shown in Table 25.

TABLE 25

Output Data Flowchart
Arguments: location where to put data (filepath or URI), reference to data to be output

| actions | comments |
|---|---|
| Name the call and set the callID | Use the call naming mechanism |
| If the callID does not exist in the TokenMap then create an empty token and add the pair (callID, new instance of the Token_Structure) to the TokenMap | |
| retrieve the token using the callID | |
| Form data digest from address and data | |
| Send digest to co-hosts | |
| Receive digests from the co-hosts | |
| If 3 digests present and match, then: | |
| send the output command to the data provider | |
| Release the calling thread | |
| Send ENABLE to downstream co-session | |
| Remove call's entry from the TokenMap | |
| Increment the Thread_Completed_Calls_Counter in the thread's Thread_State_Structure | |
| If 2 digests present, if digests match, then: | |

TABLE 25-continued

Output Data Flowchart
Arguments: location where to put data (filepath or URI), reference to data to be output

| actions | comments |
| --- | --- |
| send the output command to the data provider<br>Release the calling thread<br>Send ENABLE to the downstream co-session<br>If any digests mismatch, divergence is detected<br>process the next command | |

A synchronization check process is shown in Table 26.

TABLE 26

Sync_Check Flowchart
Arguments: Application internal location where
data to be processed into a digest is located

| actions | comments |
| --- | --- |
| Name the call and set the callID<br>If the callID does not exist in the TokenMap then<br>create an empty token and add the pair (callID, new<br>instance of the Token_Structure) to the TokenMap<br>retrieve the token using the callID<br>Form data digest from the data<br>Send digest to co-hosts<br>Receive digests from the co-hosts<br>If 3 digests present and match, then:<br>Release the calling thread<br>Send ENABLE to downstream co-session<br>Remove call's entry from the TokenMap<br>Increment the<br>Thread_Completed_Calls_Counter in the thread's<br>Thread_State_Structure<br>If 2 digests present, if digests match, then:<br>Release the calling thread<br>Send ENABLE to the downstream co-session<br>If any digests mismatch, divergence is detected<br>process the next command | Use the call naming mechanism |

A host generated data call process is shown in Table 27.

TABLE 27

Create GUID Flowchart
Arguments: where to put the data in the application

| actions | comments |
| --- | --- |
| Name the call and set the callID<br>If the callID does not exist in the TokenMap then<br>create an empty token and add the pair (callID, new<br>instance of the Token_Structure) to the TokenMap<br>retrieve the token using the callID<br>If the role of this CM is S<br>then get a GUID from the OS and put a reference to it<br>in the token's "data" field, send a "DATA" message to<br>the each of the other co-CMs, form a digest from the<br>callID, "create_guid", and the GUID itself and store<br>the digest in the token<br>If the role of this CM is not S<br>then the GUID will be passed via a DATA message<br>from S, upon its arrival put the data in the token and<br>generate a digest as previously described<br>Complete the call by the standard sequence of<br>UPDATES of co-CMs with copies of the digest,<br>perform digest comparisons, copy a reference to the<br>data into the application as specified in the call's<br>argument, release the application thread, send an<br>enable downstream, remove all call-related data from | Use the call naming mechanism |

TABLE 27-continued

Create GUID Flowchart
Arguments: where to put the data in the application

| actions | comments |
|---|---|
| internal tables (TokenMap), and increment the completed calls counter in the ThreadMap process the next command | |

Table 28 describes a process used to get the time of day (TOD).

TABLE 28

Get Time of Day Flowchart
Argument: where to put the data in the application

| actions | comments |
|---|---|
| Name the call and set the callID<br>If the callID does not exist in the TokenMap then create an empty token and add the pair (callID, new instance of the Token_Structure) to the TokenMap then retrieve the token using the callID<br>If the role of this CM is S<br>then get the TOD from the OS and put a reference to it in the token's "data" field, send a "DATA" message to the each of the other co-CMs, form a digest from the callID, "get_TOD", and the TOD itself and store the digest in the token<br>If the role of this CM is not S<br>then the TOD will be passed via a DATA message from S, upon its arrival put the data in the token, generate a digest as previously described<br>Complete the call by the standard sequence of UPDATES of co-CMs with copies of the digest, perform digest comparisons, copy a reference to the data into the application as specified in the call's argument, release the application thread, send an enable downstream, remove all call-related data from internal tables (TokenMap), and increment the completed calls counter in the ThreadMap process the next command | Use the call naming mechanism<br>Make and fill in a token using the parameters in the call |

FIGS. 8-14 described various internal commands.

Figure 8:
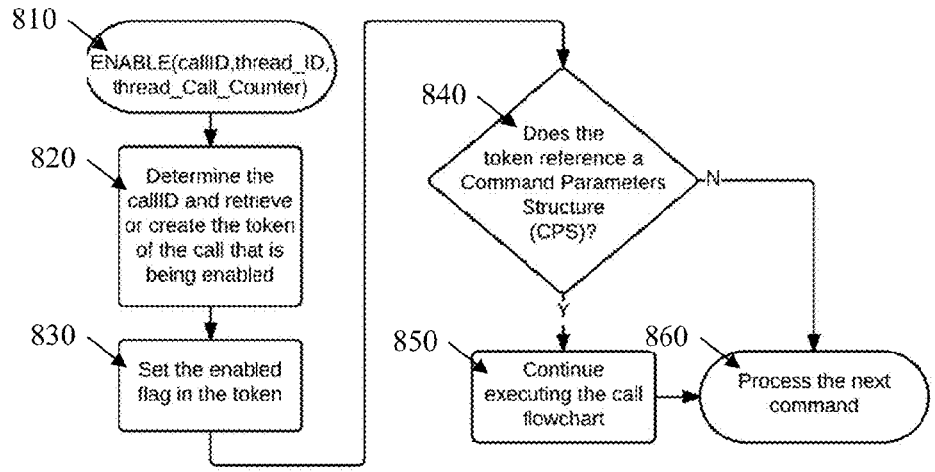
FIG. 8 shows a flowchart of an enable command.

The command described is FIG. 8 is an enable command that informs downstream co-threads when a calling thread has been released. At block 810, the enable command is received and includes the call identifier, thread identifier and the thread call counter. A token is created or retrieved based on the callID of the call being enabled at block 820. The enabled flag in the token is set at block 830. At block 840, a determination is made to see if the token references a command parameters structure (CPS). If the token references a CPS, the process continues executing the call flowchart at block 850 and proceeds to block 860 to process the next commend. If not, the token does not reference a CPS, the enable process proceeds to block 860 to process the next commend.

The enable arrives downstream and is used to enable the call that is a number of calls behind. So, if the scout 110 sends an enable command to the wing 120 at call number 10 in the scout 110 and the delay is set at 6 on the wing at setup, then the call that is enabled is the one that is in the same thread but 6 earlier, i.e., call 4. Its call ID is generated by prepending the received thread call counter, minus the delay, to the received thread ID. The delay amount is known in the wing 120, but may not be known to the scout 110. So the calculation is not performed in the scout 110. Thus, the scout 110 need not know about this mechanism. A similar calculation is performed, mutatis mutandis, in the rear 130.

Additionally, the callID passed in the ENABLE command may be used to check the call itself, if that level of checking is desired.

Figure 9:
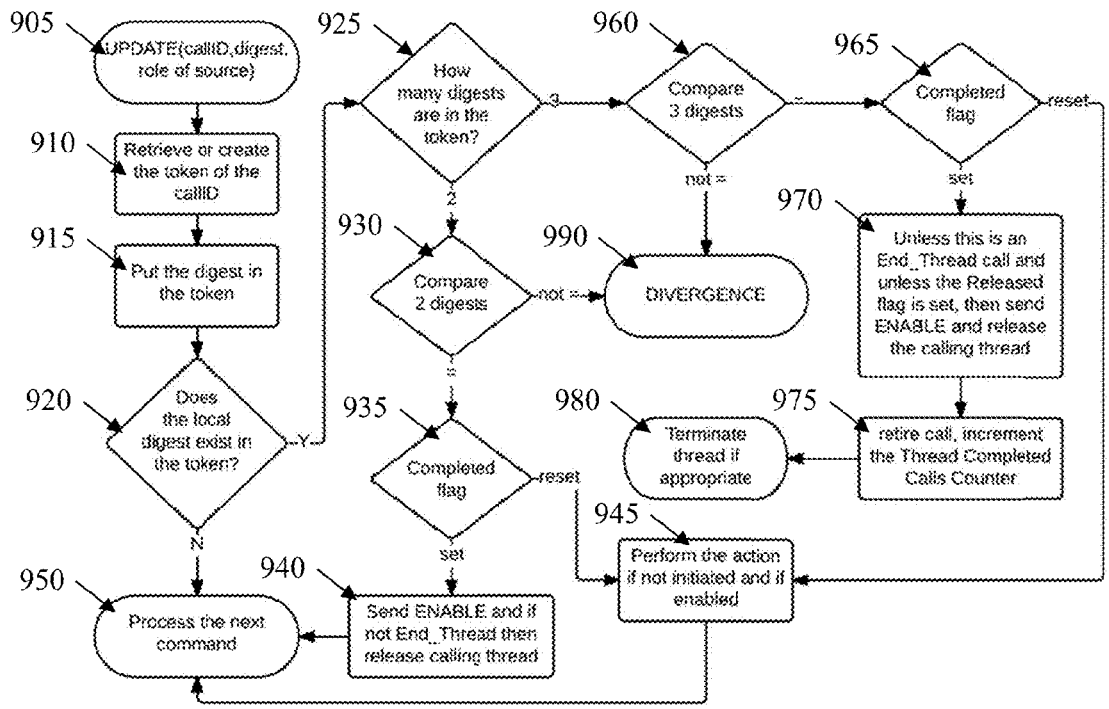
FIG. 9 shows a flowchart of an update command.

FIG. 9 shows a flowchart of the update command used to send digests between hosts. At block 905, the update command is received and, at block 910, a token is created or retrieved based on the callID At block 915, a digest received with the command is placed in the token. A determination is made, at block 920, as to whether the local digest exists in the token. If the local digest does not exist in the token, the next command is processed at block 950.

If the local digest is present in the token, the process proceeds to block 925 and a determination is made as to how many digests are in the token. If there are two digests, the process checks that the digests are identical at block 930. If they differ, a divergence is detected at block 990. If the digests match, the completed flag is checked at block 935. If the flag is 'set', an enable command is sent at block 940 and the process proceeds to block 950 to process the next commend. If the flag is 'reset', the action is performed at block 945 and then the process proceeds to block 950.

If there are three digests, the process checks that all three digests are identical at block 960. If they differ, a divergence is detected at block 990. If they match, the process proceeds to block 965 and checks the completed flag. If the flag is 'reset', the action is performed at block 945 and then process proceeds to block 950. If the flag is 'set', the process continues to block 970 where the enable command may be sent and a release of the calling thread is performed. Next, the process goes to block 975 where the call is retired and then to block 980 where the thread is terminated.

In the various embodiments, the digest may be generated in a number of ways. In one, non-limiting embodiment, the digest may include the data to be compared. In another non-limiting embodiment, the digest is generated based on the data to be compared, such as a checksum, a hash value, etc. such that the digest is unique. In a further non-limiting embodiment, the digest may be encrypted and/or generated by a user defined function. When checked for consistency at the CM, the encrypted digests may be checked against each other without first being decrypted.

Additionally, failure to receive an expected digest from the co-components within a given timeframe may be considered a divergence. Such timeframes may be established by an assigned threshold value and/or based on any delays between the various components.

Figure 10:
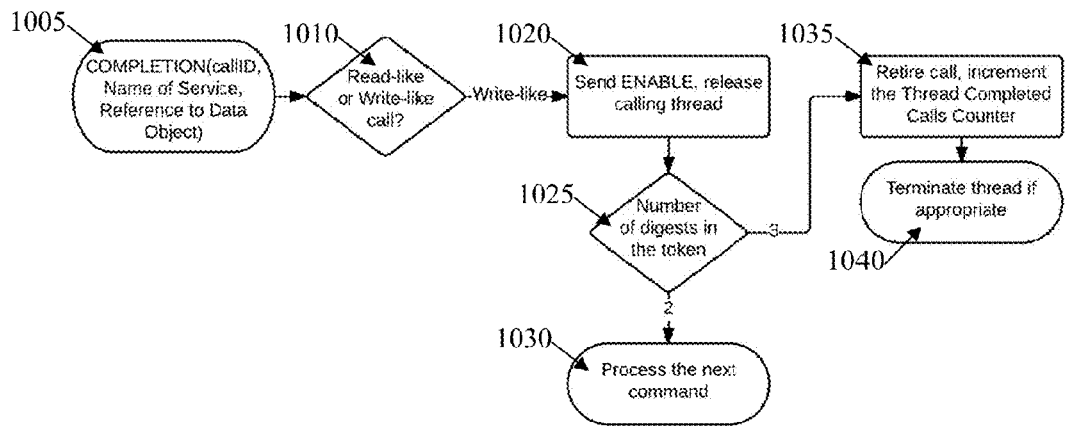
FIG. 10 shows a flowchart of a completion write command.
Figure 11:
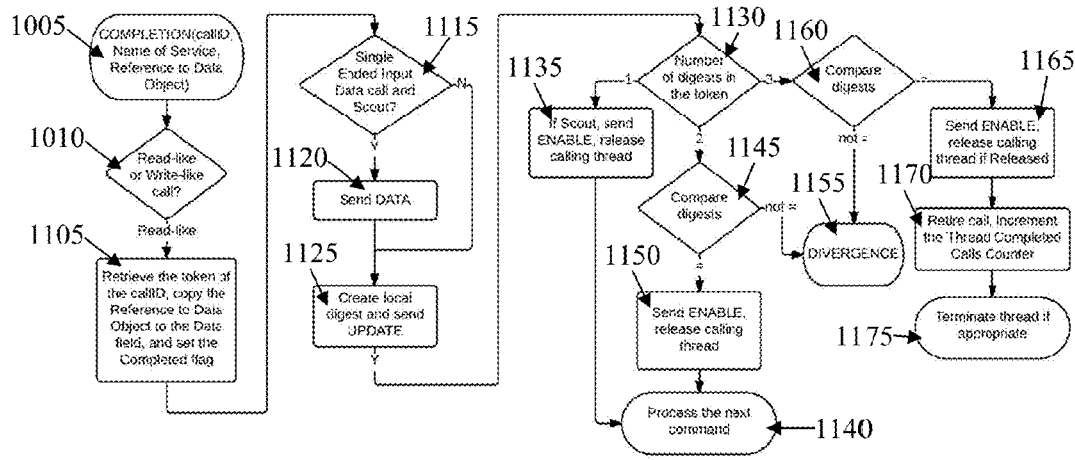
FIG. 11 shows a flowchart of a completion read command.

FIGS. 10 and 11 show the completion command used when a data provider has finished. Both FIGS. 10 and 11 begin at block 1005 where the completion call is received. A determination is made at block 1010 as to whether the call is read-like call or a write-like call. As shown in FIG. 10, if the call is a write-like call the process sends an enable command and releases the calling thread in block 1020. Next, the number of digests in the token is determined at block 1025. If there are only 2 digests, the next command is processed at block 1030. If there are three digests the process moves on to block 1035. The call is retired and the thread completed call counter is incremented. At block 1040, the thread is terminated if appropriate, see FIG. 14.

As shown in FIG. 11, once the call is determined to be a read-like call, the associated token is retrieved and the referenced data object is copied to the data field at block 1105. Additionally the completed flag is set. Next, at block 115, a determination is made as to whether the call is a single ended input data call from the scout. If it is, the data sent at block 1120 and the process moves on to block 1125. If the call is not a single ended input data call from the scout, the process moves directly to block 1125.

At block 1125, a local digest is created and an update commend is sent. Moving on to block 1130, a determination is made based on the number of digest in the token. If a single digest is present (which would be from the scout), an enable command is sent and the calling thread is released at block 1135. Then the next command is processed at block 1140.

If there are two digests, they are compared at block 1145. If the digests do not match, a divergence is detected at block 1155. If the digests match, an enable command is sent and the calling thread is released at block 1150 and the next command is processed at block 1140.

If there are three digests, they are compared at block 1160. If the digests do not match, a divergence is detected at block 1155. If all three digests match, an enable command is sent and the calling thread is released at block 1165. Next, at block 1170, the call is retired and the counter of completed calls for the thread is incremented. Finally, at block 1175, the thread is terminated if appropriate, see FIG. 14.

Figure 12:
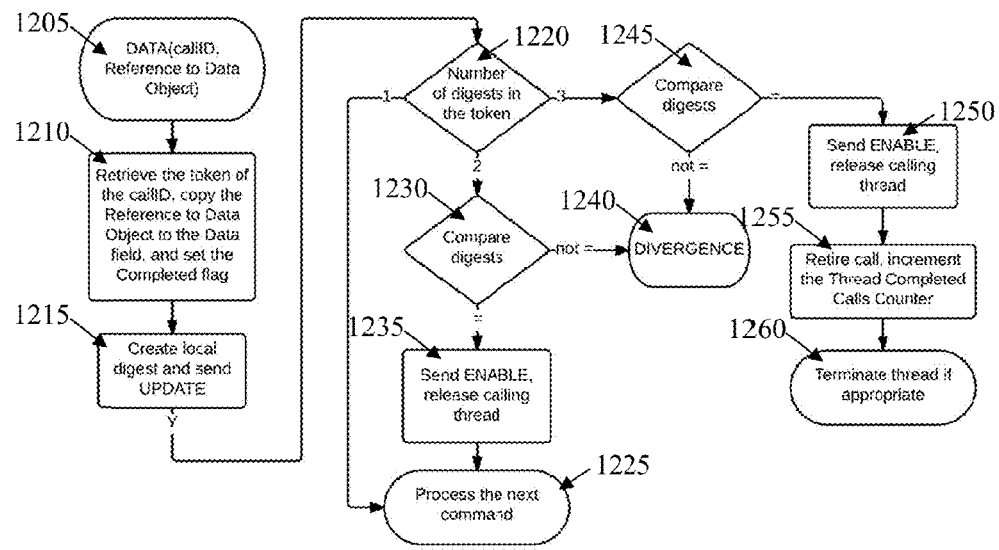
FIG. 12 shows a flowchart of a data command.

FIG. 12 shows a flowchart of the data command which is used when data is input into the system from a source. Beginning at block 1205, the data command is received. This command includes the callID of the call and a reference to the data object. At block 1210, the associated token is created or retrieved; the referenced data object is copied to the data field and the completed flag is set. Next, a local digest is created and an update commend is sent at block 1215. At block 1220, a determination is made based on the number of digests in the token. If there is one digest, the next command is processed at block 1225.

If there are two digests, they are compared at block 1230. If the digests match, the process proceeds to block 1235 where an enable command is sent and the calling thread is released. Then the next command is processed at block 1225. If, however the digests do not match, a divergence is detected at block 1240.

When there are three digests, all three are compared at block 1245. If the digests do not match, a divergence is detected at block 1240. If the digests match, an enable command is sent and the calling thread is released at block 1250. The call is retired and the counter of completed calls for the thread is incremented at block 1255. Next, at block 1260, the thread is terminated if appropriate, see FIG. 14.

Figure 13:
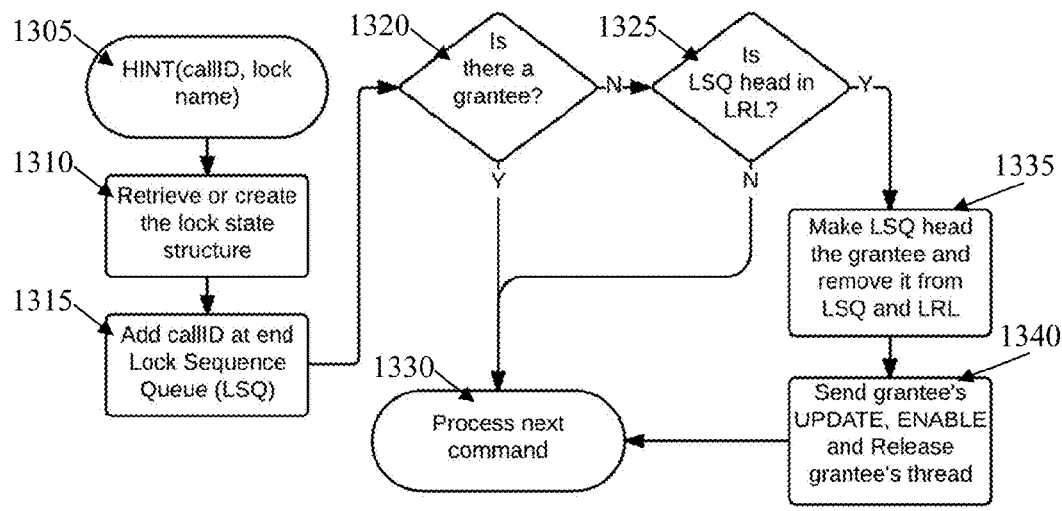
FIG. 13 shows a flowchart of a hint command.

A hint command is shown in FIG. 13. The hint command is used by an upstream thread when granting locks, to pass its granting choices to downstream threads so that they can make the same choices. The process begins at block 1305, where the VSS engine receives the hint command which includes the callID and identifies a lock. At block 1310, the lock state structure associated with the lock's name is retrieved (if one exists) or created (if none exists). The callID is then added to the end of the lock sequence queue (LSQ) for the identified lock at block 1315. In block 1320, there is a determination made as to whether there is a grantee for this lock. If there is, the next command is processed at block 1330.

If there is no grantee, a determination is made at block 1325 as to whether there are threads waiting for this lock, i.e., whether a call identified at the LSQ head is also in the LRL. If it is, it is made the grantee and its callID is removed from the LSQ and the LRL at block 1335. Then, at block 1340, the new grantee's update and enable are sent and its thread is released. Finally, the next command is processed at block 1330. If the LSQ head is not in the LRL, the next command is processed at block 1330.

Figure 14:
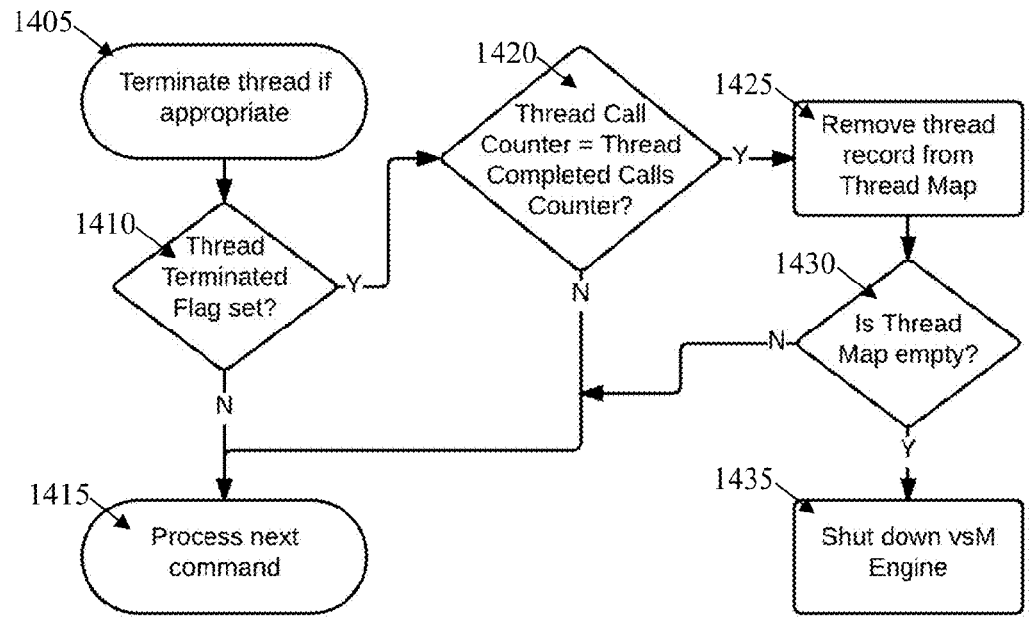
FIG. 14 shows a flowchart of a terminate thread if appropriate flow.

FIG. 14 shows the flowchart for the "terminate thread if appropriate" flow which is used to indicate if a thread has ended. At block 1405, the terminate command is received. First the thread terminated flag is checked at block 1410. If it is not set, the next command is processed at block 1415.

If the thread terminated flag is set, the process moves on to block 1420 and the thread call counter is compared against the thread completed call counter. If these counters do not match, then the next command is processed at block 1415. When the counters match, the thread record is removed from the thread map at block 1425.

Next, the thread map is checked to see if it is empty. If there still remain threads in the thread map, the next command is processed at block 1415. When the thread map is empty, the VSS engine shuts down at block 1435.

Various control methods may be used to enforce determinism. Using such methods, VSS API calls may be used whenever the application requests access to resources over which it does not have exclusive control, such as I/O, locks, and thread management.

At certain times in the execution of a thread, decisions may be made differently on different elements. An example of this phenomenon is the granting of a lock or other concurrency control mechanism. The CM enforces that all elements make such choices in the same manner. In the case of a lock, the CM assures that the same thread is granted the lock on each element.

Two ways to do this are by consensus and by edict. If the decision is made by consensus then the elements should partake of an agreement protocol and incur its attendant overhead. If the decision is made by edict then one element takes the role of leader and makes the decision for all. The decision is then propagated to the other elements. In one, non-limiting embodiment of a VSS system such decisions are made by edict by the scout.

Figure 15:
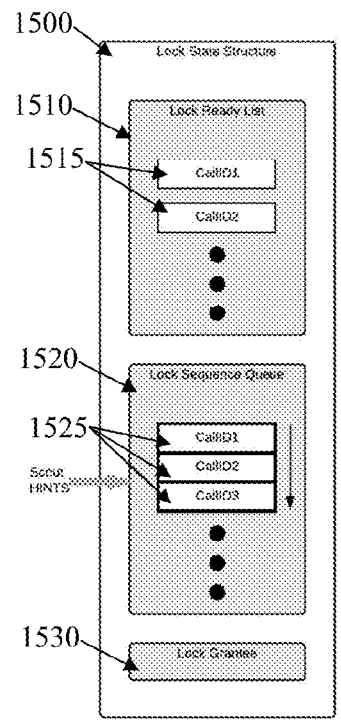
FIG. 15 illustrates a lock state structure in accordance with an embodiment.

Determinism may be enforced to ensure that resource locking is granted in exactly the same sequence in all co-hosts. FIG. 15 depicts the details of the Lock State Structure, see also Table 9. The Lock Ready List contains the lock requests as they are processed locally, and hence it is potentially out of order with respect to the upstream element(s). The Lock Sequence Queue contains the order that every downstream element should follow in granting locks.

As shown in FIG. 15, the lock state structure 1500 includes a lock ready list, LRL, 1510, a LSQ 1520 and a reference to the lock grantee 1530. In this example, the lock ready list 1510 includes calls 1515 from the local host (e.g., the wing) and the LSQ 1520 includes hints 1525 from the S.

Figure 16:
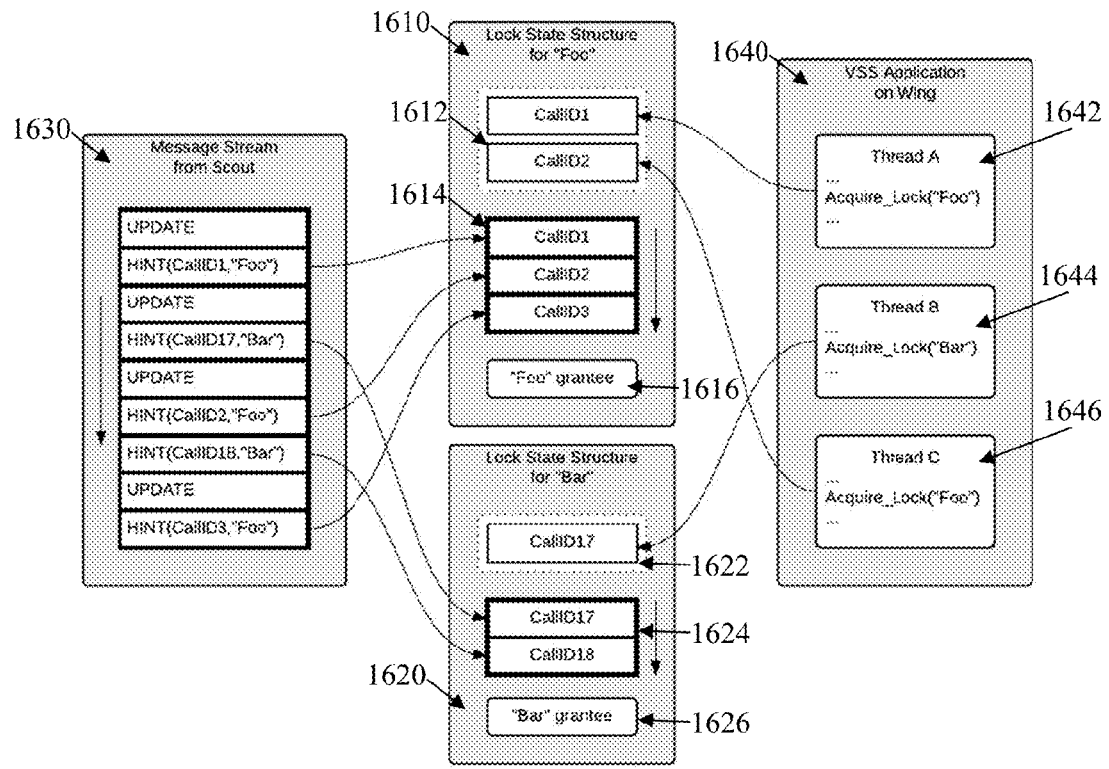
FIG. 16 demonstrates the interaction between hint commands and local call processing in accordance with an embodiment.

FIG. 16 depicts an exemplar of the way in which the HINT sequence from the scout is used to grant local lock calls in the order that provides cross-host determinism. There are two lock state structures shown, one for the "Foo" lock 1610 and one for the "Bar" lock 1620 both on the W. Each structure 1610, 1620 includes an associated lock ready list 1612, 1622, an LSQ 1614, 1624 and a lock grantee 1616, 1626. The message stream 1630 includes update and hint messages from the scout. The thread map 1640 describes the threads in the VSS Application on the W. There are three threads in the thread map 1640, Thread A 1642, Thread B 1644 and Thread C 1646.

As shown, both Thread A 1642 and Thread B 1646 have calls which are trying to acquire the lock "Foo" 1610. These calls are logged in the lock ready list 1612. The message stream 1630 also includes hint messages for the "Foo" lock 1610 which are stored in the LSQ 1614. Similarly, the acquire lock call in Thread B 1644 which tries to access "Bar" 1620 is logged in the lock ready list 1622 and the hint messages from the scout are stored in the LSQ 1624.

Similarly, other co-elements, such as the rear, may include their own "Foo" lock and "Bar" lock state structures.

Figure 17:
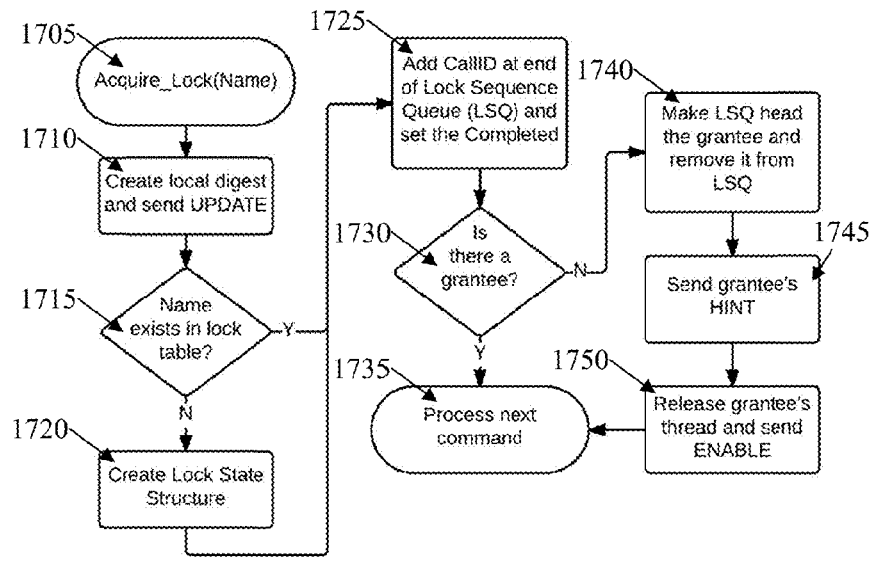
FIG. 17 shows a flowchart for the acquire lock command performed by a scout element in accordance with an embodiment.
Figure 18:
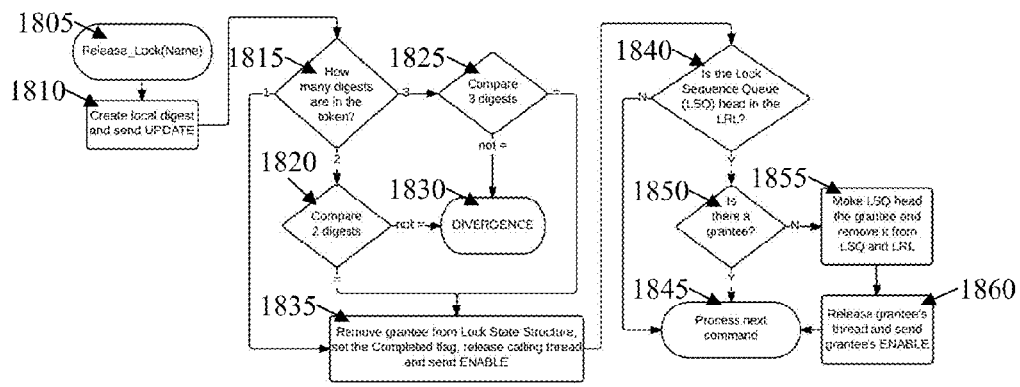
FIG. 18 shows a flowchart for the release lock command performed by a scout element in accordance with an embodiment.
Figure 19:
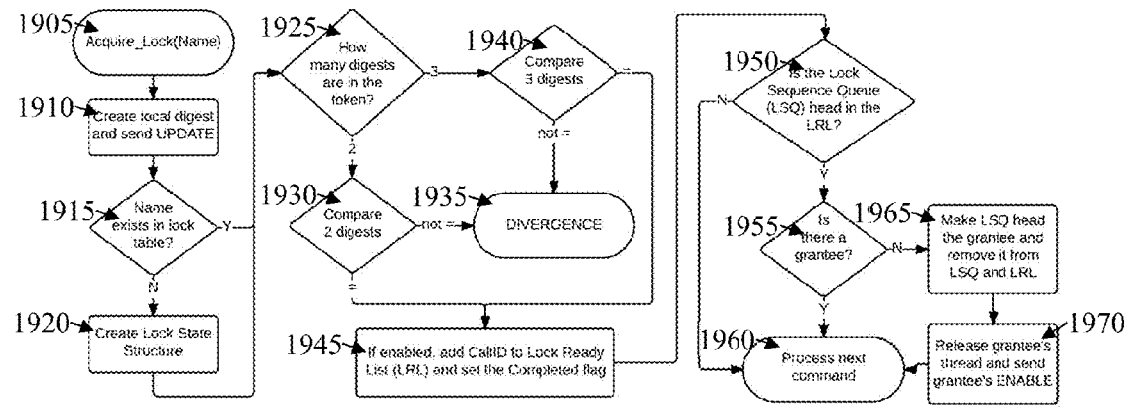
FIG. 19 shows a flowchart for the acquire lock command performed by a wing/rear element in accordance with an embodiment.

The FIGS. 17-20 describe the locking calls both as they are processed in the scout and in the wing and rear. FIGS. 17 and 19 relate to acquiring a lock and FIGS. 18 and 20 relate to releasing a lock. A lock may represent a large number of concurrency control primitives. A calling thread is blocked until it is given the lock. When the lock is granted to the thread then that thread is released and allowed to proceed. Once a lock is released by a thread, the next blocked thread trying to access the same lock may be allowed to acquire the lock.

FIG. 17 shows a flowchart for the Acquire_Lock command performed by a scout host in accordance with an embodiment. At block 1705, the command is received. The local digest is created and an update message is sent at block 1710. At block 1715, the lock table is checked to see if the name of the lock is present. If it is not, the lock state structure is created at block 1720 and the process moves on to block 1725. If the name is in the lock table, the process moves directly to block 1725.

At block 1725, the callID is added to the LSQ for the lock and the completed flag is set. Then at block 1730, a check is made as to whether a grantee has acquired the lock. If so, the next command is processed at block 1735.

If there is no grantee, the head of the LSQ is assigned the grantee and is removed from the LSQ at block 1740. The grantee is then sent a hint message at block 1745. Next, at block 1750 the grantee's thread is released and an enable command is sent. Then the next command is processed at block 1735.

FIG. 18 shows a flowchart for the Release_Lock command performed by a scout host in accordance with an embodiment. At block 1805, the command is received. The local digest is created and an update message is sent at block 1810. At block 1815, a determination is made as to how many digests are in the token. If there is a single digest, the process moves on to block 1835 where the grantee is removed from the LSQ, the completed flag is set, the calling thread is released and the enable message is sent.

If there are two digests, they are compared at block 1820. If they do not match, a divergence is detected at block 1830. Where there are three digests, at block 1825, they are compared. As with two digests, if they do not match, a divergence is detected at block 1830. If all the digests match (regardless of there being two or three), the process moves on to block 1835.

Once the actions in block 1835 are taken, a determination is made as to whether there is a LSQ head in the lock ready list (LRL). If not, the next command is processed at block 1845. Where there is a LSQ head in the LRL, a check is made to determine if there is a grantee at block 1850. If there is, the next command is processed at block 1845. When there isn't a grantee, the LSQ head is made the grantee and they are removed from the LSQ and LRL at block 1855. Then the grantee's thread is released and their enable command is sent at block 1860. Next the process moves to block 1845 and the next command is processed.

FIG. 19 shows a flowchart for the Acquire_Lock command performed by a wing/rear host in accordance with an embodiment. At block 1905, the command is received. This command identifies the lock being acquired. The local digest is created and an update message is sent at block 1910. At block 1915, the lock table is checked to see if the name of the lock is present. If it is not, the lock state structure is created at block 1920 and the process moves on to block 1925. If the name is in the lock table, the process moves directly to block 1925.

At block 1925, a determination is made as to how many digests are in the token. The process moves on to block 1945 where the grantee is removed from the LSQ, the completed flag is set, the calling thread is released and the enable message is sent.

If there are two digests, they are compared at block 1930. If they do not match, a divergence is detected at block 1935. Where there are three digests, at block 1940, they are compared. As with two digests, if they do not match, a divergence is detected at block 1935. If all the digests match (regardless of there being two or three) the process moves on to block 1945 where the callID is added to the LRL and the completed flag is set if enabled.

Once the action in block 1945 is taken, a determination is made as to whether there is a LSQ head in the lock ready list (LRL) at block 1950. If not, the next command is processed at block 1960. When there is a LSQ head in the LRL, a check is made to determine if there is a grantee at block 1955. If there is, the next command is processed at block 1960. When there isn't a grantee, the LSQ head is made the grantee and they are removed from the LSQ and LRL at block 1965. Then the grantee's thread is released and their enable command is sent at block 1970. Next the process moves to block 1945 and the next command is processed.

Figure 20:
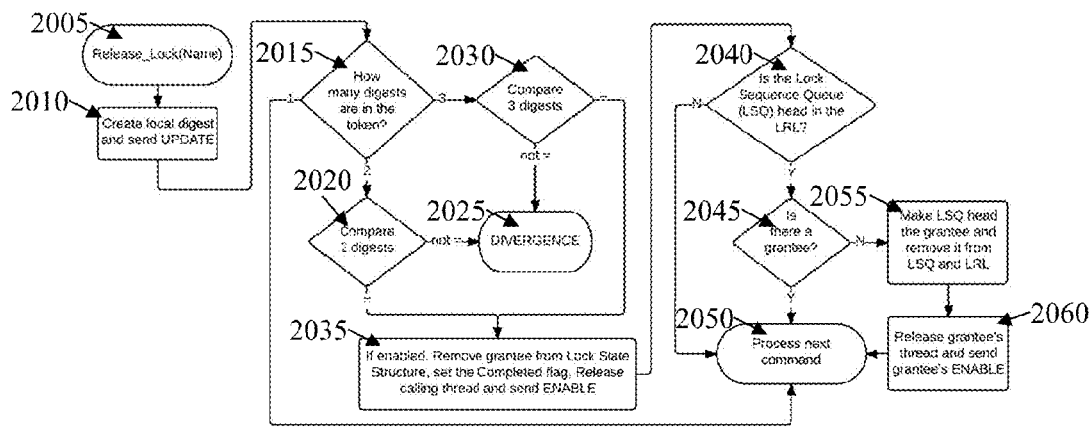
FIG. 20 shows a flowchart for the release lock command performed by a wing/rear element in accordance with an embodiment.

FIG. 20 shows a flowchart for the Release_Lock command performed by a wing/rear host in accordance with an embodiment. At block 2005, the command is received. The local digest is created and an update message is sent at block 2010. At block 2015, a determination is made as to how many digests are in the token. If there is a single digest, the process moves on to block 2050 and the next command is processed.

If there are two digests, they are compared at block 2020. If they do not match, a divergence is detected at block 2025. Where there are three digests, at block 2030, they are compared. As with two digests, if they do not match, a divergence is detected at block 2025. If all the digests match (regardless of there being two or three), the process moves on to block 2035. At block 2035, if enabled, the grantee is removed from the lock state structure, the completed flag is set, the calling thread is released and an enable message is sent.

After the actions in block 2035 are taken, a determination is made as to whether there is a LSQ head in the lock ready list (LRL) at block 2040. If not, the next command is processed at block 2050. When there is a LSQ head in the LRL, a check is made to determine if there is a grantee at block 2045. If there is, the next command is processed at block 2050. When there isn't a grantee, the LSQ head is made the grantee and they are removed from the LSQ and LRL at block 2055. Then the grantee's thread is released and their enable command is sent at block 2060. Next the process moves to block 2050 and the next command is processed.

The VSS Configuration can be viewed as a pipeline, where the S, W, and R elements constitute the pipeline nodes. This pipeline may be defined by conditions that each host meets before proceeding with the execution of the next command:
 1. Received an ENABLE signal from the upstream co-host. This condition maintains the VSS configuration stagger (delays); and
 2. Successfully performed consistency checking, e.g., matched enough digests.

These conditions normally would result in a deadlock, because they form a circular dependency (e.g., S needs W to proceed, and W needs S to proceed). However, the entire pipeline is unlocked by waiving S from the consistency checking condition. This means that S will not hold processing a command. However it will eventually perform consistency checking in order to validate the co-hosts. Moreover, the S is inherently pre-enabled, since it is the first pipeline node.

TABLE 29

Thread Life-Cycle

| Step | Comment |
|---|---|
| Thread created by a host OS call | Blocking object created |
| Thread is registered with a Register_Thread VSS call App starts the Thread via another host OS call | CM enters ThreadID into ThreadMap |
| Thread runs and may execute VSS API calls | Tokens are created and retired, TokenMap is updated |
| Eventually, the Thread executes the End_Thread call | Messages are sent to the downstream co-hosts as a blanket enable for all outstanding calls. |
| All outstanding calls complete | When the outstanding calls complete, the thread is removed from the |

TABLE 29-continued

Thread Life-Cycle

| Step | Comment |
|---|---|
| | ThreadMap and, if the map is empty, then the VSS Engine is terminated. |

Table 29 shows various stages in the life-cycle of a thread from creation to registration to the end of the thread. Once all calls in the thread are completed the thread is removed.

TABLE 30

Call Life-Cycle

| Step | Comment |
|---|---|
| Thread executes call | Blocking object created |
| Call converted to CM command | |
| CM command is processed | Action occurs, digests distributed |
| When enough consistency checks match, the calling thread is released | But cannot yet terminated call, because co-hosts still processing the call |
| When all consistency checks match, the call is completed | |

Table 30 shows various stages in the life-cycle of a call. The call is first executed by a thread, processed as a CM command and eventually completed.

Figure 21:
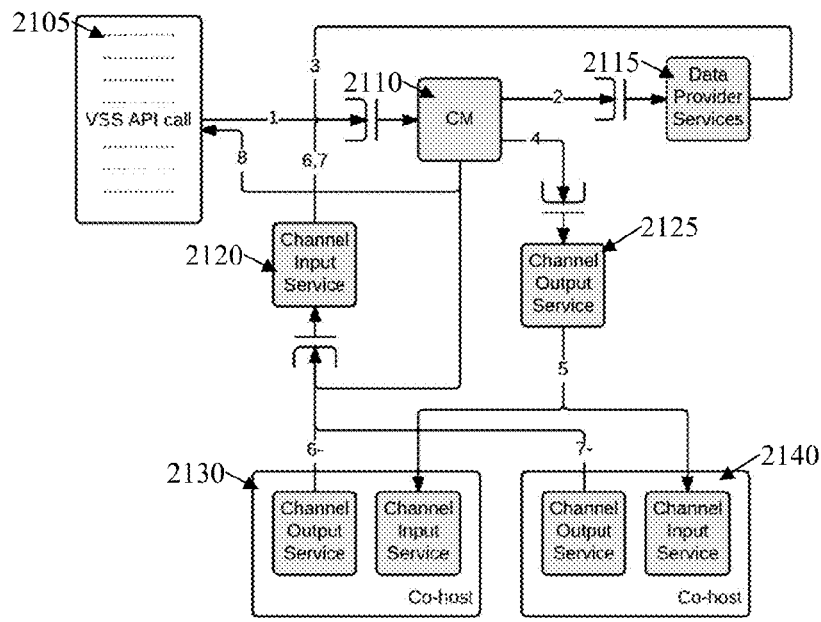
FIG. 21 shows a generic API call being processed by the engine in accordance with an embodiment.

FIG. 21 shows in detail how a generic VSS API call is processed by the VSS engine in a prototypical VSS configuration. In this example the VSS engine is running in the scout. In the description the following shortcuts are used:
 "Creating a command" means creating the command data structure and enqueuing it in the target queue.
 "Retrieving a command" means draining it from the queue and decoding its content.
 "When a command is processed" means that the command is retrieved at some point after its queue submission, but not necessarily correlated in time with the submission.

The application 2105 creates a call data structure and executes a VSS API call 1 pointing to it which is sent to the CM 2110. The processing of the call by the VSS Engine creates a command in the CM queue and blocks application processing with a host OS wait object. When the CM 2110 retrieves the command, it sends the appropriate command 2 to the corresponding data provider service 2115. When the data provider service 2115 processes the command 2, it performs the requested action by issuing a corresponding host OS call. When the OS signals the completion of the call the data provider service 2115 creates a CM command 3 with the results of the action.

When the CM 2110 retrieves that specific command 3, it computes the digest from the received data and updates the token data structure. The CM 2110 then creates the appropriate private message command 4 for the Channel Output Service 2125 to send associated messages 5 to the co-hosts 2130, 2140. Under normal conditions the co-hosts 2130, 2140 receive the messages 5.

Eventually, a first co-host 2130 (such as the wing) reaches the point in the execution stream corresponding to the original call. That co-host 2130 processes the call and sends back to the scout a message 6—with its own digest. The message 6—arrives at the scout in the form of a command for the scout Channel Input Service 2120, which de-serializes it and creates a CM command 6. When the CM 2110 retrieves that specific command 6, it updates the token data structure and compares the digest. If the incoming digest matches the locally computed one, then the CM 2110 signals a release to the host OS wait object, which in turn allows the application to continue executing. If the digests do not match, then a divergence condition is signaled 8.

When the remaining co-host 2140 (such as the rear) executes the original call, it sends back to the scout its own digest 7—, which the scout Channel Input Service 2120 puts in a CM command 7. When the CM 2110 retrieves the command 7, it updates the token data structure and compares the digest. If the incoming digest matches the other two, then the CM 2110 removes the token and thus terminates the call. If the digests do not match, then a divergence is signaled 8.

Each thread and each individual VSS API call are named uniquely and consistently in all co-hosts, without communication to accomplish agreement on the name to be used. In one, non-limiting embodiment, this is done using a session independent, call naming mechanism.

A session is started by instantiating a thread with code from a "main" routine, as in the C programming language. That "root" thread may create more threads and so on, recursively. Each thread also contains calls to perform actions other than thread creation. As part of the CM, these calls are uniquely identifiable so as to align corresponding actions when enforcing cross session consistency and determinism. The order of call delivery to the CM varies from session to session; therefore, corresponding calls can be associated with one another if, and only if, they have the same name, the same session-wide unique identifier.

There are additional problems. If a loop contains a call then each time the call is encountered when executing the loop each such call should be assigned a uniquely identifying name. The calls, however, may be identical on each pass through the loop. It is not the static identity of the call that is significant but, rather, the dynamic identity. Each time that the call is encountered is a new and distinct instance of the call's execution. It is these execution instances that are uniquely identified by the dynamic identity.

A unit of code may be used in more than one thread. For instance, if a procedure provides service for a user application that runs over the internet then each user session may run the same code in its own private setting, like a shopping cart for an on-line purchase. Each instance is different even though the code being executed in the thread is the same. Consequently, the identity of the thread from which a call is made may also be used as part of the session-wide unique identifier. This is expressed by saying that a session-wide unique identifier is made by concatenating the dynamic session-wide unique thread identifier with the unique dynamic thread-local call identifier. The mechanics of generating these two parts of an identifier are now presented.

In the CM a counter is associated with each registered thread at the time of registration. The counter starts at zero.

Each time a call is issued to the CM from a thread, the corresponding counter is incremented and the count is appended to the current thread's unique identifier. A dynamic session-wide unique name is assigned to each thread inductively.

The first thread, from which all threads are descended, is named by edict. The user's program dictates its name and registers the thread with the instantiation of the VSS Engine. The name of the initial thread is passed as an argument along with a reference to the thread itself. As one example, that thread may be called "A". Thereafter, all thread registration is requested by calling Register_Thread( . . . ), where the identifier of the calling thread being registered is set to the name of the call.

When a thread executes, each call executed by it is assigned a name "A" plus a separator, ".", and then the current count. The first call executed would be called "A.1". The second would be called "A.2", and so forth. Thus, each instance of any call will have a unique name set, locally, by the counter and, globally, by the thread's name. Accordingly, the calls are named uniquely.

The system can also uniquely name a child thread. As the call to register the thread has already been assigned a unique name, that name is used as the name of the thread whose registration is requested. Advantageously, because each call is uniquely named, each thread so created is also uniquely named.

Continuing the example, if call "A.7" registers a thread then that thread will have the dynamic name "A.7" and the calls executed by that thread will be named "A.7.1", "A.7.2", and so forth. If call "A.7.2" registers a thread then the thread will be named "A.7.2" and calls executed by it will be named "A.7.2.1", "A.7.2.2", "A.7.2.3" and so forth.

Table 31 shows the structure of a session-specific, role-specific, session-wide unique name. As described above, in one embodiment, the name is a concatenation of the Call ID of the call registering the thread and the value of a counter associated with the current thread.

TABLE 31

The Components of a Unique, Session-Wide, Call Name

| Name Segment | Data Type | Source of Data |
| --- | --- | --- |
| Dynamic thread ID | a string | Call ID of call registering the thread |
| Local call ID | 64 bit unsigned integer | A counter associated with the current thread found in the Thread_State_Structure |

Various techniques may be used as part of the design of CM and its satellite services. Table 32 lists various techniques and includes a brief description and the benefits or capabilities provided by the technique.

TABLE 32

| | Implementation Techniques | |
| --- | --- | --- |
| Technique | Description | Benefits/Capabilities |
| Digest | A combination of the elements of a string of bytes that is (1) highly sensitive to the ordered data, (2) is calculable quickly, (3) is relatively short in length, (4) cannot be processed to reverse the action and retrieve the original data | 1. The MD5 digest tests effectively for exact equality. For a somewhat greater cost of calculation the SHA-256 digest may be used. Both of these test for exact equality, that is, for identical content. Some applications are better served by an approximate equality test. |

TABLE 32-continued

Implementation Techniques

| Technique | Description | Benefits/Capabilities |
|---|---|---|
| | | 2. Digests can be compared quickly, equal byte sequences will have equal digests, and differing sequences will have different digests with high probability.<br>3. Transport of a digest is rapid due to its short length.<br>4. The cost to store a digest is low due to its short length.<br>5. By mapping the input to equivalence classes and then forming the digest the equality test can test for approximately equal units within a byte string. |
| Dynamic consistency checking | I/O data are compared to ensure that multiple copies of an execution all behave the same. | 1. Output is allowed if, and only if, the data is known to be the same across at least two copies of a program's execution.<br>2. Data is not sent between elements, only digests are sent. No information is revealed in providing the checking Information cannot leak due to this feature.<br>3. For even greater security, the digests can be encrypted. |
| Choice point instruction execution and deterministic flow control | The cross host thread session logical alignment algorithm controls the host OS together with a VSS control device to provide deterministic computation | 1. Lock grant order is forced to be the same on multiple elements.<br>2. OS choices are forced to be the same in all elements. |
| Time and other system generated artifacts (hardware and OS) | Some state is created by the environment. Logical requirements related to this state should be specially accommodated by the VSS configurations. | 1. Time is measured in calls having been executed.<br>2. Time should obey the transitive nature of the "comes after" relationship.<br>3. The time associated with an object generated by a VSS system should be seen to be the same by all VSS elements.<br>4. Therefore, wall-clock time is obtained by the scout and forwarded to wingman and rear. |

In one or more embodiments, a general purpose personal computer or computing device implements one or more applications programs to operate in accordance with the principles described above. The computer may run an operating system such as Microsoft Windows, UNIX, Linux, Apple OS, other industry standard operating systems, or any specialized OS such as real time, process control, automotive, military, etc. The applications programs may be a combination of commercially available programs or programs written in any one of a number of available programming languages including, but not limited to, C, C++, JAVA, Perl and FORTRAN.

Figure 22:
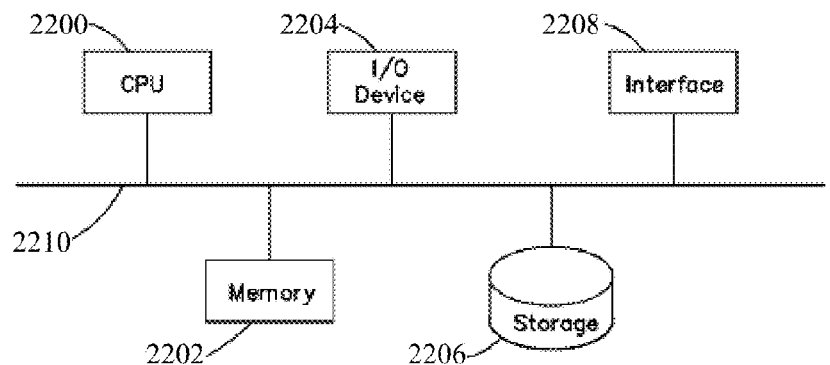
FIG. 22 illustrates a block diagram of a prototypical configuration in accordance with an embodiment.

The computer, as above, can be any one of a number of different devices; however, these devices have some components and/or functionality in common irrespective of their relative technical complexities. As shown in FIG. 22, a computing device may include a central processing unit 2200, a memory 2202, an input/output device 2204, for example a keyboard, keypad or touch screen, storage 2206, for example a hard disk drive, and an interface 2208 for communicating to a network. A computing device may also consist of any specialized hardware that meets the platform requirements described above. A bus 2210 couples these devices to one another to allow communication between them. These elements may be physical devices or implemented in one or more virtual machines as is known to those of ordinary skill in the art. Applications may also be run on a software layer and/or as processes on the physical machine.

Various elements, such as the scout, wing and rear, may be implemented on a single computing device, such as shown in FIG. 22. Alternative, one or more applications may be implemented on separate physical computing device. For example, both the scout and rear may be implemented on a single, physical computing device while the wing is implemented on a separate, physical computing device. Such devices may be communicatively connected via a shared bus 2210, or via a network, such as the internet.

In various embodiments, the detection of a divergence may prompt the system to undertake corrective actions. Such action may include alerting a user and/or system administrator; isolating the physical system(s) operating the replicated application(s) which caused the divergence; ending the thread which caused the divergence; and/or taking recovery actions. Recovery actions allow the replicated applications to continue operating with minimal interruption. Such recover actions may include creating a new replicated thread based on the state of the divergent thread prior to the detection of the divergence on the same device or on a new device. Additionally, the roles of the various elements may be reassigned, for example, if the scout is divergent, the wing may be assigned as the new scout, the rear assigned as the new wing and a new rear may be instantiated.

As discussed above, the number of elements used may be more than three or may be only two elements. Using three or more elements may allow the system to automatically determine which element is experiencing divergent processing, for example, when two elements agree and the third element does not the third element may be considered divergent.

In another non-limiting embodiment, the system may track a threshold value of divergent elements in order to determine the appropriate response. For example, when operating ten elements, a single divergent element may be dropped and replaced but when a threshold value of 30% of the elements (or simply three or more elements) is met, the system may cause an alert.

When using a threshold value of elements to determine consistency among the elements, such as m of n elements, the threshold may be used in variety of ways. For example, the threshold may be used to ensure that the set of elements operate quickly and once the first m elements agree those elements are allowed to proceed with the trailing elements checking consistency as they reach the appropriate point. Alternative, a subset m of the n elements may be considered 'voting members' which agree upon the values for consistency. The remaining n-m elements are non-voting members unless reassigned as voting members, for example, when one or more of the m voting members are determined to be divergent. Accordingly, the non-voting members are checked for consistency.

Furthermore, when dropping and replacing divergent elements, the VSS Engine may track the number of elements being replaced in order to take corrective action. As one, non-limiting example, an application may be flagged for review if a large number of divergences are detected even when the system is able to successfully recover from each divergence.

In some non-limiting embodiments, replacement of a dropped element (e.g., when terminated as a divergent element) may be performed using In a hot spare technique additional copies of the elements are operated in addition to the main elements. When one of the elements is divergent, it may be dropped and the hot spare may be assigned as a replacement element. The additional copies (prior to assignment as a replacement element) are checked to ensure consistency with the elements; however, such copies may not necessarily be used to confirm consistency of the elements. For example, the elements may be considered voting members agreeing to the values that all applications should be consistent with. While the additional copies are non-voting member which are checked to ensure consistency with those values but they are not considered when determining the value itself.

When only two elements are used, detection of a divergence may simply cause an alert to a user and/or system administrator rather than attempting recovery actions.

Additionally, various aspects may be variable and/or configurable. In one, non-limiting example, the threshold value for determining consistency may be based on a security level and/or a system status. The security level may be assigned to an application/thread when it is written or installed. The system status may include a temporal aspect which may be triggered by a user, supervisor or based on various events. In one, non-limiting embodiment, when the system detects a given number of divergences within a set time frame the system can automatically escalate the security status (or threat level) of the system. In response, a greater number of elements may be used for consistency checking. The security aspects may also mandate encryption policies for communications (such as when sending digests) and/or requesting data reads from memory be performed twice to ensure reliability In another, non-limiting embodiment, the CM may be configured to check for equivalence of the digests. Accordingly, when the digests are within a given threshold of each other they are considered consistent even if not equal. This allows the applications to operate on systems which minor differences, such as with floating point calculations. The threshold for consistently may also be variable so that the system may request greater or lesser correspondence or even equality based on various factors.

The generation of the digests may be implemented so as to facilitate such equivalence checking. This may be done transparently to the CM, such as where the function used to generate a digest assigns values within the given threshold to the same hash value. Alternatively, the CM may be able to interpret the digest values to determine whether two different digests are equivalent (or 'close enough').

In a further, non-limiting embodiment, the system is configured to create a journal. This journal can store information for each call that is processed. This information may include details of the applications/threads making the calls, such as the IP address the call came from, user credentials, etc. In a further embodiment, the journal may contain sufficient data to enable a replay of the application processes for forensic or troubleshooting review.

As described above, various embodiments provide a method, apparatus and computer program(s) to detect a difference in operation between respective instances of a same software application being executed on first and second computational components.

Figure 23:
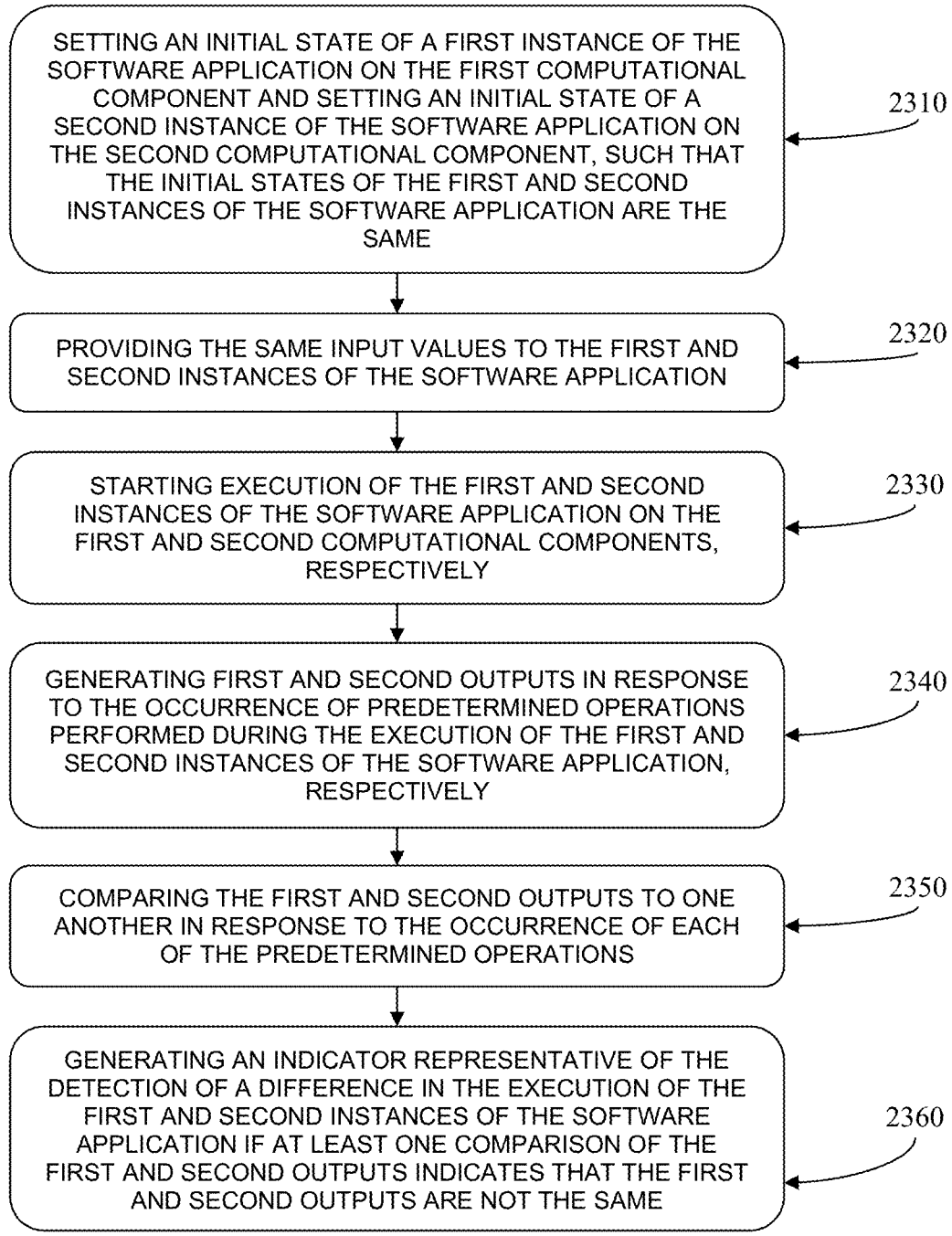
FIG. 23 is a logic flow diagram that illustrates the operation of a method, and a result of execution of computer program instructions embodied in a computer readable memory, in accordance with various embodiments.

FIG. 23 is a logic flow diagram that illustrates a method, and a result of execution of computer program instructions, in accordance with various embodiments. In accordance with an embodiment a method performs, at Block 2310, a step of setting an initial state of a first instance of the software application on the first computational component and setting an initial state of a second instance of the software application on the second computational component, such that the initial states of the first and second instances of the software application are the same is performed. The same input values are provided to the first and second instances of the software application at Block 2320. At Block 2330, a step of starting execution of the first and second instances of the software application on the first and second computational components, respectively is performed. First and second outputs are generated in response to the occurrence of predetermined operations performed during the execution of the first and second instances of the software application, respectively at Block 2340. Next, at Block 2350, the first and second outputs are compared to one another in response to the occurrence of each of the predetermined operations. At Block 2360, a step of generating an indicator representative of the detection of a difference in the execution of the first and second instances of the software application if at least one comparison of the first and second outputs indicates that the first and second outputs are not the same is performed.

The various blocks shown in FIG. 23 and various table entries may be viewed as method steps, as operations that result from use of computer program code, and/or as one or more logic circuit elements constructed to carry out the associated function(s).

In a further embodiment of the method of FIG. 23, starting the execution of the second instance of the software application includes starting the execution of the second instance of the software application following a predetermined delay after the start of the execution of the first instance of the software application.

In another embodiment of the method of FIG. 23, the method also includes comparing a first input provided to the first instance of the software application to a second input provided to the second instance of the software application; and generating a data input difference indicator if a difference between the first and second inputs is detected.

Figure 24:
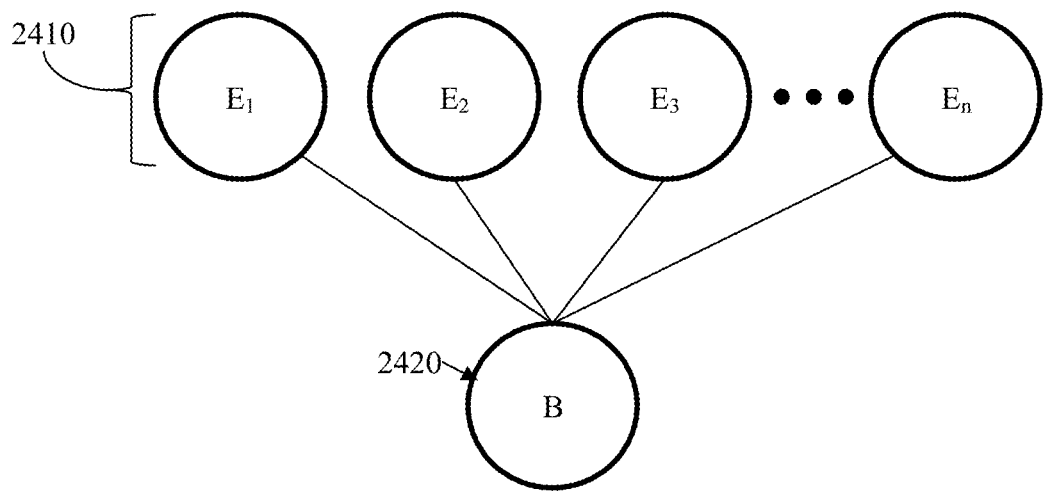
FIG. 24 shows an alternative configuration of N elements in accordance with an embodiment.

FIG. 24 shows an alternative configuration of N elements 2410 in accordance with an embodiment. As shown, the set of N elements 2410 (labeled $E_1$ through $E_n$) are connected to a common resource 2420, B.

In the example shown, the first three elements 2410 ($E_1$-$E_3$) may act as the S 110, W 120 and R 130 discussed above. The elements on remaining n−3 hosts may be maintained as 'hot spares', ready to replace the S 110, W 120 or R 130 if they should be divergent. In this configuration, elements on the remaining n−3 hosts are still checked for consistency and any divergent ones may be terminated. In another non-limiting embodiment, any of the n elements may participate in the voting and/or in the release of the calling thread.

Resource 2420 provides a similar service as the private communication channels 140, 142, 144 of FIG. 1. The resource 2420 may also provide CM functionality, for example, by maintaining the partial tokens and/or performing consistency checking operations. When a divergent element is detected, the resource 2420 may simply sever the communication with that that element's host which is then effectively cut off from the remaining elements 2410.

As seen above, when checked for equality, encrypted digests may be checked without decryption. Thus, the resource 2420 is able to confirm consistency of the elements without possessing a copy of the data.

FIGS. 25-48 further describe embodiments in accordance with underlying features described above. In a further embodiment, the call processing may be modified as shown below and in FIGS. 25-48. Many aspects in this embodiment are similar to that discussed above and may not necessarily be repeated. In all flowcharts of this second embodiment, the phrase "release the calling thread" is meant to signify the following: "for read-like calls, place the data inputted by the call's action into the call's data location field (to be accessed by the user's program when it continues execution), and if the released flag is not set, then release the calling thread and set the released flag".

In all flowcharts of this second embodiment, the phrase "Digest.CC2" is meant to signify the following: "determine if the token contains at least one digest in addition to the local digest. If not, wait until it does. Once it does, check them for consistency." Similarly, the phrase "Digest.CC3" is meant to signify the following: "determine if the token contains three digests. If not, wait until it does. Once it does, check them for consistency."

Figure 25:
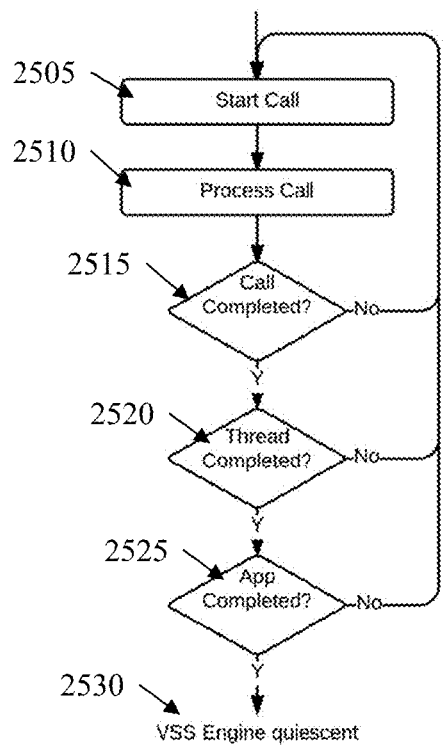
FIG. 25 illustrates a flowchart of call processing as viewed by the engine in accordance with a second embodiment.

FIG. 25 illustrates how the three levels of call processing—calls, threads, application—interact in the absence of aberrant behavior, as viewed by the engine in accordance with the second embodiment. At block 2505, a call is started, for example, by a thread executing the call and the call is processed at block 2510. A check is performed at block 2515 to see if the call is completed (e.g., all co-elements have executed the call and provided digests). If the call is completed, the engine checks to see if the thread is completed at block 2520. If the thread has completed (e.g., all calls in the thread are completed), at block 2525, the engine checks that the application is completed (e.g., all threads in the application are completed). If the application is completed, the engine goes quiescent and enters a dormant state at block 2530. However, if the call has not been completed, the thread is not completed, or the application is not completed, the flow returns to block 2505 to process another call.

Figure 26:
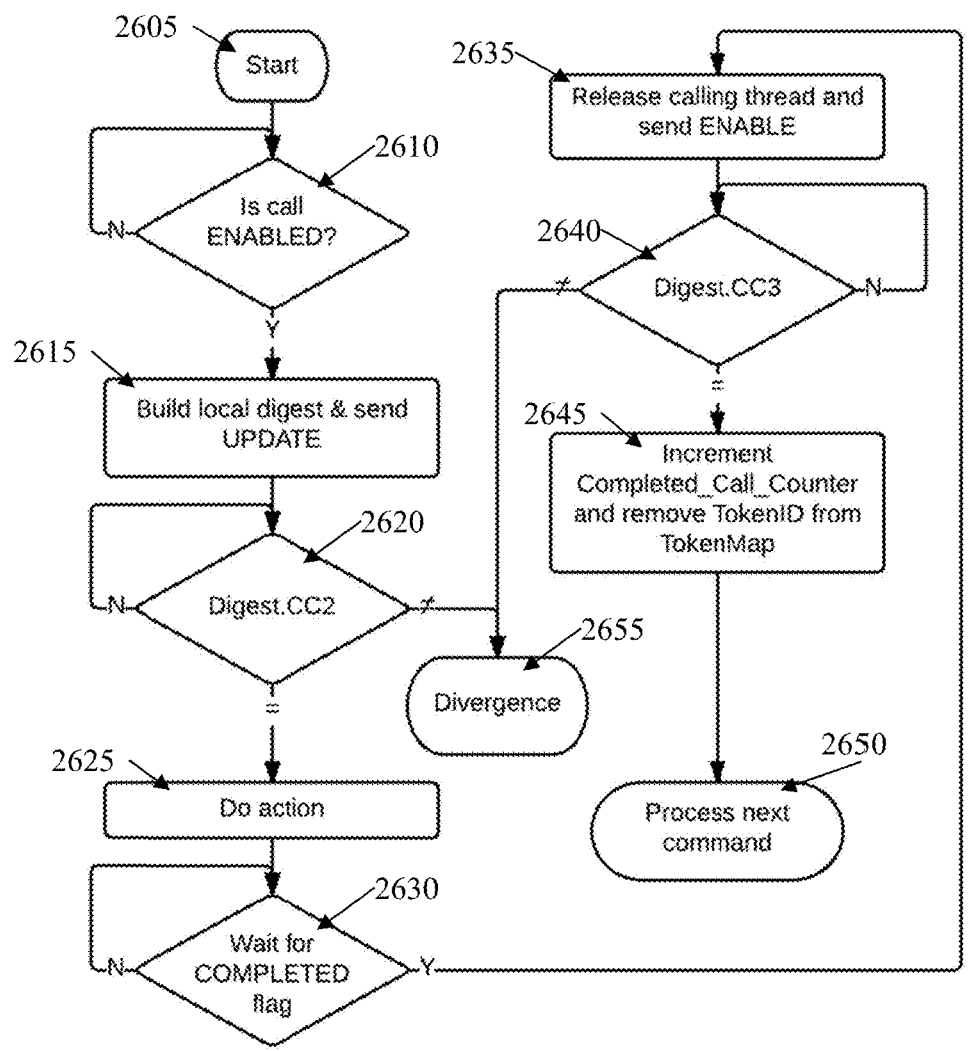
FIG. 26 illustrates a flowchart of a generic 1-step call processing in accordance with a second embodiment.

FIG. 26 illustrates a flowchart of a generic 1-step call processing exemplar in accordance with the second embodiment. Note that the processing of specific calls may vary from this flowchart. The process begins at block 2605. At block 2610, a check is made to see if the call is enabled, if not, the process waits until the call is enabled. If the call is enabled, a local digest is built and an update is sent at block 2615. At block 2620, another check is performed. This check determines if a second digest has arrived, if not the process waits for the second digest. Once the second digest has been received from a co-call, e.g., if it originated from a call with the callID of the call being processed, it is checked for consistency with the local digest. If the consistency check succeeds, the process proceeds to block 2625 and performs the action indicated by the call. When the action is complete, the process sets the completed flag if the action does not involve the assistance of a data provider, e.g., Register_Thread.

At block 2630, the process waits for the completion of the action, i.e. for the completed flag to be set. Once it is set, the calling thread is released and an enable command is sent at block 2635. Next, once the third digest arrives from the second co-element, it is checked for consistency at block 2640. If the consistency check succeeds, the process advances to block 2645 and the completed call counter is incremented. The token is removed and the token ID is also removed from the token map. At block 2650, the next command is processed.

If either the check at block 2620 or block 2640 indicates the digests are not equivalent, the process provides an indication of divergence at block 2655. The divergence may be handled as discussed above.

Figure 27:
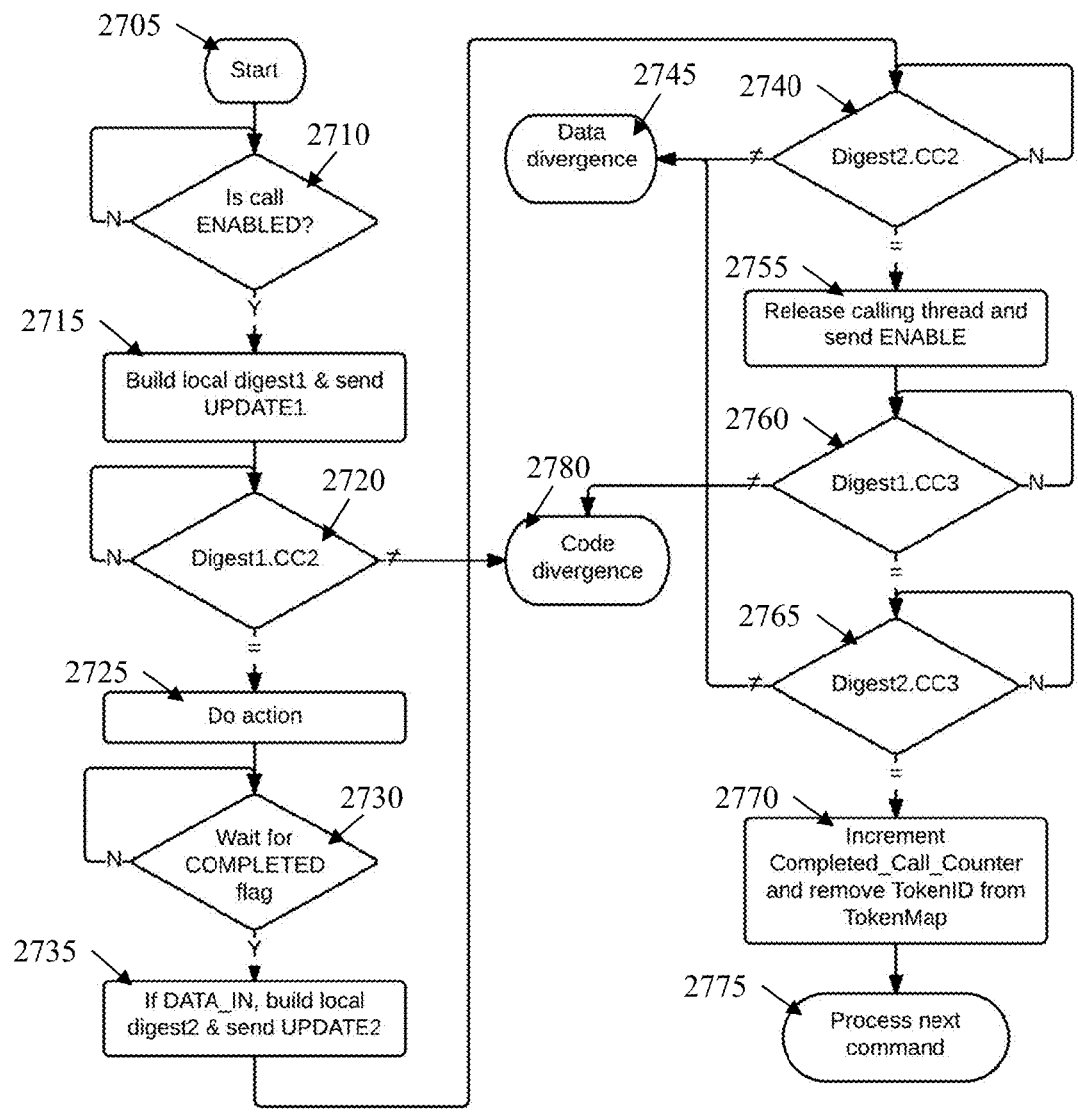
FIG. 27 illustrates a flowchart of generic 2-step call processing in accordance with a second embodiment.

FIG. 27 illustrates a flowchart of generic 2-step call processing in accordance with the second embodiment. This 2-step call processing is suitable for handling input data. Note that the processing of specific calls may vary from this flowchart. The process starts at block 2705. A check is made to see if the call is enabled at block 2710, if it's not, the process waits until the call is enabled. If the call is enabled, a local call digest (e.g. based on the data address) is built and a call update is sent at block 2715. At block 2720, a check determines if a second call digest has arrived. Once it arrives, they are checked for consistency and, if the consistency check succeeds, the process proceeds to block 2725 and the action is performed. When an action does not involve the assistance of a data provider, e.g., Register_Thread, the process sets the completed flag itself.

At block 2730, the process waits for the completed flag to be set for the call, indicating that data has been received (DATA_IN). Then at block 2735 a local input digest (e.g. based on the data) is built and an input update is sent. Next, once it's received, a second input digest is compared against the local input digest at block 2740. If the consistency check fails, the data is determined to be divergent at block 2745. Otherwise, the process proceeds to block 2755, where the process releases the calling thread and sends an enable command.

At block 2760 the local call digest is checked for consistency against the third call digest. If the consistency check succeeds, at block 2765, the local input digest is checked for consistency against the third input digest at block 2765. If the consistency check succeeds, the completed call counter is incremented, the token is removed, and the token identifier is removed from the token map at block 2770. Then the next command is processed at block 2775.

If the checks at blocks 2720 or 2760 fail, a code divergence is signaled at 2780.

Figure 28:
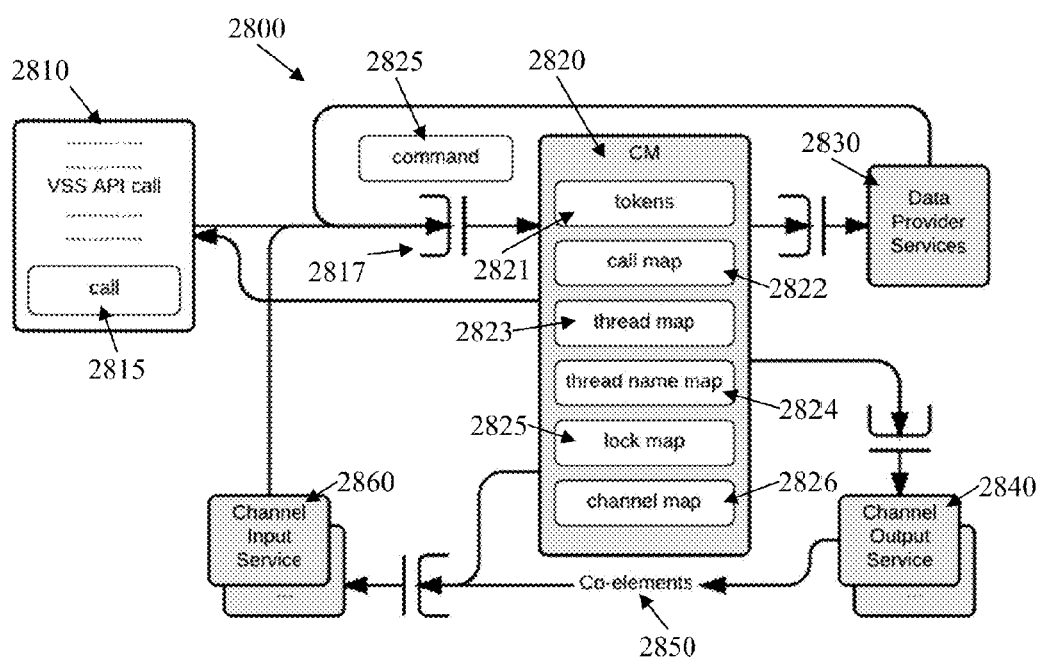
FIG. 28 shows data structures of the engine in accordance with a second embodiment.

FIG. 28 shows the main data structures of the engine in accordance with the second embodiment. Similar to the engine 600 in FIGS. 6 and 7, the engine 2800 is also a set of independent producer/consumer non-blocking interpreters, each with its own queue. Each queue contains a sequence of commands encoded in a particular instruction set tailored to its associated interpreter. The application 2810 issues various calls 2815. The command structure 2825 is passed to the CM queue 2817 then to the CM 2820. The CM 2820 in turn stores tokens 2821, a call map 2822, a thread map 2823, a thread name map 2824, a lock map 2825 and a channel map 2826.

The commands may invoke services 2830, 2840, 2850 which may be data provider service 2830, channel output service 2840 and channel input service 2860. The channel output service 2840 and channel input service 2860 allow the CM 2820 to communicate with other co-elements 2850.

Figure 29:
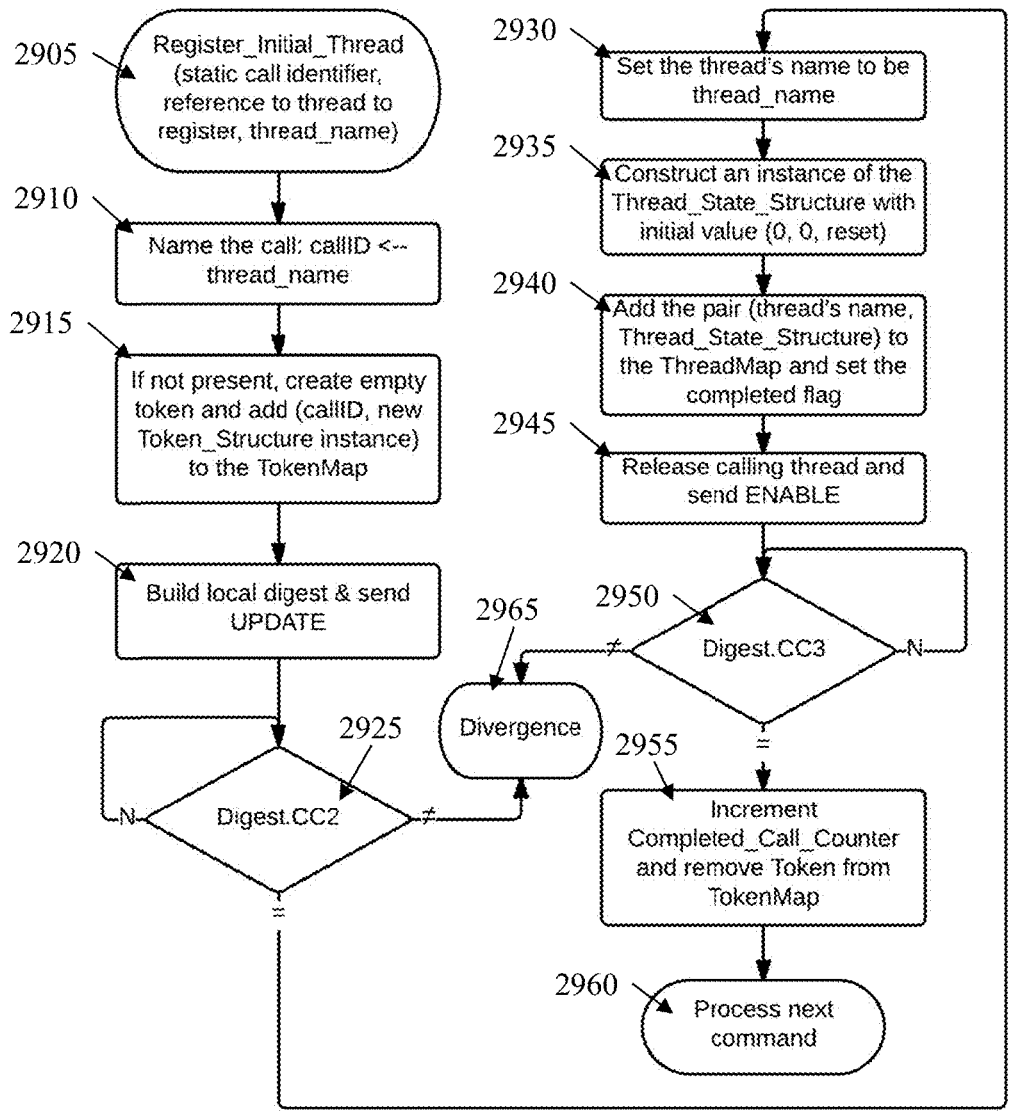
FIG. 29 shows a flowchart of a register initial thread command in accordance with a second embodiment.

FIG. 29 shows a flowchart of a register initial thread command in accordance with the second embodiment. A Register_Initial_Thread call command is received at block 2905. This call includes a static call identifier, a reference to the thread to be registered, and the parameter thread_name. At block 2910, the call is named based on the parameter thread_name. Next, the token map is checked to see if it already contains the call's token. If not, a token is created and then it and the call identifier are added to the token map at block 2915. Then, at block 2920, the local digest is built and an update command is sent.

At block 2925, the local digest is checked for consistency against a second digest received from a co-element. If the consistency check succeeds, the process proceeds to block 2930 where the thread's name is set to be the parameter thread_name. An instance of the thread state structure is constructed with initial values (e.g., 0 calls made, 0 calls completed, and a flag to indicate that the thread has terminated set to 'reset') at block 2935. Then, at block 2940, the thread's name and thread state structure pair is added to the thread map. At this point the call's action is complete, so the process sets the completed flag. The process releases the calling thread and sends an enable command at block 2945.

At block 2950, when a third digest is received, the local digest is compared against the third digest. If they match, the completed call counter is incremented and the token is removed from the token map at block 2955. The call is now complete and the next command is processed at block 2960.

The process provides an indication of divergence at block 2965 if any of the consistency checks in blocks 2925 and 2950 fail.

Figure 30:
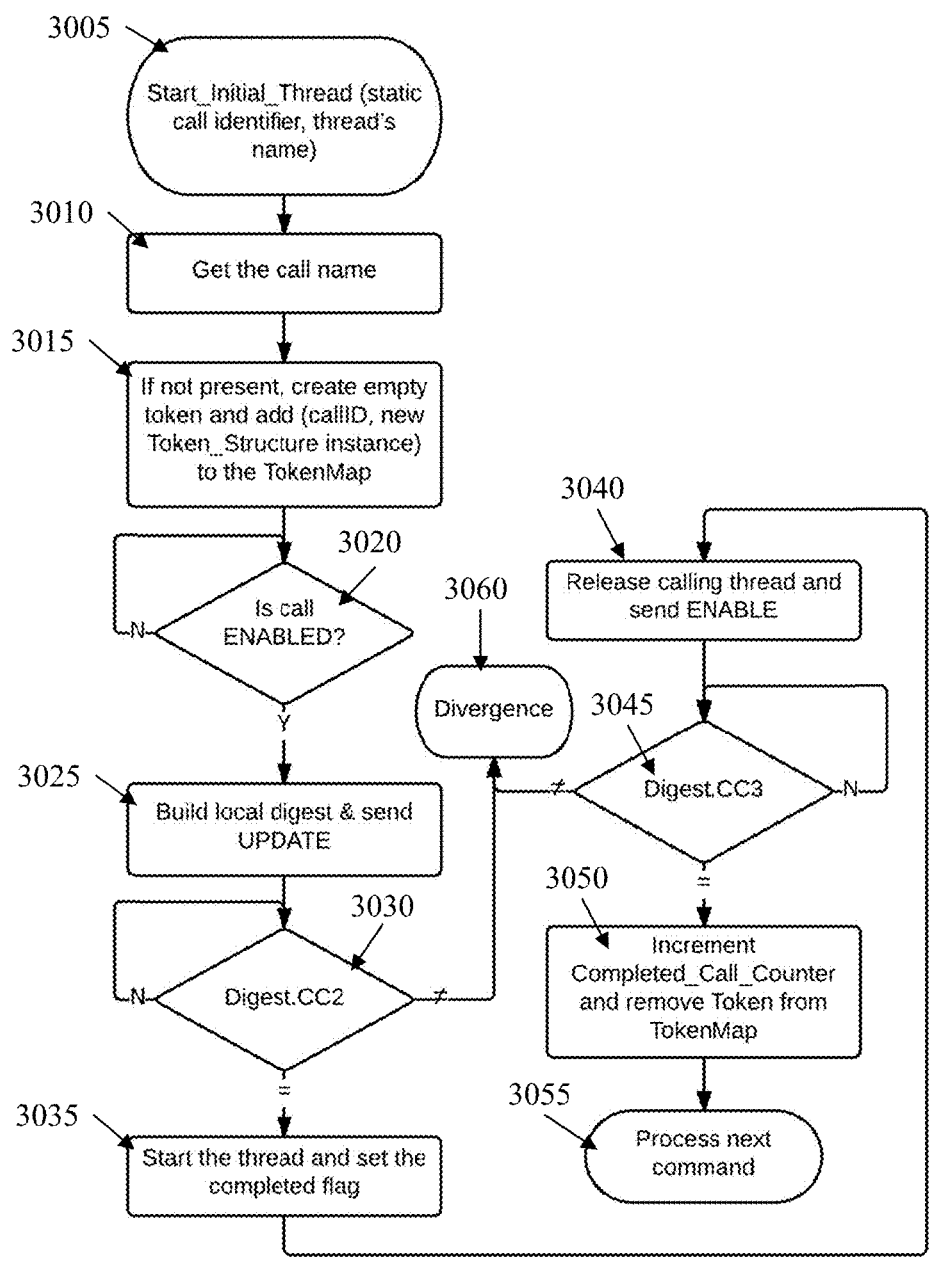
FIG. 30 shows a flowchart of a start initial thread command in accordance with a second embodiment.

FIG. 30 shows a flowchart of a start initial thread command in accordance with the second embodiment. At block 3005, a Start_Initial_Thread call command is received with a static call identifier and the thread's name that was assigned in the Register_Initial_Thread call. The process gets the call name at block 3010. Then, at block 3015 if the token is not present, an empty token is created and the call identifier and the token are added to the token map.

A check is made to see if the call is enabled, if not, the process waits until it is enabled at block 3020. Once the call is enabled, the local digest is built and an update command is sent at block 3025. The local digest is compared against a second digest (e.g., one received from a wing, scout, rear or other co-element) at block 3030. If the consistency check succeeds, the process proceeds to block 3035 and the thread is started. At this point the call's action is complete, so the process sets the completed flag. Next, the process releases the calling thread and sends an enable command at block 3040. Then, when a third digest (e.g., one received from another of the wing, scout, rear or other co-element) is available, it is compared against the local digest at block 3045. If the consistency check succeeds, the completed call counter is incremented and the token is removed from the token map at block 3050. The call is now complete and, at block 3055, the next command is processed.

If either the first or the second consistency checks fail (at block 3030 or 3045), the process provides an indication of divergence at block 3060.

Figure 31:
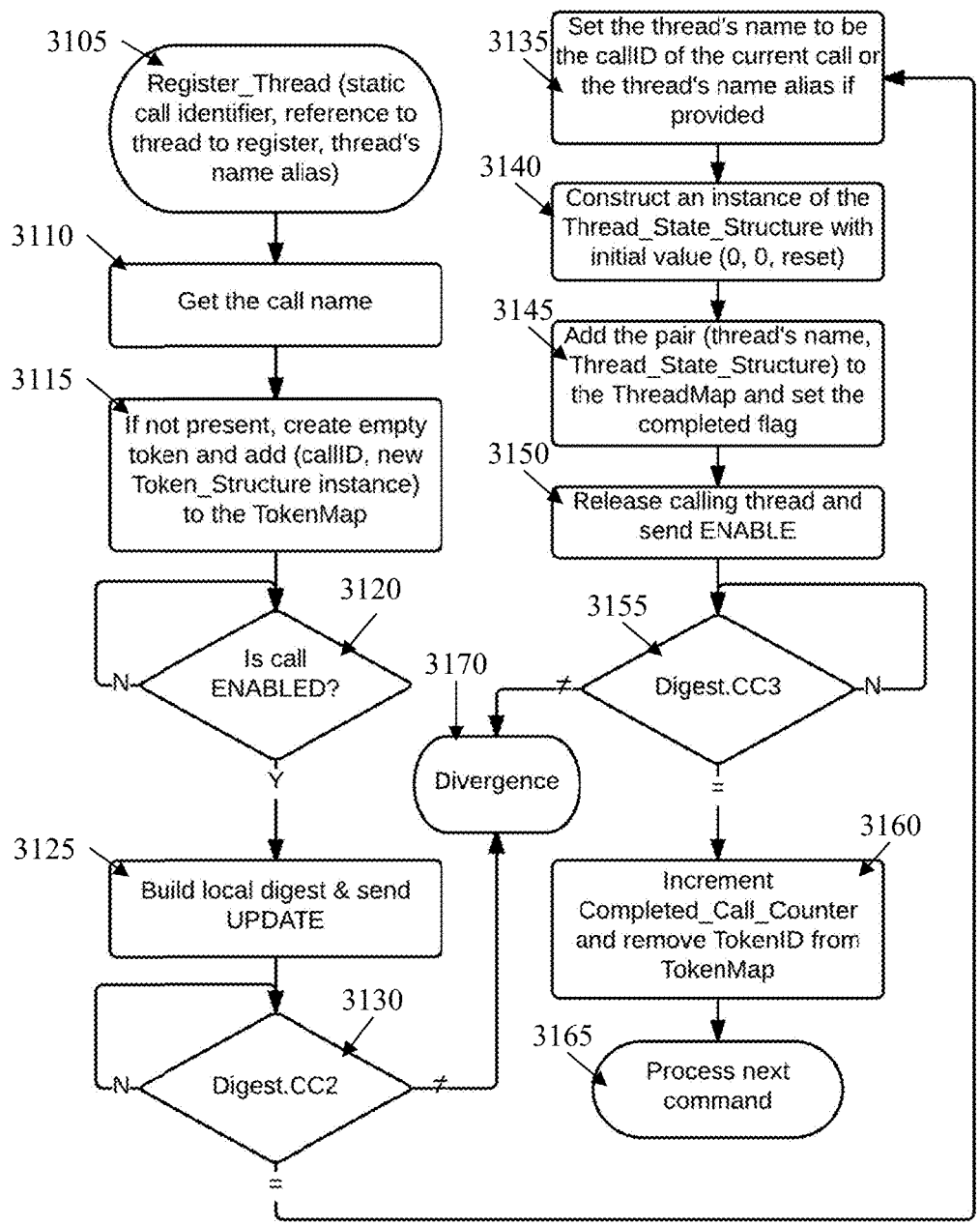
FIG. 31 shows a flowchart of a register thread command in accordance with a second embodiment.

FIG. 31 shows a flowchart of a register thread command in accordance with the second embodiment. At block 3105, a Register_Thread call command is received. This command includes a static call identifier, a reference to the thread to be registered and the optional thread's name alias.

Next, the process gets the call name (e.g., the call identifier) at block 3110. If the alias parameter is provided, the thread name is assigned the alias, otherwise it is assigned the call identifier. If the call identifier is not present in the token map, at block 3115, an empty token is created and the call identifier and a reference to the new token are added to the token map. Then the new token is retrieved using the call identifier. Next a check is made to see if the call is enabled at block 3120. If it is not enabled, the process waits until it is enabled.

Once the call is enabled, a local digest is built and an update command is sent at block 3125. The local digest is compared against a second digest (e.g., one received from a wing, scout, rear or other co-element) at block 3130. If the consistency check succeeds, the process proceeds to block 3135, where, if the alias parameter is provided, the thread name is assigned the alias, otherwise it is assigned the call identifier.

An instance of the thread state structure is created with initial values (e.g., no calls, no completed calls and a thread completed flag set to 'reset') at block 3140. Then, at block 3145, the thread's name and thread state structure are added to the thread map. At this point the call's action is complete, so the process sets the completed flag. The process releases the calling thread and sends an enable command at block 3150. The local digest is then compared against a third digest (e.g., one received from another of a wing, scout, rear or other co-element) at block 3155. If the consistency check succeeds, the process proceeds to block 3160 and the completed call counter is incremented and the token is removed from the token map. Then the next command is processed at block 3165.

If either the first or the second consistency checks fail (at block 3120 or 3155), the process provides an indication of divergence at block 3170.

Figure 32:
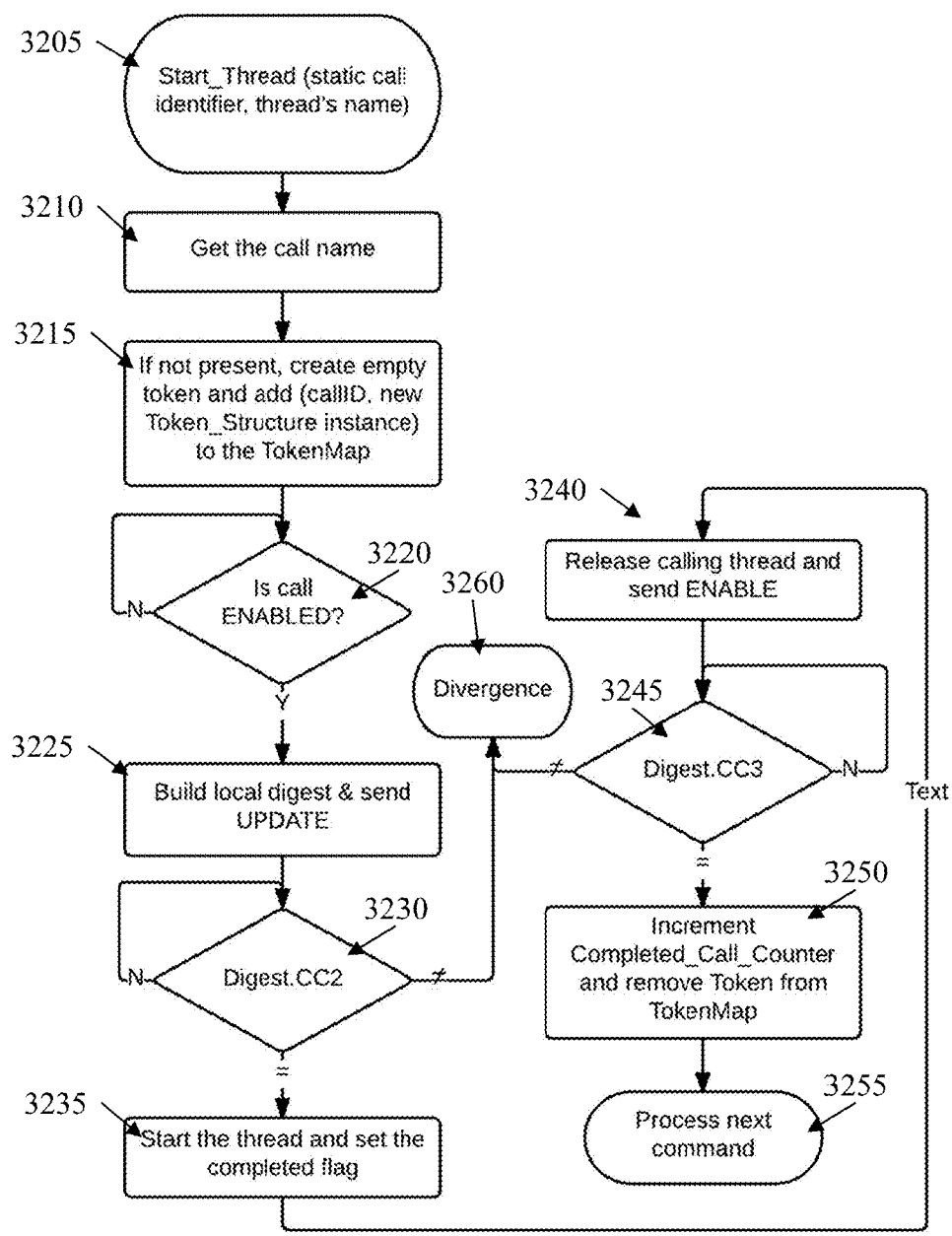
FIG. 32 shows a flowchart of a start thread command in accordance with a second embodiment.

FIG. 32 shows a flowchart of a start thread command in accordance with the second embodiment. A Start_Thread command with a static call identifier and the thread's name is received at block 3205. Next, at block 3210, the process gets the call name 3210. If the call token is not present, the process creates an empty token and adds the call identifier and the new token to the token map at block 3215. A check is made to see if the call is enabled at block 3220, if not, the process waits until it is enabled. If the call is enabled, a local digest is built and an update command is sent at block 3225.

Next the local digest and a second digest are checked for consistency. If the consistency check succeeds, the thread is started at block 3235. At this point the call's action is complete, so the process sets the completed flag. Then, the process releases the calling thread and sends an enable command at block 3240. The local digest and a third digest are then checked for consistency at block 3245. If the consistency check succeeds, the process proceeds to block 3250 and the completed call counter is incremented and the token is removed from the token map. Next, the next command is processed at block 3255.

If either the first or the second consistency checks fail (at block 3230 or 3245), the process provides an indication of divergence at block 3260.

Figure 33:
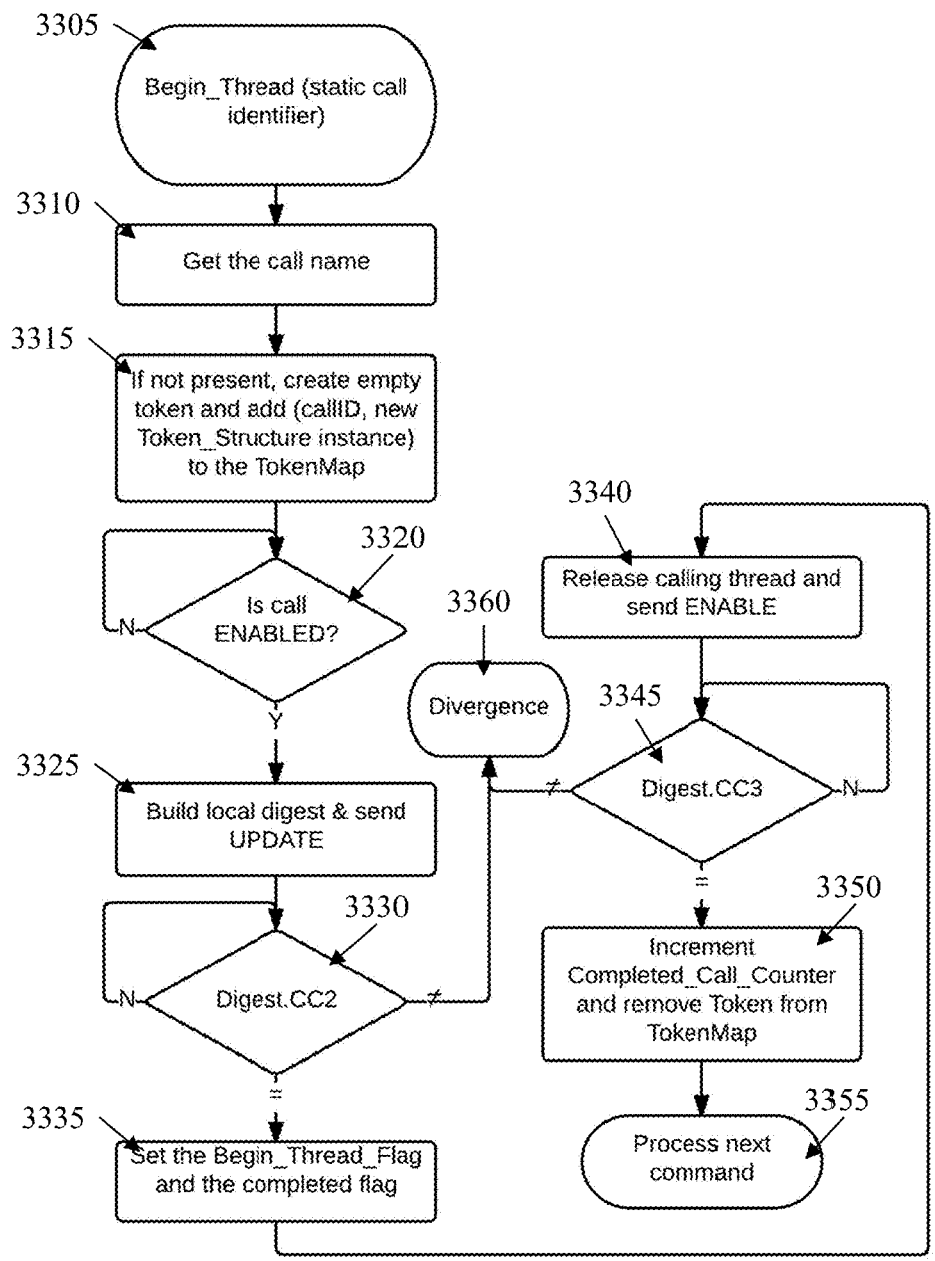
FIG. 33 shows a flowchart of a begin thread command in accordance with a second embodiment.

FIG. 33 shows a flowchart of a begin thread command in accordance with the second embodiment. At block 3305, a Begin_Thread command is received with a static call identifier. The process gets the call name at block 3310. If the call token is not present, the process, at block 3315, creates an empty token and adds the call identifier and the new token to the token map. Then, at block 3320, a check is made to see if the call is enabled. Once the call is enabled, a local digest is built and an update command is sent at block 3325. The local digest is compared against a second digest at block 3330. If the consistency check succeeds, the process proceeds to block 3335 and the Begin_Thread_Flag is set. At this point the call's action is complete, so the process sets the completed flag.

The process releases the calling thread and sends an enable command at block 3340. Next, the local digest is compared against a third digest at block 3345. If the consistency check succeeds, the process proceeds to block 3350 where the completed call counter is incremented and the token is removed from the token map. Then, at block 3355, the next command is processed.

If either the first or the second consistency checks fail (at blocks 3330 and 3345), the process provides an indication of divergence at block 3360.

Figure 34:
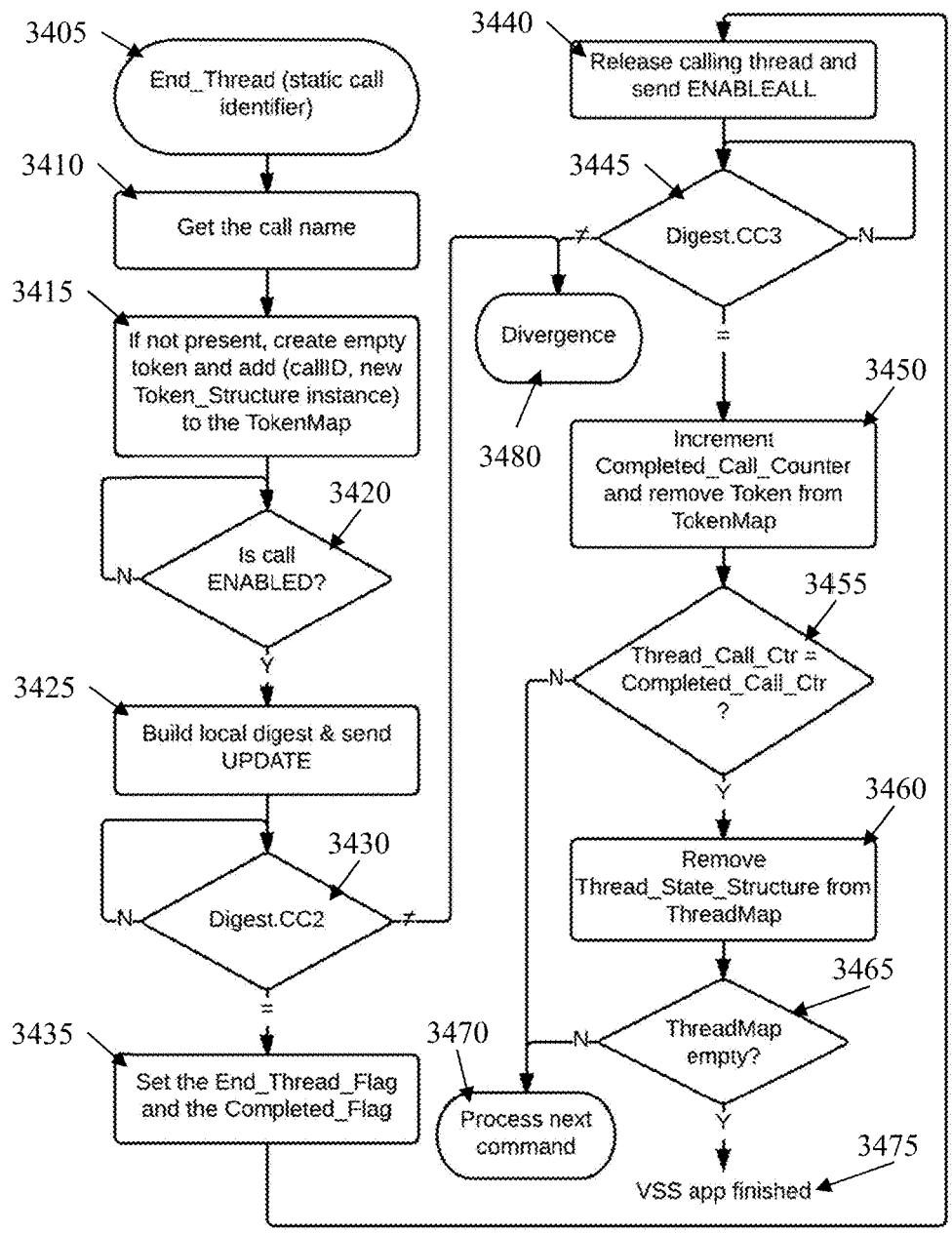
FIG. 34 shows a flowchart of an end thread command in accordance with a second embodiment.

FIG. 34 shows a flowchart of an end thread command in accordance with the second embodiment. An End_Thread command with a static call identifier is received at block 3405. At block 3410, the process gets the call name. If not present, the process creates an empty token and adds the call identifier and the new token to the token map at block 3415. A check is made to see if the call is enabled at block 3420. Once the call is enabled, a local digest is built and an update command is sent at block 3425.

At block 3430, a consistency check is performed by comparing the local digest to a second digest. If the consistency check succeeds, the process proceeds to block 3435 where the end thread flag and the completed flag are set. At block 3440, the calling thread is released and an 'ENABLE-ALL' message is sent. This causes delayed execution to be suspended for this thread in downstream elements by enabling all its outstanding calls.

Next, at block 3445, a second consistency check is performed by comparing the local digest to a third digest. If the consistency check succeeds, the completed call counter is incremented and the token is removed from the token map at block 3450.

The thread call counter is compared against the completed call counter at block 3455. If they are equal (when all calls have been completed), the thread is removed from the thread map at block 3460. Then, the thread map is checked to determine whether it is empty at block 3465. If the thread map is empty, the application is finished at block 3475.

If either the counters are determined to be not equal (e.g., there are remaining calls to be completed) at block 3455 or if the thread map is not empty (e.g., there are threads remaining) at block 3465, then the next command is processed at block 3470.

If either consistency check (at blocks 3430 and 3445) fails, the process provides an indication of divergence at block 3480.

Figure 35:
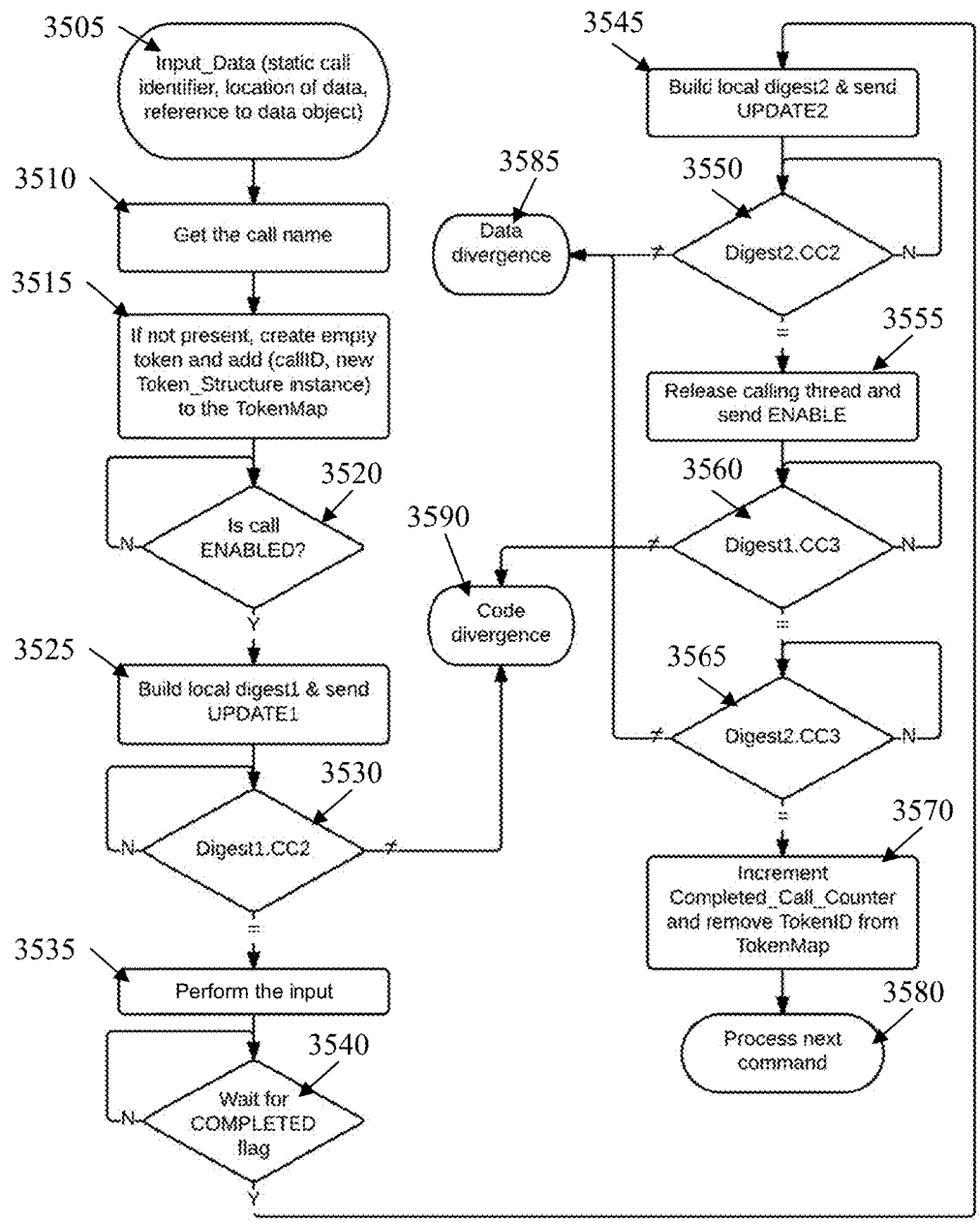
FIG. 35 shows a flowchart of an input data command in accordance with a second embodiment.

FIG. 35 shows a flowchart of an input data command in accordance with the second embodiment. At block 3505, an Input_Data command is received. The command includes a static call identifier, the location of the data to be input, and a reference to a data object to receive the data. The call identifier is generated at block 3510. If the call token is not present, the process creates an empty token and adds the call identifier and the new token to the token map at block 3515. At block 3520, a check is made to see if the call is enabled, if not, the process waits until it is enabled. If the call is enabled, a local call digest is built (e.g., based on the address of the data to be input) and an update is sent to other co-elements at block 3525.

At block 3530, a consistency check is performed on the local call digest based on a second call digest. If the consistency check succeeds, the input data is performed at block 3535. The process waits for a completed flag at block 3540 to indicate the input data has been performed.

At block 3545, an input digest is built (e.g., based on the input data) and sent to other co-elements via an input update. Then, a consistency check is performed on the local input digest based on a second input digest (once received) at block 3550. If the consistency check succeeds, the calling thread is released and an enable command is sent at block 3555.

Once a third call digest is received, another consistency check is performed on it based on the local call digest at block 3560. If the consistency check succeeds, another consistency check is performed at block 3565 on the local input digest based on a third input digest (once received). If the consistency check succeeds, the completed call counter is incremented and the token is removed from the token map at block 3570. Then the next command is processed at block 3580.

If either input digest consistency checks (performed in blocks 3550 and 3565) fail, the process provides an indication of data divergence at block 3585. Likewise, if either call digest consistency check (performed in blocks 3530 and 3560) fail, an indication of code divergence is provided at block 3590.

Figure 36:
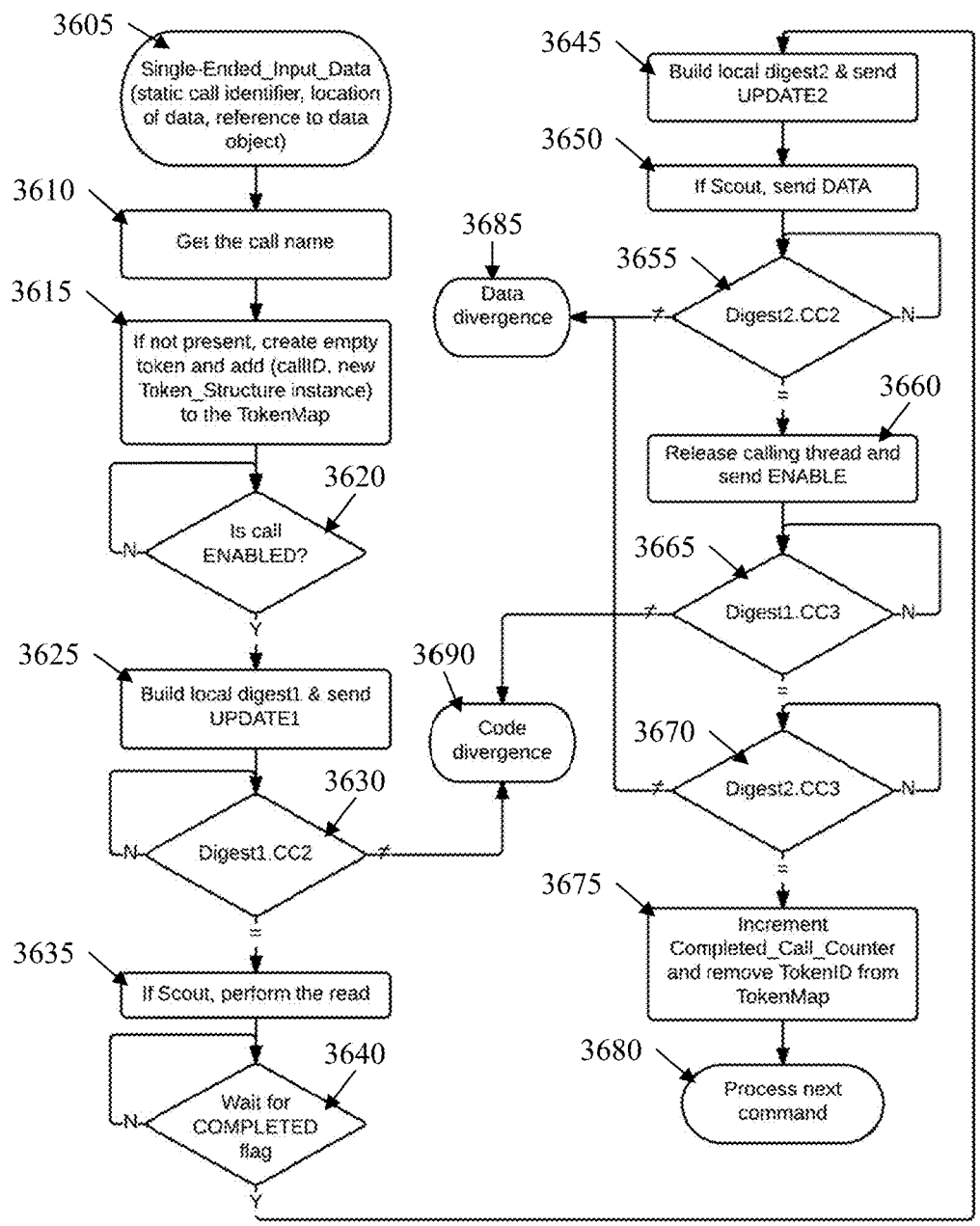
FIG. 36 shows a flowchart of a single-ended input data command in accordance with a second embodiment.

FIG. 36 shows a flowchart of a single-ended input data command in accordance with the second embodiment. At block 3605, a Single-Ended_Input_Data command is received. The command includes a static call identifier, the location of the data, and a reference to a data object to receive the data. Then, at block 3610, the process gets the call name. If the call token is not present in the token map, an empty token is created and the call identifier and the new token are added to the token map at block 3615. At block 3620, a check is made to see if the call is enabled, if not, the process waits until it is enabled. When the call is enabled, a local call digest is built and an update is sent to the co-elements at block 3625.

At block 3630, a consistency check is performed on the local call digest based on a second call digest. If the consistency check succeeds, the process proceeds to block 3635 where, if the element is the scout, the read is performed at block 3635. The process waits for a completed flag at block 3640 to indicate the read has been performed. Note: if the element is the scout, the completed flag is set by the COMPLETION command issued by the data provider upon action completion. If the element is not the scout, the completed flag is set by the DATA command.

At block 3645, a local input digest is built and a second update is sent to the co-elements. If the element is the scout, the data is also sent to the co-elements at block 3650.

At block 3655, a consistency check is performed on the local input digest based on a second input digest. If the consistency check succeeds, the process proceeds to block 3660 where the process releases the calling thread and sends an enable command.

Once a third call digest is received, a consistency check is performed on the local call digest based on the third call digest at block 3665. If the consistency check succeeds, a further consistency check is performed on the local input digest based on a third input digest (once it's received) at block 3670. If the consistency check succeeds, the completed call counter is incremented and the token is removed from the token map at block 3675. Then, at block 3680, the next command is processed.

If either input digest consistency check (performed in blocks 3655 and 3670) fail, the process provides an indication of data divergence at block 3685. Likewise, if either call digest consistency check (performed in blocks 3630 and 3665) fail, the process provides an indication of code divergence at block 3690.

Figure 37:
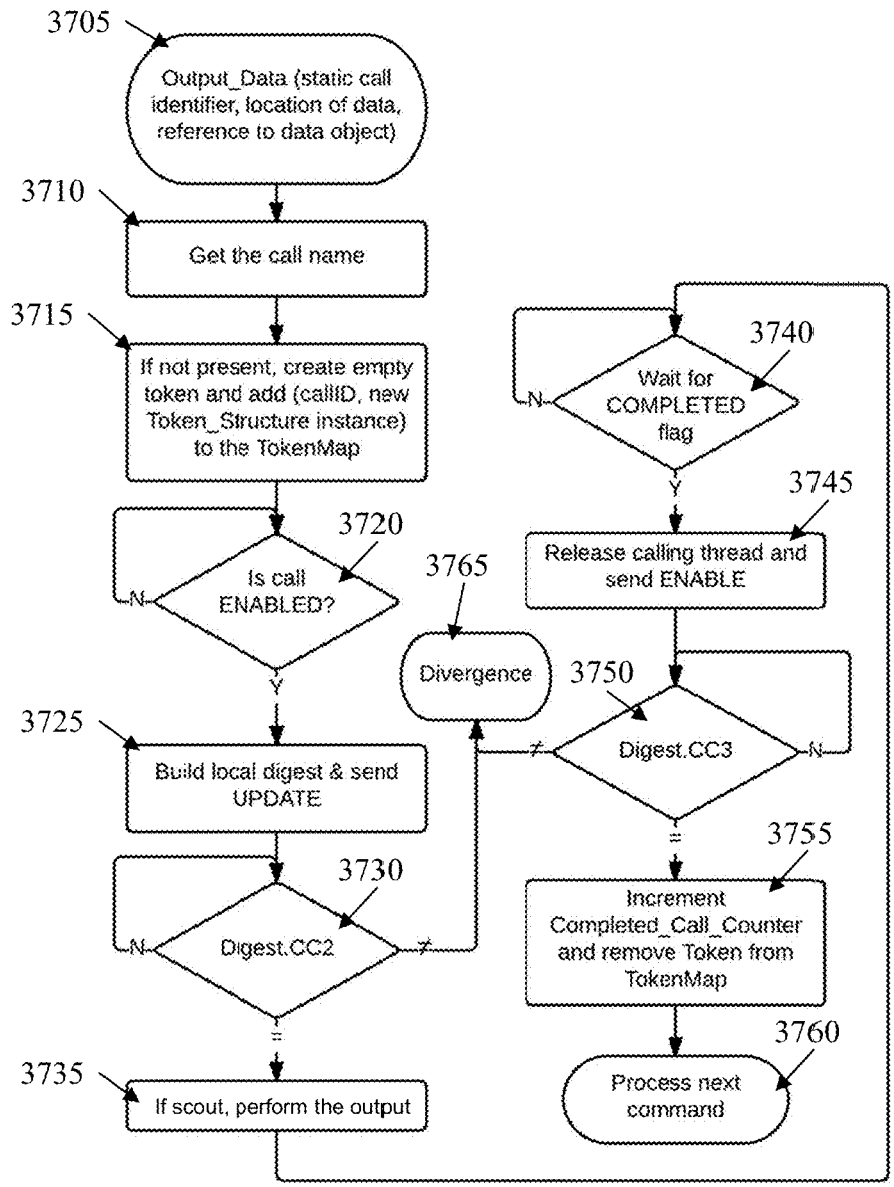
FIG. 37 shows a flowchart of an output data command in accordance with a second embodiment.

FIG. 37 shows a flowchart of an output data command in accordance with the second embodiment. At block 3705, an Output_Data command is received indicating a static call identifier, the location of where to put the data and a reference to a data object containing the data. Then, the process gets the call name at block 3710. If not present, an empty token is created and the call identifier and the new token are added to the token map at block 3715.

Next, a check is made to see if the call is enabled, if not, the process waits until it is enabled. Once the call is enabled, a local digest is built and an update command is sent at block 3725. The local digest is compared against a second digest at block 3730 in a consistency check. If the consistency check succeeds, the output is performed at block 3735 if the element is the scout. Then at block 3740, the process waits for a completed flag. Note: the completed flag is set by the COMPLETION command issued by the data provider. If the element is the scout and the provider is single-ended, the data provider issues the COMPLETION command upon action completion. If the element is not the scout and the provider is single-ended, the data provider issues the COMPLETION command immediately. The process then releases the calling thread and sends an enable command at block 3745.

Another consistency check is performed at block 3750 comparing the local digest against a third digest. If the consistency check succeeds, the completed call counter is incremented and the token is removed from the token map at block 3755. Then the next command is processed at block 3760

If either digest consistency check (performed in blocks 3730 and 3750) fails, the process provides an indication of divergence at block 3765.

Figure 38:
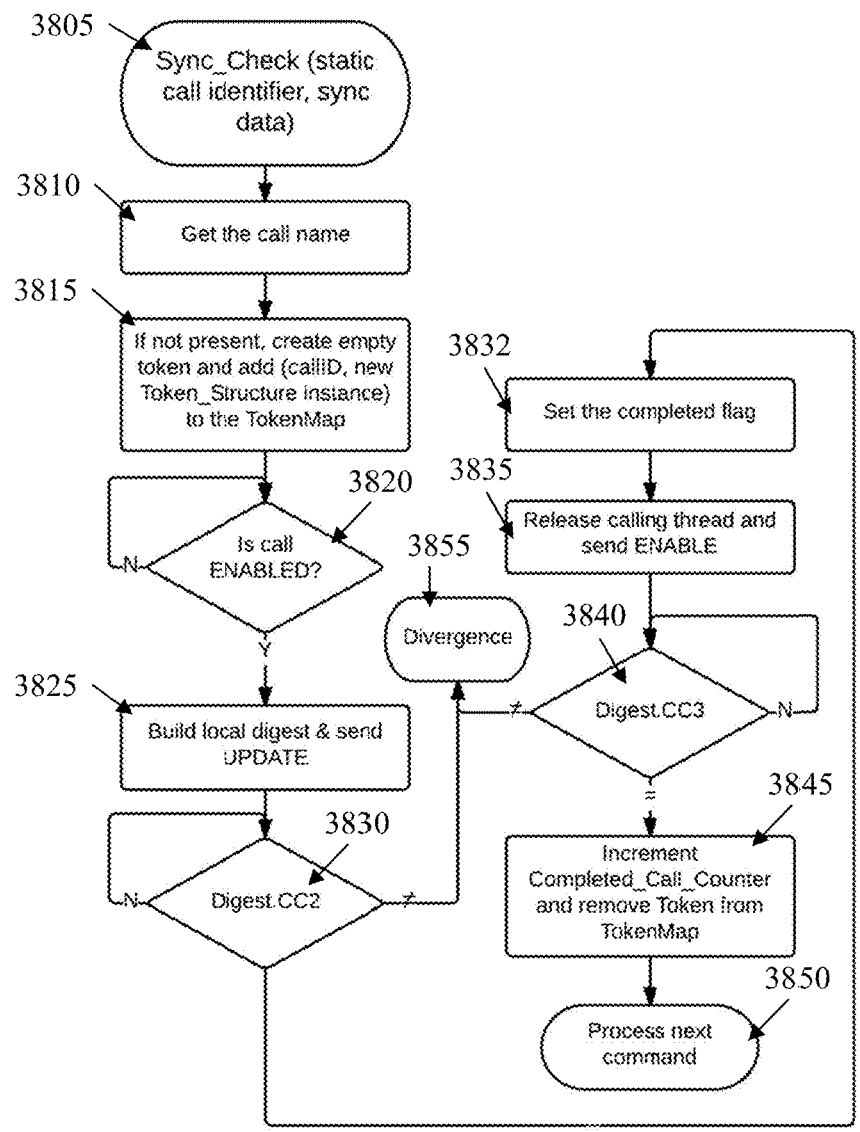
FIG. 38 shows a flowchart of a sync check command in accordance with a second embodiment.

FIG. 38 shows a flowchart of a synchronization check command in accordance with the second embodiment. At block 3805, a Sync_Check command is received. The command includes a static call identifier and sync data—the data that is being checked for consistency. The sync data resides in a location internal to the application, e.g. in memory, so it is immediately available. The process gets the call name at block 3810. If not present, an empty token is created and the call identifier and the new token are added to the token map at block 3815. Then, a check is made to see if the call is enabled at block 3820, if not, the process waits until it is enabled. Once the call is enabled, a local digest is built based on the sync data, and an update command is sent at block 3825.

Next, the local digest is checked for consistency against a second digest at block 3830. If the consistency check succeeds, the call action is complete and the completed flag is set at block 3832. Then the process releases the calling thread and sends an enable command at block 3835. Then, the local digest is checked for consistency against a third digest at block 3840. If the consistency check succeeds, the completed call counter is incremented and the token is removed from the token map at block 3845. Then the next command is processed at block 3850.

If either digest consistency check (performed in blocks 3830 and 3840) fails, the process provides an indication of divergence at block 3855.

Figure 39:
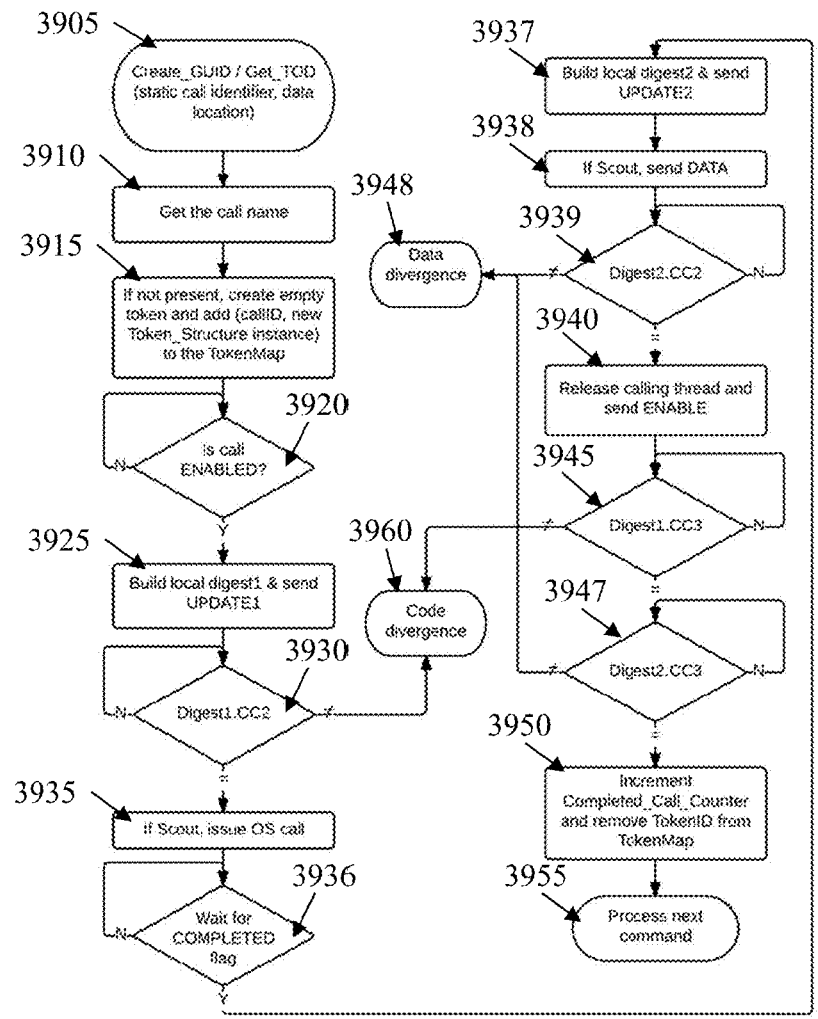
FIG. 39 shows a flowchart of a create GUID/get TOD command in accordance with a second embodiment.

FIG. 39 shows a flowchart of a create GUID/get TOD command in accordance with the second embodiment. At block 3905, either a Create_GUID or a Get_TOD command is received. The command includes a static call identifier and a data location where the GUID/TOD data object is to be stored. The process proceeds to get the call name at block 3910. If not present, an empty token is created and both the call identifier and the new token are added to the token map at block 3915.

A check is made at block 3920 to see if the call is enabled, if not, the process waits until it is enabled. Once the call is enabled, a local digest is built and an update command is sent at block 3925. The local digest is checked for consistency against a second digest (e.g., one received from a co-element) at block 3930. If the consistency check succeeds, and if the element is the scout, an appropriate OS call is issued at block 3935. The process waits for a completed flag at block 3936 to indicate the GUID/TOD object has been stored in the data location. Note: if the element is the scout, the completed flag is set by the COMPLETION command issued by the data provider upon action completion. If the element is not the scout, the completed flag is set by the DATA command.

At block 3937, a local input digest is built and an input update is sent to the co-elements. If the element is the scout, the data is also sent to the co-elements at block 3938.

At block 3939, a consistency check is performed on the local input digest based on a second input digest. If the consistency check succeeds, the process proceeds to block 3940 where the process sets the completed flag, releases the calling thread, and sends an enable command.

Once a third call digest is received, a consistency check is performed on the local call digest based on the third call digest at block 3945. If the consistency check succeeds, a further consistency check is performed on the local input digest based on a third input digest (once it's received) at block 3947. If the consistency check succeeds, the completed call counter is incremented and the token is removed from the token map at block 3950. Then, at block 3955, the next command is processed.

Figure 40:
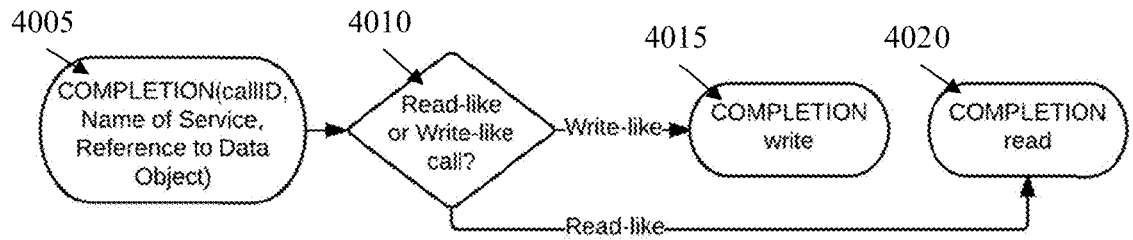
FIG. 40 illustrates a flowchart of completion preamble processing in accordance with a second embodiment.
Figure 41:
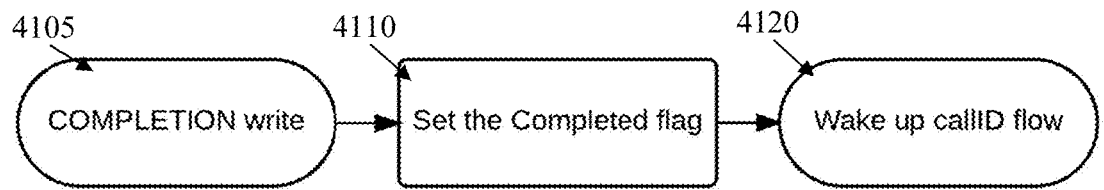
FIG. 41 demonstrates a completion write flowchart in accordance with a second embodiment.

If either input digest consistency check (performed in blocks 3939 and 3947) fails, the process provides an indication of data divergence at block 3948. Likewise, if either call digest consistency check (performed in blocks 3930 and 3945) fails, the process provides an indication of code divergence at block 3960. FIG. 40 illustrates a flowchart of completion command preamble processing in accordance with the second embodiment. First a COMPLETION command is received at block 4005. This command includes a call identifier, the name of the service that has completed, and a reference to a data object in the case of read-like commands. The callID's token is checked to determine if the command refers to a read-like or write-like call, at block 4010. If the call is a write-like call, the process proceeds to block 4015 and performs a COMPLETION write (such as shown in FIG. 41). On the other hand, if the call is a read-like call, the process proceeds to block 4020 and performs a COMPLETION read (such as shown in FIG. 42).

FIG. 41 demonstrates a COMPLETION write flowchart in accordance with the second embodiment. At block 4105, the process proceeds from the completion preamble processing (from block 4015). Next, at block 4110, the completed flag is set. Finally, at block 4120, the process resumes the flowchart that was waiting while processing the call identified by callID.

Figure 42:
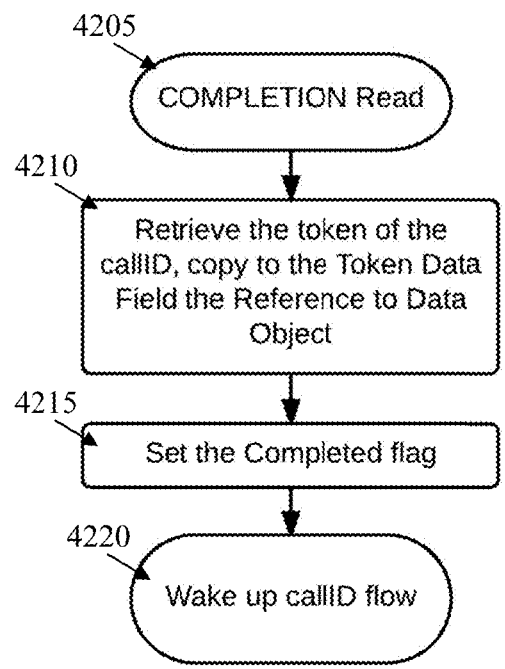
FIG. 42 demonstrates a completion read flowchart in accordance with a second embodiment.

FIG. 42 demonstrates a COMPLETION read flowchart in accordance with the second embodiment. At block 4205, the process proceeds from the completion preamble processing (from block 4020 of FIG. 40). Next, the process proceeds to retrieve the token of the call identifier, and copy to the token data field the reference to the data object at block 4210. The process then sets the Completed flag at block 4215. At block 4215, the process resumes the flowchart that was waiting while processing the call identified by the callID.

Figure 43:
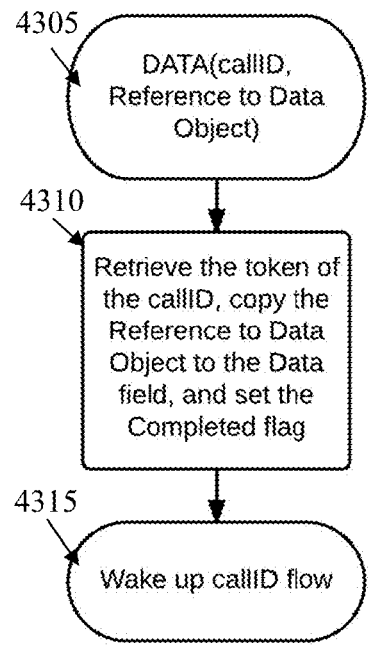
FIG. 43 demonstrates a data flowchart in accordance with a second embodiment.

FIG. 43 demonstrates a data command flowchart in accordance with the second embodiment. At block 4305, a DATA command is received. The command includes a call identifier and a reference to a data object. Next, the process retrieves the token of the call identifier, copies the reference to data object to the data field, and sets the Completed flag at block 4310. At block 4315, the process resumes the flowchart that was waiting while processing the call identified by the callID.

Figure 44:
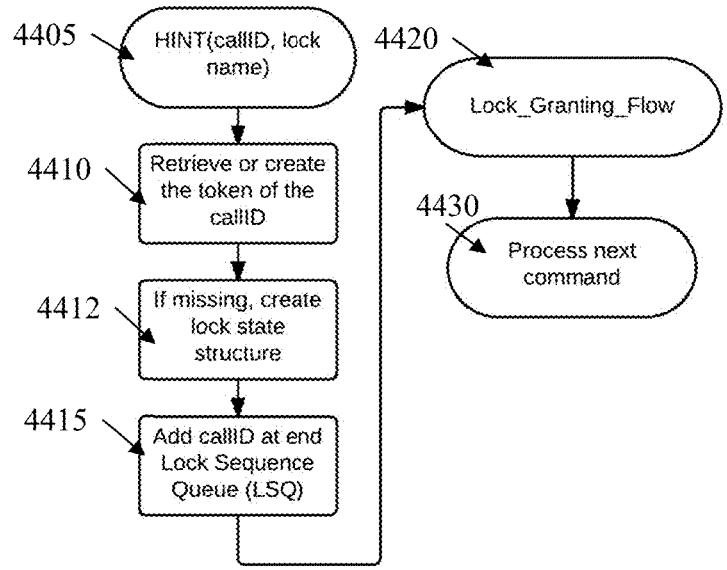
FIG. 44 demonstrates a hint flowchart in accordance with a second embodiment.
Figure 45:
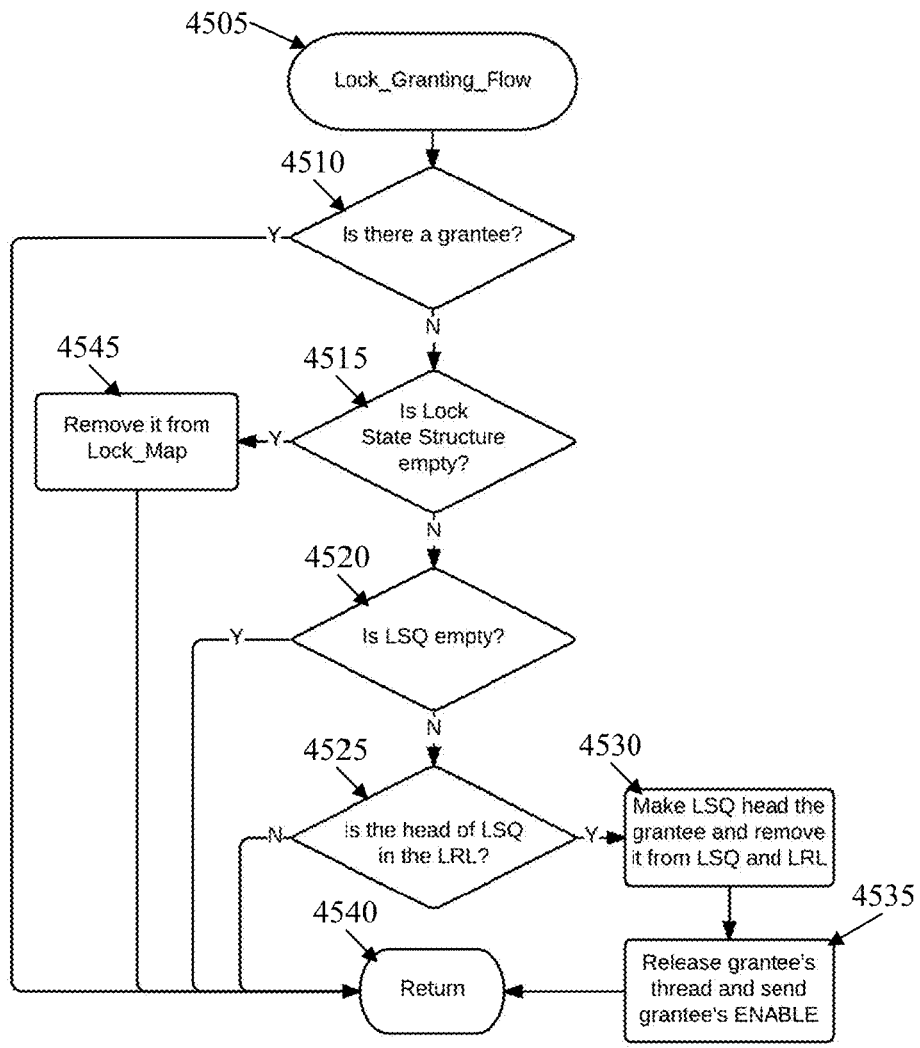
FIG. 45 illustrates a lock granting process flow in accordance with a second embodiment.

FIG. 44 demonstrates a hint command flowchart in accordance with the second embodiment. At block 4405 a HINT command with a call identifier and a lock name as parameters is received. Then, the token of the call identifier is retrieved or created as appropriate at block 4410. Next, at block 4412, a lock state structure is created if it does not yet exist for this lock. The call identifier is added at the end of the lock sequence queue (LSQ) in the lock state structure at block 4415. The process then proceeds to block 4420 and performs a lock granting flow (as shown in FIG. 45). Then the next command is processed at block 4430.

FIG. 45 illustrates a lock granting process flow in accordance with the second embodiment. At block 4505, a Lock_Granting_Flow is started from a parent lock processing flow. A check is made at block 4510 to determine if there is there a grantee, i.e. if a thread is holding the lock. If there is no grantee, the process proceeds to block 4515 and checks if the lock state structure is empty. If it is not empty, at block 4520, the LSQ is checked to see if it is empty. If the LSQ is not empty, the process determines if the head of the LSQ is in the lock ready list (LRL) at block 4525. If the head of the LSQ is in the LRL, meaning that a thread is waiting for the lock, at block 4530 the LSQ head is made the grantee and it is removed from the LSQ and from the LRL. Then, the grantee's thread is released by releasing the original Acquire_Lock call, and that call's ENABLE is sent at block 4535. Next, the process returns to the parent lock processing flow at block 4540.

If block 4510 determines there is a grantee, the process proceeds directly to block 4540. Likewise, if the LSQ is determined to be empty at block 4520 or if the head of the LSQ is not in the LRL, the process proceeds directly to block 4540.

When the lock state structure is empty, the process proceeds to block 4545 and removes the lock state structure from the lock map and then proceeds to block 4540.

Figure 46:
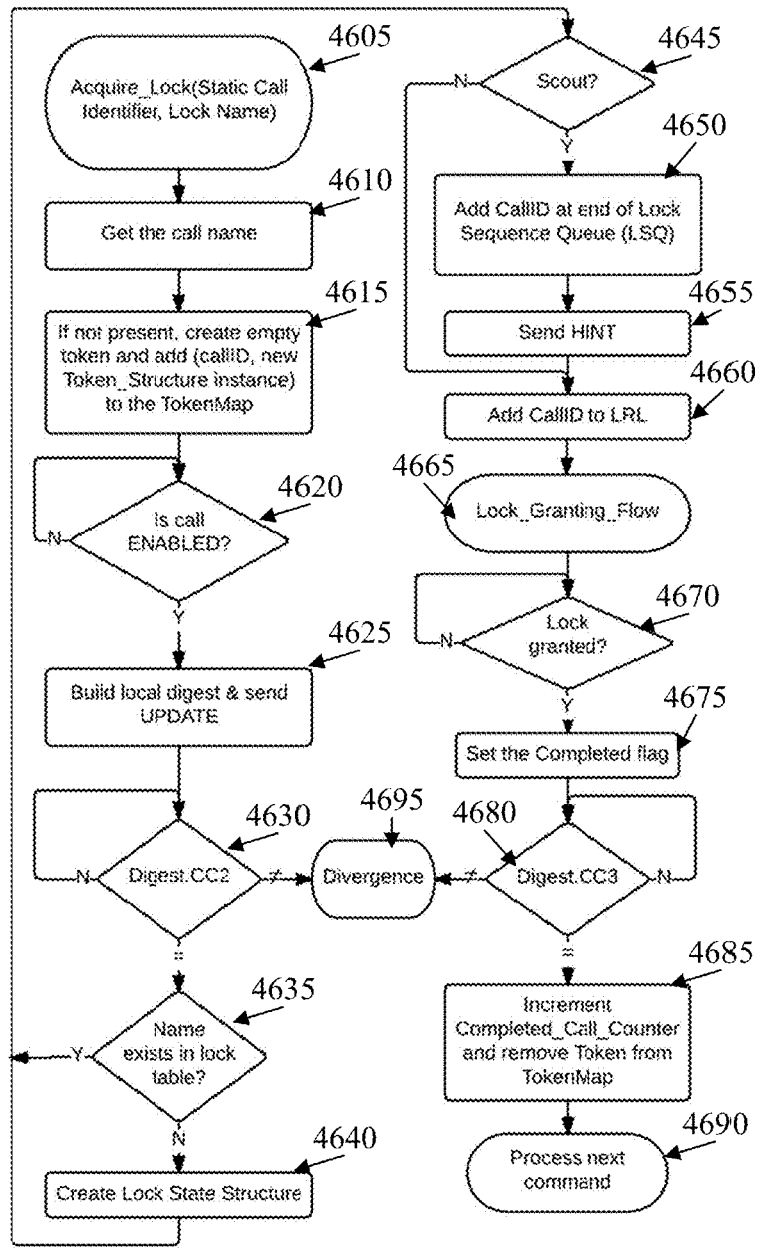
FIG. 46 shows a flowchart of an acquire lock command in accordance with a second embodiment.

FIG. 46 shows a flowchart of an acquire lock command in accordance with the second embodiment. At block 4605, an Acquire_Lock command is received. The command includes a Static Call Identifier and the name of the lock to be acquired. At block 4610, the process gets the call name. If not present, an empty token is created and the call identifier and the new token are added to the token map at block 4615.

Then, at block 4620, a check is made to see if the call is enabled, if not, the process waits until it is enabled. Once the call is enabled, a local digest is built and an update command is sent at block 4625.

At block 4630, the local digest and a second digest (e.g., from a co-element) are checked for consistency. If the consistency check succeeds, the process proceeds to block 4635 and checks to determine if the lock name exists in the lock table. If not, the process creates a lock state structure at block 4640 and proceeds to block 4645. If the lock name is in the lock table, the process proceeds directly to block 4645.

At block 4645, the element is checked to see if it is the scout. If so, at block 4650, the call identifier is added at the end of the LSQ. Then, a HINT message is sent to the co-elements at block 4655. After block 4655 or after the element is determined to not be the scout at block 4645, the call identifier is added to the LRL at block 4660.

Next, the Lock_Granting_Flow of FIG. 45 is performed at block 4665. At block 4670, a check is performed until the lock has been granted by the Lock_Granting_Flow to this Acquire_Lock call. Once the lock is granted, the completed flag is set at block 4675.

Then, at block 4680, the local digest and a third digest (e.g., from another co-element) are checked for consistency. If they are equivalent, the completed call counter is incremented and the token is removed from the token map at block 4685. Then, the next command is processed at block 4690.

If either digest consistency check (performed in blocks 4630 and 4680) fail, the process provides an indication of divergence at block 4695.

Figure 47:
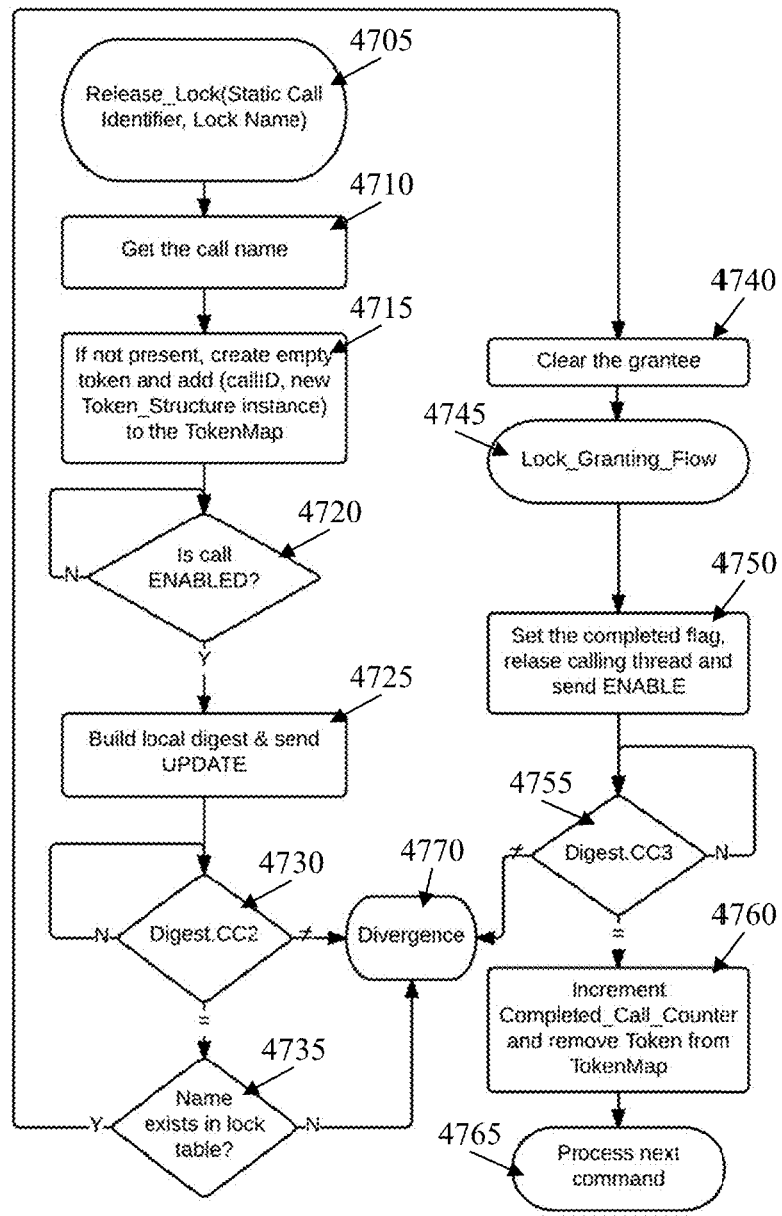
FIG. 47 shows a flowchart of a release lock command in accordance with a second embodiment.

FIG. 47 shows a flowchart of a release lock command in accordance with the second embodiment. At block 4705, a Release_Lock command is received. The command includes a static call identifier and a name of the lock to be released. At block 4710, the process gets the call name. If not present, an empty token is created and the call identifier and the new token are added to the token map at block 4715. At block 4720, a check is made to see if the call is enabled, if not, the process waits until it is enabled. When the call is enabled, a local digest is built and an update command is sent at block 4725.

At block 4730, the local digest and a second digest (e.g., from a co-element) are checked for consistency. If the consistency check succeeds, the process proceeds to block 4735 where the lock name is checked to see if it exists in the lock table. If it is present in the lock table, the grantee is removed from the lock table at block 4740. Then, the Lock_Granting_Flow of FIG. 45 is performed at block 4745. Next, the completed flag is set, the calling thread is released, and an ENABLE command is sent at block 4750.

Then, at block 4755, the local digest and a third digest (e.g., from another co-element) are checked for consistency.

If the consistency check succeeds, the completed call counter is incremented and the token is removed from the token map at block 4760. Then, the next command is processed at block 4765.

If either digest consistency check (performed in blocks 4730 and 4755) fail, the process provides an indication of divergence at block 4770. If the lock name is found to not be in the lock table (in block 4735), an exception is thrown.

Figure 48:
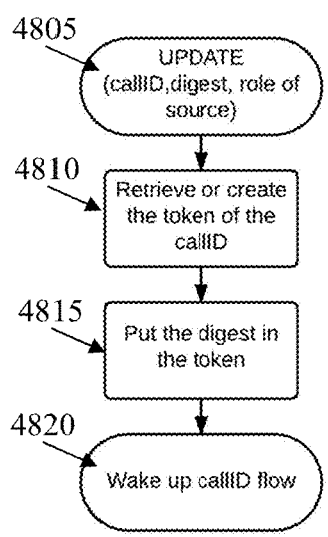
FIG. 48 shows a flowchart of an update command in accordance with a second embodiment.

FIG. 48 shows a flowchart of an update command in accordance with the second embodiment. At block 4805, an UPDATE command is received. The command includes a call identifier, a digest and a role of the source of the command. Then, the token of the call identifier is retrieved or created as appropriate at block 4810. At block 4815, the digest is put in the token. At block 4820, the process resumes the flowchart that was waiting while processing the call identified by the callID.

In another non limiting embodiment, the completed flag is set and checked only for calls requiring a provider.

As described above, the first and second embodiments are compatible with delays of length zero. When using a non-zero delay, there is a potential to create a deadlock situation caused by a dependency loop. The dependency loop is created when an upstream consistency check, e.g., CC2, waits for a downstream UPDATE which, in turn, waits for an upstream RELEASE. However, the upstream RELEASE waits for some upstream action which is waiting for the upstream CC2.

In a further, non-limiting embodiment, delays greater than zero may be used in techniques similar to those described in the second embodiment. In this third embodiment, RELEASE is sent before CC2. In this non-limiting embodiment, the dependency loop is broken by relaxing the dependency of actions on consistency checks: {actions→completion→release} are performed without waiting for associated consistency checks, so that a new upstream call can enable a new downstream call to send back the UPDATE commands used for the consistency check.

In other words, the first consistency check, Digest.CC2, is performed in each flow immediately preceding the second consistency check, Digest.CC3. Actions are performed by elements without first checking for consistency. Consistency is then checked as UPDATE commands arrive afterwards.

An embodiment provides a method of detecting aberrant behavior in a software application. The method includes instantiating a plurality of replicated applications on at least one computing device using identical initial setting. Each replicated application in the plurality of replicated applications is a replicated instance of the software application, and the plurality of replicated applications includes a first replicated application and a second replicated application. Deterministic behavior is enforced so that each replicated application thread executes VSS calls in the same sequence and generating call identifiers which are unique for the duration of the replicated application and identical across the plurality of replicated applications. Receiving first information associated with a first VSS call from the first replicated application is included in the method. The first information includes a first call identifier of the first VSS call and a first digest. Second information associated with a second VSS call from the second replicated application is received, the second information including a second call identifier of the second VSS call and a second digest. In response to determining the first call identifier and the second call identifier are identical, the method performs determining whether the first digest matches the second digest. The method also includes, in response to the first digest not matching the second digest, signaling that aberrant behavior has occurred.

In another embodiment of the method above, the first VSS call is a consistency check and the method also includes, in response to the first digest matching the second digest, responding to the first information with an indication that the plurality of replicated applications are consistent.

In a further embodiment of any one of the methods above, the plurality of replicated applications includes a third replicated application. The method also includes receiving third information associated with a third VSS call from the third replicated application, the third information including a third call identifier of the third VSS call and a third digest. In response to determining the first call identifier, the second call identifier and the third call identifier are identical, the method performs determining whether the third digest matches both the first digest and the second digest. The method also includes, in response to the third digest not matching either the first digest or the second digest, signaling that aberrant behavior has occurred.

In another embodiment of any one of the methods above, the method also includes, in response to signaling aberrant behavior has occurred, determining a divergent application in the plurality of replicated applications; and ignoring any future communication from the divergent application. The plurality of replicated applications may include a third replicated application and the method also includes assigning the third replicated application as a replacement for the divergent application.

In a further embodiment of any one of the methods above, the first VSS call is one of: an input operation, an output operation, a request for a globally unique identifier.

In another embodiment of any one of the methods above, a digest is calculated based on at least one datum within the associated API call using: a checksum function; a hash function; an encryption function; and/or a user defined function.

In a further embodiment of any one of the methods above, a call identifier is a concatenation of a registration call identifier of a call which registered a thread within the associated application and a value of a call counter of the thread corresponding to the call.

In another embodiment of any one of the methods above, the first VSS call is created by a thread in the first replicated application. Operation of the thread in the first replicated application is suspended upon sending the first VSS call. The method includes processing the first VSS call by, in response to the first digest matching the second digest, responding to the first VSS call and enabling the thread to resume operation.

In a further embodiment of any one of the methods above, operation of the second replicated application is executed with a delay from operation of the first replicated application. The first replicated application sends a response to the first request without first performing a consistency check.

In another embodiment of any one of the methods above, the method also includes, in response to receiving from the first replicated application a first request for data, processing the first request and sending a data command to the second replicated application based at least in part on the response to the first request. The second replicated application accepts the data from the first replicated application, but may not send a response until consistency checking has been performed (e.g., as a "data request completed" or "action completion" message). The first request for data may include a request for: a globally unique identifier, a random number, a timestamp, a time of day, a memory access, and/or data input from a client application.

In a further embodiment of any one of the methods above, instantiating the plurality of replicated applications includes instantiating the first replicated application on a first hardware device and instantiating the second replicated application on a second hardware device which operates independently of the first hardware device.

In another embodiment of any one of the methods above, the method also includes storing a record of the first VSS call in a journal of VSS calls performed by the plurality of replicated applications. The record may be stored on each computing device and includes a journal of VSS calls performed by an associated replicated application and/or the journal may be stored at a gateway node and includes a journal of VSS calls performed by each replicated application. Storing the record of the first VSS call may include storing call information. The call information may include: an IP address, user credentials and/or contextual information.

In a further embodiment of any one of the methods above, the call identifiers are unique within the respective replicated application and the digests are a representation of at least one datum within the respective replicated application. However, the digests are not required for all calls.

In another embodiment of any one of the methods above, the software application is created using an application coding methodology that uses exclusively the method's API library for a class VSS calls and uses mandatory coding rules when using the API library calls. The API library call identifiers are generated across non communicating elements such that the call identifiers are unique over the life of the application and identical across elements without communication. One or more digests are generated for each API call. These digests are a representation of that call's state, including a combination of application data and/or call attributes. The method also includes enforcing deterministic behavior in the software application so that each replicated application thread executes all API calls in the same sequence.

A further embodiment provides an apparatus for detecting aberrant behavior in a software application. The apparatus includes at least one processor and at least one memory storing computer program code. The at least one memory and the computer program code are configured to, with the at least one processor, cause the apparatus to perform actions. The actions include instantiating a plurality of replicated applications on at least one computing device using identical initial setting. Each replicated application in the plurality of replicated applications is a replicated instance of the software application, and the plurality of replicated applications includes a first replicated application and a second replicated application. Deterministic behavior is enforced so that each replicated application thread executes VSS calls in the same sequence and generating call identifiers which are unique for the duration of the replicated application and identical across the plurality of replicated applications. Receiving first information associated with a first VSS call from the first replicated application is included in the actions. The first information includes a first call identifier of the first VSS call and a first digest. Second information associated with a second VSS call from the second replicated application is received, the second information including a second call identifier of the second VSS call and a second digest. In response to determining the first call identifier and the second call identifier are identical, the actions include determining whether the first digest matches the second digest. The actions also includes, in response to the first digest not matching the second digest, signaling that aberrant behavior has occurred.

In another embodiment of the apparatus above, the first VSS call is a consistency check and the actions also include, in response to the first digest matching the second digest, responding to the first information with an indication that the plurality of replicated applications are consistent.

In a further embodiment of any one of the apparatus above, the plurality of replicated applications includes a third replicated application. The actions also include receiving third information associated with a third VSS call from the third replicated application, the third information including a third call identifier of the third VSS call and a third digest. In response to determining that the first call identifier, the second call identifier and the third call identifier are identical, the actions include determining whether the third digest matches both the first digest and the second digest. The actions also include, in response to the third digest not matching either the first digest or the second digest, signaling that aberrant behavior has occurred.

In another embodiment of any one of the apparatus above, the actions also include, in response to aberrant behavior, determining a divergent application in the plurality of replicated applications; and ignoring any future communication from the divergent application. The plurality of replicated applications may include a third replicated application and the actions also include assigning the third replicated application as a replacement for the divergent application.

In a further embodiment of any one of the apparatus above, the first VSS call is one of: an input operation, an output operation, a request for a globally unique identifier.

In another embodiment of any one of the apparatus above, a digest is calculated based on at least one datum within the associated API call using: a checksum function; a hash function; an encryption function; and/or a user defined function.

In a further embodiment of any one of the apparatus above, a call identifier is a concatenation of a registration call identifier of a call which registered a thread within the associated application and a value of a call counter of the thread corresponding to the call.

In another embodiment of any one of the apparatus above, the first VSS call is created by a thread in the first replicated application. Operation of the thread in the first replicated application is suspended upon sending the first VSS call. The actions include processing the first VSS call by, in response to the first digest matching the second digest, responding to the first VSS call and enabling the thread to resume operation.

In a further embodiment of any one of the apparatus above, operation of the second replicated application is executed with a delay from operation of the first replicated application.

In another embodiment of any one of the apparatus above, the actions also include, in response to receiving from the first replicated application a first request for data, processing the first request, sending a response to the first request to the first replicated application, and sending a data command to the second replicated application based at least in part on the response to the first request. The first request for data may include a request for: a globally unique identifier, a random number, a timestamp, a time of day, a memory access, and/or data input from a client application.

In a further embodiment of any one of the apparatus above, instantiating the plurality of replicated applications includes instantiating the first replicated application on a first hardware device and instantiating the second replicated application on a second hardware device which operates independently of the first hardware device.

In another embodiment of any one of the apparatus above, the actions also include storing a record of the first VSS call in a journal of VSS calls performed by the plurality of replicated applications. Storing the record of the first VSS call may include storing call information. The call information may include: an IP address, user credentials and/or contextual information.

In a further embodiment of any one of the apparatus above, the apparatus is embodied in an integrated circuit.

In another embodiment of any one of the apparatus above, the apparatus is embodied in a plurality of communicatively coupled devices, each device including at least one of the processors and at least one of the memories storing at least some of the computer program code.

A further embodiment provides a computer readable medium for detecting aberrant behavior in a software application. The computer readable medium is tangibly encoded with a computer program executable by a processor to perform actions. The actions include instantiating a plurality of replicated applications on at least one computing device using identical initial setting. Each replicated application in the plurality of replicated applications is a replicated instance of the software application, and the plurality of replicated applications includes a first replicated application and a second replicated application. Deterministic behavior is enforced so that each replicated application thread executes VSS calls in the same sequence and generating call identifiers which are unique for the duration of the replicated application and identical across the plurality of replicated applications. Receiving first information associated with a first VSS call from the first replicated application is included in the actions. The first information includes a first call identifier of the first VSS call and a first digest. Second information associated with a second VSS call from the second replicated application is received, the second information including a second call identifier of the second VSS call and a second digest. In response to determining the first call identifier and the second call identifier are identical, the actions include determining whether the first digest matches the second digest. The actions also includes, in response to the first digest not matching the second digest, signaling that aberrant behavior has occurred.

In another embodiment of the computer readable medium above, the first VSS call is a consistency check and the actions also include, in response to the first digest matching the second digest, responding to the first information with an indication that the plurality of replicated applications are consistent.

In a further embodiment of any one of the computer readable media above, the plurality of replicated applications includes a third replicated application. The actions also include receiving third information associated with a third VSS call from the third replicated application, the third information including a third call identifier of the third VSS call and a third digest. In response to determining the first call identifier, the second call identifier and the third call identifier are identical, the actions include determining whether the third digest matches both the first digest and the second digest. The actions also include, in response to the third digest not matching either the first digest or the second digest, signaling that aberrant behavior has occurred.

In another embodiment of any one of the computer readable media above, the actions also include, in response to aberrant behavior, determining a divergent application in the plurality of replicated applications; and ignoring any future communication from the divergent application. The plurality of replicated applications may include a third replicated application and the actions also include assigning the third replicated application as a replacement for the divergent application.

In a further embodiment of any one of the computer readable media above, the first VSS call is one of: an input operation, an output operation, a request for a globally unique identifier.

In another embodiment of any one of the computer readable media above, a digest is calculated based on at least one datum within the associated API callusing: a checksum function; a hash function; an encryption function; and/or a user defined function.

In a further embodiment of any one of the computer readable media above, a call identifier is a concatenation of a registration call identifier of a call which registered a thread within the associated application and a value of a call counter of the thread corresponding to the call.

In another embodiment of any one of the computer readable media above, the first VSS call is created by a thread in the first replicated application. Operation of the thread in the first replicated application is suspended upon sending the first VSS call. The actions include processing the first VSS call by, in response to the first digest matching the second digest, responding to the first VSS call and enabling the thread to resume operation.

In a further embodiment of any one of the computer readable media above, operation of the second replicated application is executed with a delay from operation of the first replicated application.

In another embodiment of any one of the computer readable media above, the actions also include, in response to receiving from the first replicated application a first request for data, processing the first request, sending a response to the first request to the first replicated application, and sending a data command to the second replicated application based at least in part on the response to the first request. The first request for data may include a request for: a globally unique identifier, a random number, a timestamp, a time of day, a memory access, and/or data input from a client application.

In a further embodiment of any one of the computer readable media above, instantiating the plurality of replicated applications includes instantiating the first replicated application on a first hardware device and instantiating the second replicated application on a second hardware device which operates independently of the first hardware device.

In another embodiment of any one of the computer readable media above, the actions also include storing a record of the first VSS call in a journal of VSS calls performed by the plurality of replicated applications. Storing the record of the first VSS call may include storing call information. The call information may include: an IP address, user credentials and/or contextual information.

In a further embodiment of any one of the computer readable media above, the computer readable medium is a storage medium.

In another embodiment of any one of the computer readable media above, the computer readable medium is a non-transitory computer readable medium (e.g., CD-ROM, RAM, flash memory, etc.).

A further embodiment provides another apparatus for detecting aberrant behavior in a software application. The apparatus includes a means for instantiating a plurality of replicated applications on at least one computing device using identical initial setting (such as a processor for example). Each replicated application in the plurality of replicated applications is a replicated instance of the software application, and the plurality of replicated applications includes a first replicated application and a second replicated application. Deterministic behavior is enforced so that each replicated application thread executes VSS calls in the same sequence and generating call identifiers which are unique for the duration of the replicated application and identical across the plurality of replicated applications. Means for receiving first information associated with a first VSS call from the first replicated application is included in the apparatus (such as a receiver or input for example). The first information includes a first call identifier of the first VSS call and a first digest. Means for receiving second information associated with a second VSS call from the second replicated application is included (such as a receiver or input for example), the second information including a second call identifier of the second VSS call and a second digest. The apparatus includes means for determining whether the first digest matches the second digest in response to determining the first call identifier and the second call identifier are identical (such as a processor for example). The apparatus also includes means for signaling that aberrant behavior has occurred in response to the first digest not matching the second digest (such as a transmitter or output for example).

In another embodiment of the apparatus above, the first VSS call is a consistency check and the apparatus also includes means for responding to the first information with an indication that the plurality of replicated applications are consistent in response to the first digest matching the second digest.

In a further embodiment of any one of the apparatus above, the plurality of replicated applications includes a third replicated application. The apparatus also includes means for receiving third information associated with a third VSS call from the third replicated application, the third information including a third call identifier of the third VSS call and a third digest. The apparatus includes means for determining whether the third digest matches both the first digest and the second digest in response to determining the first call identifier, the second call identifier and the third call identifier are identical. The apparatus also includes means for signaling that aberrant behavior has occurred in response to the third digest not matching either the first digest or the second digest.

In another embodiment of any one of the apparatus above, the apparatus also includes means for determining a divergent application in the plurality of replicated applications in response to aberrant behavior; and means for ignoring any future communication from the divergent application. The plurality of replicated applications may include a third replicated application and the apparatus also includes means for assigning the third replicated application as a replacement for the divergent application.

In a further embodiment of any one of the apparatus above, the first VSS call is one of: an input operation, an output operation, a request for a globally unique identifier.

In another embodiment of any one of the apparatus above, a digest is calculated based on at least one datum within the associated API callusing: a checksum function; a hash function; an encryption function; and/or a user defined function.

In a further embodiment of any one of the apparatus above, a call identifier is a concatenation of a registration call identifier of a call which registered a thread within the associated application and a value of a call counter of the thread corresponding to the call.

In another embodiment of any one of the apparatus above, the first VSS call is created by a thread in the first replicated application. Operation of the thread in the first replicated application is suspended upon sending the first VSS call. The apparatus includes means for processing the first VSS call by, in response to the first digest matching the second digest, responding to the first VSS call and enabling the thread to resume operation.

In a further embodiment of any one of the apparatus above, operation of the second replicated application is executed with a delay from operation of the first replicated application.

In another embodiment of any one of the apparatus above, the apparatus also includes: means for processing the first request and sending a response to the first request to the first replicated application in response to receiving from the first replicated application a first request for data; and means for sending a data message to the second request to the second replicated application based at least in part on the response to the first request. The first request for data may include a request for: a globally unique identifier, a random number, a timestamp, a time of day, a memory access, and/or data input from a client application.

In a further embodiment of any one of the apparatus above, the means for instantiating the plurality of replicated applications includes means for instantiating the first replicated application on a first hardware device and means for instantiating the second replicated application on a second hardware device which operates independently of the first hardware device.

In another embodiment of any one of the apparatus above, the apparatus also includes means for storing a record of the first VSS call in a journal of VSS calls performed by the plurality of replicated applications. The means for storing the record of the first VSS call may include means for storing call information. The call information may include: an IP address, user credentials and/or contextual information.

A further embodiment provides a system for detecting aberrant behavior in a software application. The system includes a plurality of computing devices (e.g., a "bare metal" computer, a virtual machine or a computer process running a host), each computing device having at least one processor and at least one memory storing computer program code. The at least one memory and the computer program code are configured to, with the at least one processor, cause the system to perform actions. The actions include instantiating a plurality of replicated applications on the plurality of computing devices using identical initial setting. Each replicated application in the plurality of replicated applications is a replicated instance of the software application, and the plurality of replicated applications includes a first replicated application and a second replicated application. Deterministic behavior is enforced so that each replicated application thread executes VSS calls in the same sequence and generating call identifiers which are unique for the duration of the replicated application and identical across the plurality of replicated applications. Receiving first information associated with a first VSS call from the first replicated application is included in the actions. The first information includes a first call identifier of the first VSS call and a first digest. Second information associated with a second VSS call from the second replicated application is received, the second information including a second call identifier of the second VSS call and a second digest. In response to determining the first call identifier and the second call identifier are identical, the actions include determining whether the first digest matches the second digest. The actions also includes, in response to the first digest not matching the second digest, signaling that aberrant behavior has occurred.

In another embodiment of the system above, the first VSS call is a consistency check and the actions also include, in response to the first digest matching the second digest, responding to the first information with an indication that the plurality of replicated applications are consistent.

In a further embodiment of any one of the systems above, the plurality of replicated applications includes a third replicated application. The system also include receiving third information associated with a third VSS call from the third replicated application, the third information including a third call identifier of the third VSS call and a third digest. In response to determining the first call identifier, the second call identifier and the third call identifier are identical, the actions include determining whether the third digest matches both the first digest and the second digest. The actions also include, in response to the third digest not matching either the first digest or the second digest, signaling that aberrant behavior has occurred.

In another embodiment of any one of the systems above, the actions also include, in response to aberrant behavior, determining a divergent application in the plurality of replicated applications; and ignoring any future communication from the divergent application. The plurality of replicated applications may include a third replicated application and the actions also include assigning the third replicated application as a replacement for the divergent application.

In a further embodiment of any one of the systems above, the first VSS call is one of: an input operation, an output operation, a request for a globally unique identifier.

In another embodiment of any one of the systems above, a digest is calculated based on at least one datum within the associated API callusing: a checksum function; a hash function; an encryption function; and/or a user defined function.

In a further embodiment of any one of the systems above, a call identifier is a concatenation of a registration call identifier of a call which registered a thread within the associated application and a value of a call counter of the thread corresponding to the call.

In another embodiment of any one of the systems above, the first VSS call is created by a thread in the first replicated application. Operation of the thread in the first replicated application is suspended upon sending the first VSS call. The actions include processing the first VSS call by, in response to the first digest matching the second digest, responding to the first VSS call and enabling the thread to resume operation.

In a further embodiment of any one of the systems above, operation of the second replicated application is executed with a delay from operation of the first replicated application.

In another embodiment of any one of the systems above, the actions also include: in response to receiving from the first replicated application a first request for data, processing the first request, sending a response to the first request to the first replicated application, and sending a data message to the second request to the second replicated application based at least in part on the response to the first request. The first request for data may include a request for: a globally unique identifier, a random number, a timestamp, a time of day, a memory access, and/or data input from a client application.

In a further embodiment of any one of the systems above, instantiating the plurality of replicated applications includes instantiating the first replicated application on a first hardware device and instantiating the second replicated application on a second hardware device which operates independently of the first hardware device.

In another embodiment of any one of the systems above, the actions also include storing a record of the first VSS call in a journal of VSS calls performed by the plurality of replicated applications. Storing the record of the first VSS call may include storing call information. The call information may include: an IP address, user credentials and/or contextual information.

In a further embodiment of any one of the systems above, the apparatus is embodied in an integrated circuit.

In another embodiment of any one of the systems above, the apparatus is embodied in a plurality of communicatively coupled devices, each device including at least one of the processors and at least one of the memories storing at least some of the computer program code.

Various embodiments may be implemented in either all software, all hardware, or a combination of hardware and software, including program code stored in a firmware format to support dedicated hardware or in programmable hardware components.

A software implementation of the above described embodiment(s) may comprise a series of computer instructions either fixed on a tangible medium, such as a computer readable media, e.g. diskette, CD-ROM, ROM, or fixed disk.

The series of computer instructions contained in a tangible medium embodies all or part of the functionality previously described herein. Those skilled in the art will appreciate that such computer instructions can be written in a number of programming languages for use with many computer architectures or operating systems and may exist in machine executable format. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, preloaded with a computer system, e.g., on system ROM or fixed disk, or distributed from a server or electronic bulletin board over a network, e.g., the Internet or World Wide Web.

Although various embodiments have been disclosed, it will be apparent to those skilled in the art that changes and modifications can be made which will achieve some of the descried advantages without departing from the spirit and scope of the invention. It will be apparent to those reasonably skilled in the art that other components performing the same functions may be suitably substituted. Further, such methods may be achieved in either all software implementations, using the appropriate processor instructions, or in hybrid implementations that utilize a combination of hardware logic and software logic to achieve the same results.

Various operations described are purely exemplary and imply no particular order. Further, the operations can be used in any sequence when appropriate and can be partially used. With the above embodiments in mind, it should be understood that additional embodiments can employ various computer-implemented operations involving data transferred or stored in computer systems. These operations are those requiring physical manipulation of physical quantities. Usually, though not necessarily, these quantities take the form of electrical, magnetic, or optical signals capable of being stored, transferred, combined, compared, and otherwise manipulated.

Any of the operations described that form part of the presently disclosed embodiments may be useful machine operations. Various embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines employing one or more processors coupled to one or more computer readable medium, described below, can be used with computer programs written in accordance with the teachings herein, or it may be more convenient to construct a more specialized apparatus to perform the required operations.

The procedures, processes, and/or modules described herein may be implemented in hardware, software, embodied as a computer-readable medium having program instructions, firmware, or a combination thereof. For example, the functions described herein may be performed by a processor executing program instructions out of a memory or other storage device.

The foregoing description has been directed to particular embodiments. However, other variations and modifications may be made to the described embodiments, with the attainment of some or all of their advantages. Modifications to the above-described systems and methods may be made without departing from the concepts disclosed herein. Accordingly, the invention should not be viewed as limited by the disclosed embodiments. Furthermore, various features of the described embodiments may be used without the corresponding use of other features. Thus, this description should be read as merely illustrative of various principles, and not in limitation of the invention.

What is claimed is:

1. A computerized method of detecting aberrant behavior in a software application, the method comprising:
    instantiating a plurality of replicated applications on at least one computing device using an identical initial setting, wherein each replicated application in the plurality of replicated applications is a replicated instance of the software application executing at least one thread, and the plurality of replicated applications includes a first replicated application and a second replicated application;
    enforcing deterministic behavior so that each replicated application thread:
        independently of the other replicated applications executes application program interface (API) calls in the same sequence, and
        independently of the other replicated applications generates call identifiers which are unique for each occurrence of an API call by the replicated application and identical across the plurality of replicated applications for each corresponding application thread;
    obtaining first information associated with a first API call from the first replicated application, the first information including a first call identifier of the first API call and a first digest, wherein the first digest is computed based at least in part on one or more of the first call identifier, a first static call identifier, first call-related data, and first user credentials;
    obtaining second information associated with a second API call from the second replicated application, the second information including a second call identifier of the second API call and a second digest, wherein the second digest is computed based at least in part on one or more of the second call identifier, a second static call identifier, second call-related data, and second user credentials;
    in response to determining the first call identifier and the second call identifier are identical, determining whether the first digest matches the second digest; and
    in response to the first digest not matching the second digest, signaling that aberrant behavior has occurred.

2. The method of claim 1, wherein the first API call is a consistency check and the method further comprises, in response to the first digest matching the second digest, responding to the first information with an indication that the plurality of replicated applications are consistent.

3. The method of claim 1, wherein the plurality of replicated applications includes a third replicated application, and the method further comprising:
    obtaining third information associated with a third API call from the third replicated application, the third information including a third call identifier of the third API call and a third digest, wherein the third digest is computed based at least in part on one or more of the third call identifier, a third static call identifier, third call-related data, and third user credentials;
    in response to determining the first call identifier, the second call identifier and the third call identifier are identical, determining whether the third digest matches both the first digest and the second digest; and
    in response to the third digest not matching either the first digest or the second digest, signaling that aberrant behavior has occurred.

4. The method of claim 3, further comprising, in response to signaling aberrant behavior has occurred:
    determining a divergent application in the plurality of replicated applications; and
    ignoring any future communication from the divergent application.

5. The method of claim 4, further comprising assigning the third replicated application as a replacement for the divergent application.

6. The method of claim 1, wherein the first API call is one of: an input operation, an output operation, a request for a globally unique identifier.

7. The method of claim 1, further comprising calculating a digest further based on at least one datum within an associated API call using at least one of: a checksum function; a hash function; an encryption function; and a user defined function.

8. The method of claim 1, wherein a call identifier is a concatenation of a thread identifier of a thread issuing the call and a value of a call counter of the thread issuing the call.

9. The method of claim 1, further comprising,
    issuing the first API call by a thread in the first replicated application,
    issuing the second API call by a thread in the second replicated application,
    suspending operation of the thread in the first replicated application upon issuing the first API call,
    suspending operation of the thread in the second replicated application upon issuing the second API call,
    processing the first API call by, in response to the first digest matching the second digest, responding to the first API call and releasing the thread in the first replicated application to resume operation, and processing the second API call by, in response to the first digest matching the second digest, responding to the second API call and releasing the thread in the second replicated application to resume operation.

10. The method of claim 1, further comprising, delaying execution of the second API call from execution of the first API call.

11. The method of claim 1, further comprising, in response to obtaining from the first replicated application a first request for data, sending a data command to the second replicated application.

12. The method of claim 11, wherein the first request for data includes a request for at least one of: a globally unique identifier, a random number, a timestamp, a time of day, a memory access, and data input from a client application.

13. The method of claim 1, wherein instantiating the plurality of replicated applications includes instantiating the first replicated application on a first hardware device and instantiating the second replicated application on a second hardware device, and wherein the first hardware device operates independently of the second hardware device.

14. The method of claim 1, further comprising storing a record of the first API call in a journal of API calls performed by the first replicated application.

15. The method of claim 14, wherein storing the record of the first API call further comprises storing call information, wherein the call information includes at least one of: an IP address, user credentials and contextual information.

16. The method of claim 1, wherein determining whether the first digest matches the second digest is performed independently of the other replicated applications for each replicated application in the plurality of replicated applications.

17. A system for detecting aberrant behavior in a software application, the system comprising at least one computing device including at least one processor and at least one memory including computer program code stored therein, the at least one processor operative to execute the computer program code out of the at least one memory to:
    instantiate a plurality of replicated applications on the at least one computing device using an identical initial setting for each one of the plurality of replicated applications, wherein each replicated application in the plurality of replicated applications is a replicated instance of the software application executing at least one thread, and the plurality of replicated applications includes a first replicated application and a second replicated application;
    enforce deterministic behavior so that each replicated application thread:
        independently of the other replicated applications executes application program interface (API) calls in the same sequence and
        independently of the other replicated applications generates call identifiers which are unique for each occurrence of an API call by the replicated application and identical across the plurality of replicated applications for each corresponding thread of each replicated application;
    obtain first information associated with a first API call from the first replicated application, the first information including a first call identifier of the first API call and a first digest, wherein the first digest is computed based at least in part on one or more of the first call identifier, a first static call identifier, first call-related data, and first user credentials of the first replicated application;
    obtain second information associated with a second API call from the second replicated application, the second information including a second call identifier of the second API call and a second digest, wherein the second digest is computed based at least in part on one or more of the second call identifier, a second static call identifier, second call-related data, and second user credentials;
    in response to determining the first call identifier and the second call identifier are identical, determine whether the first digest matches the second digest; and
    in response to the first digest not matching the second digest, signal that aberrant behavior has occurred.

18. The system of claim 17, wherein the plurality of replicated applications includes a third replicated application, and the at least one processor executing the computer program code out of the at least one memory is further operative to:
    obtain third information associated with a third API call from the third replicated application, the third information including a third call identifier of the third API call and a third digest, wherein the third digest is computed based at least in part on one or more of the third call identifier, a third static call identifier, third call-related data, and third user credentials;
    in response to determining the first call identifier, the second call identifier and the third call identifier are identical, determine whether the third digest matches both the first digest and the second digest; and
    in response to the third digest not matching either the first digest or the second digest, signal that aberrant behavior has occurred.

19. The system of claim 18, wherein the at least one processor executing the computer program code out of the at least one memory is further operative, in response to signaling that aberrant behavior has occurred, to:
    determine a divergent application in the plurality of replicated applications; and
    ignore any future communication from the divergent application.

20. The system of claim 19, wherein the divergent application was instantiated on a first computing device of the at least one computing device and the at least one processor executing the computer program code out of the at least one memory is further operative to, when instantiating a new replicated application, instantiate the new replicated application on a second computing device which operates independently of the first computing device.

21. The system of claim 17, wherein the at least one processor executing the computer program code out of the at least one memory is further operative to further calculate each digest based on at least one datum within an associated API call using at least one of: a checksum function; a hash function; an encryption function; and a user defined function.

22. The system of claim 17, wherein the first API call is created by a thread in the first replicated application,
    operation of the thread in the first replicated application is suspended upon sending the first API call, and
    the at least one processor executing the computer program code out of the at least one memory is further operative to process the first API call by, in response to the first digest matching the second digest, responding to the first API call and enabling the thread to resume operation.

23. The system of claim 17, wherein the at least one processor executing the computer program code out of the at least one memory is further operative to, in response to obtaining from the first replicated application a first request for data, send a data command to the second replicated application.

* * * * *